(12) United States Patent
Nishibayashi et al.

(10) Patent No.: US 8,274,992 B2
(45) Date of Patent: Sep. 25, 2012

(54) COMMUNICATION METHOD FOR WIRELESS LANS

(75) Inventors: Yasuyuki Nishibayashi, Kawasaki (JP); Masahiro Takagi, Tokyo (JP); Tomoko Adachi, Urayasu (JP); Tetsu Nakajima, Yokohama (JP); Tomoya Tandai, Tokyo (JP); Yoriko Utsunomiya, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 445 days.

(21) Appl. No.: 12/646,580

(22) Filed: Dec. 23, 2009

(65) Prior Publication Data

US 2010/0189056 A1    Jul. 29, 2010

Related U.S. Application Data

(62) Division of application No. 11/201,258, filed on Aug. 11, 2005, now abandoned.

(30) Foreign Application Priority Data

Nov. 1, 2004    (JP) ................................ 2004-318487

(51) Int. Cl.
*H04L 12/413*    (2006.01)
(52) U.S. Cl. ..................... 370/447; 455/450; 370/395.4; 370/442; 370/445; 370/328
(58) Field of Classification Search .................. 455/450; 370/395.4–395.42, 442, 445, 447, 18
See application file for complete search history.

(56) References Cited

U.S. PATENT DOCUMENTS

| | | |
|---|---|---|
| 5,329,531 A | 7/1994 | Diepstraten et al. |
| 7,031,287 B1 | 4/2006 | Ho et al. |
| 7,496,076 B2 | 2/2009 | Takagi et al. |
| 2003/0135640 A1 | 7/2003 | Ho et al. |
| 2005/0135284 A1 | 6/2005 | Nanda et al. |
| 2005/0220145 A1 | 10/2005 | Nishibayashi et al. |
| 2005/0226273 A1 | 10/2005 | Qian |
| 2005/0238016 A1 | 10/2005 | Nishibayashi et al. |
| 2005/0270975 A1 | 12/2005 | Meylan et al. |
| 2006/0034174 A1 | 2/2006 | Nishibayashi et al. |
| 2006/0056443 A1 | 3/2006 | Tao et al. |
| 2006/0083233 A1 | 4/2006 | Nishibayashi et al. |
| 2007/0014237 A1 | 1/2007 | Nishibayashi et al. |
| 2008/0002615 A1 | 1/2008 | Nakajima et al. |
| 2008/0150675 A1 | 6/2008 | Hirano et al. |
| 2008/0165713 A1 | 7/2008 | Nishibayashi et al. |
| 2008/0181251 A1 | 7/2008 | Nishibayashi et al. |

FOREIGN PATENT DOCUMENTS

| | | |
|---|---|---|
| JP | 11-298533 | 10/1999 |
| JP | 2002-314546 | 10/2002 |
| WO | WO 03/005644 | 1/2003 |

*Primary Examiner* — Vladimir Magloire
(74) *Attorney, Agent, or Firm* — Oblon, Spivak, McClelland, Maier & Neustadt, L.L.P.

(57) ABSTRACT

A physical frame is generated and transmitted to a destination terminal. In this physical frame, one of a data frame, an acknowledgement frame, and an acknowledgement request frame, and a transmission permission frame which is used in place of a normal Ack frame associated with a delayed Block Ack, and permits the destination terminal to perform piggyback transmission, are aggregated.

19 Claims, 35 Drawing Sheets

※ If TXOP period is sufficient, IAC frame is aggregated with Block Ack Request frame.

※ When BA of uplink from QSTA is wrong, BAR is piggybacked on BA to downlink.

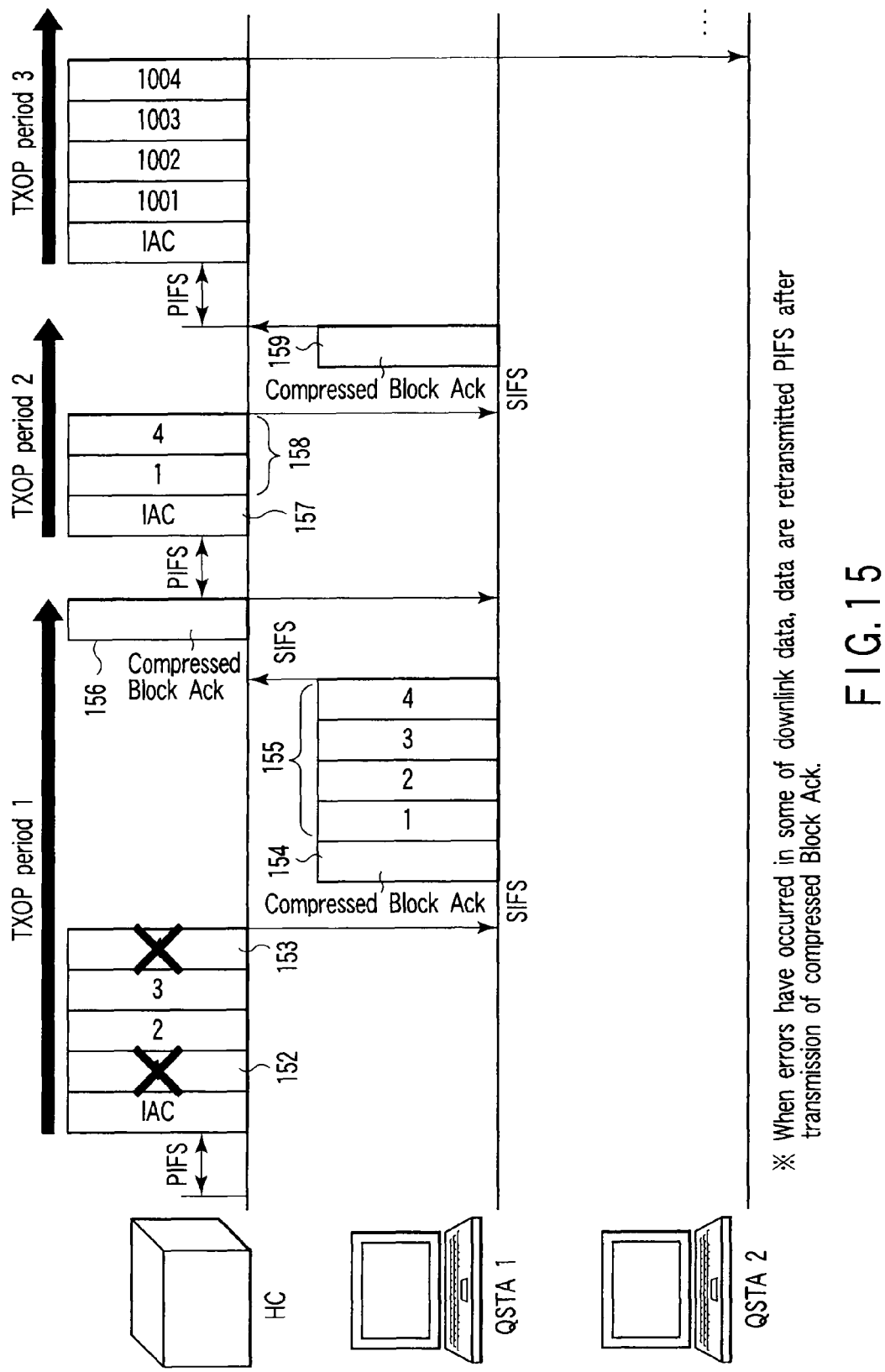
F I G. 15

※ Acquisition side of TXOP plays main role in controlling piggyback communication.

※ When timeout has occurred or TXOP is obtained next or piggybacking is permitted, Block Ack Request is transmitted.

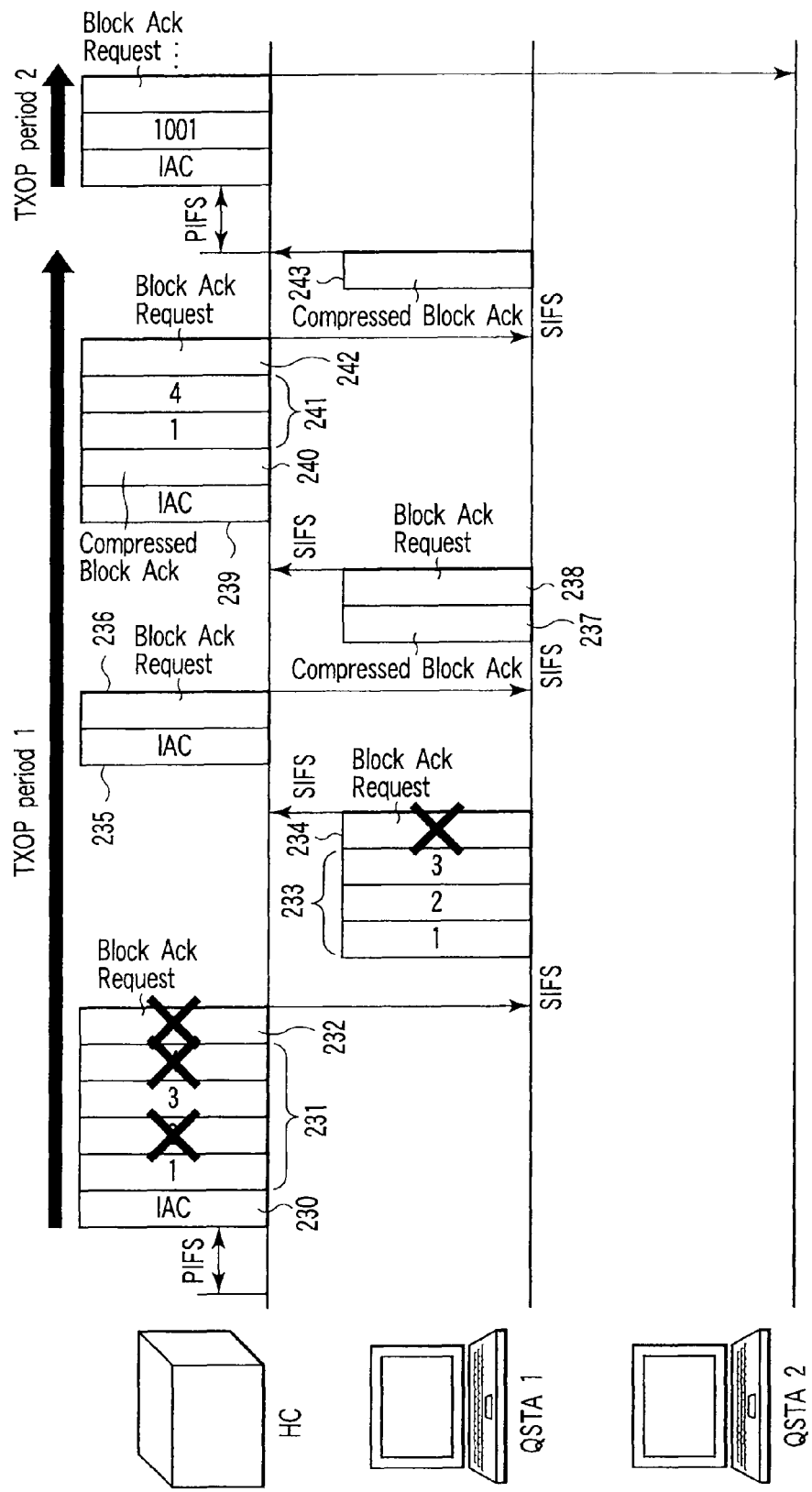
F I G. 23

※ When delayed Block Ack technique is executed by aggregating IAC with Block Ack Request

| MPDU length | CRC | MRAD | ~350 |
|---|---|---|---|
| MPDU length | CRC | IAC (QSTA 1) | ~351 |
| MPDU length | CRC | MPDU 1 (QSTA 1, sequence number 1) | ~352 |
| MPDU length | CRC | MPDU 2 (QSTA 1, sequence number 2) | ~353 |
| MPDU length | CRC | IAC (QSTA 2) | ~354 |
| MPDU length | CRC | MPDU 1 (QSTA 2, sequence number 1001) | ~355 |
| MPDU length | CRC | MPDU 2 (QSTA 2, sequence number 1002) | ~356 |

F I G. 3 5

| MPDU length | CRC | MRAD |
|---|---|---|
| MPDU length | CRC | MPDU 1 (QSTA 1, sequence number 1) |
| MPDU length | CRC | MPDU 2 (QSTA 1, sequence number 2) |
| MPDU length | CRC | MPDU 1 (QSTA 2, sequence number 1001) |
| MPDU length | CRC | MPDU 2 (QSTA 2, sequence number 1002) |

FIG. 37

COMMUNICATION METHOD FOR WIRELESS LANS

CROSS-REFERENCE TO RELATED APPLICATIONS

This application is a Divisional of U.S. application Ser. No. 11/201,258, filed Aug. 11, 2005, and is based upon and claims the benefit of priority from prior Japanese Patent Application No. 2004-318487, filed Nov. 1, 2004, the entire contents of which are incorporated herein by reference.

BACKGROUND OF THE INVENTION

1. Field of the Invention

The present invention relates to a communication apparatus and method which perform media access control on the basis of the carrier sense information of a physical layer and the carrier sense information of a MAC layer.

2. Description of the Related Art

Media access control (MAC) is control for causing a plurality of communication apparatuses which perform communication while sharing the same media to decide how to use the media in transmitting communication data. Owing to media access control, even if two or more communication apparatuses transmit communication data by using the same media at the same time, there is less chance of the occurrence of a phenomenon (collision) in which a communication apparatus on the receiving side cannot separate communication data. Media access control is also a technique for controlling access from communication apparatuses to a media so as to minimize the chance of the occurrence of a phenomenon in which, despite the presence of communication apparatuses having transmission requests, the media is not used by any of the communication apparatuses.

In wireless communication, since it is difficult for a communication apparatus to monitor transmission data while transmitting the data, media access control (MAC) which is not premised on collision detection is required. IEEE 802.11 is a typical technical standard for wireless LANs, and uses CSMA/CA (Carrier Sense Multiple Access with Collision Avoidance). According to CSMA/CA in IEEE 802.11, in the header of a MAC frame, a period (Duration) until the end of a sequence comprising one or more frame exchanges following the frame is set. In this period, a communication apparatus which is irrelevant to the sequence and has no transmission right waits for transmission upon determining a virtual occupied state of the media. This prevents the occurrence of collision. On the other hand, a communication apparatus which has a transmission right in this sequence recognizes that the media is not used except for a period during which the media is actually occupied. IEEE 802.11 defines that the state of a media is determined on the basis of such a combination of virtual carrier sense on a MAC layer and physical carrier sense on a physical layer, and media access control is performed on the basis of the determination.

IEEE 802.11 using CSMA/CA has increased the communication speed mainly by changing the physical layer protocol. With regard to the 2.4 GHz band, there have been changes from IEEE 802.11 (established in 1997, 2 Mbps) to IEEE 802.11b (established in 1999, 11 Mbps), and further to IEEE 802.11g (established in 2003, 54 Mbps). With regard to the 5 GHZ band, only IEEE 802.11a (established in 1999, 54 Mbps) exists as a standard. In order to develop standard specifications directed to further increase communication speeds in both the 2.4 GHz band and the 5 GHz band, IEEE 802.11 TGn (Task Group n) has already been established.

In addition, several access control techniques designed to improve QoS (Quality of Service) are known. For example, as a QoS technique of guaranteeing parameters such as a designated bandwidth and delay time, HCCA (HCF Controlled Channel Access) which is an extended scheme of a conventional polling sequence is available. According to HCCA, scheduling is performed in a polling sequence in consideration of required quality so as to guarantee parameters such as a bandwidth and delay time. Jpn. Pat. Appln. KOKAI Publication No. 2002-314546 refers to QoS in the IEEE 802.11e standard, and discloses a method of assigning priorities to communications between communication apparatuses in a wireless network.

When the same frequency band as that in the existing specifications is to be used in realizing an increase in communication speed, it is preferable to assure coexistence with communication apparatuses conforming to the existing specifications and to maintain backward compatibility. For this reason, it is basically preferable that a protocol on a MAC layer conforms to CSMA/CA matching the existing specifications. In this case, a temporal parameter associated with CSMA/CA, e.g., an IFS (Interframe Space) or backoff period needs to match that in the existing specifications.

Even if an attempt to increase the communication speed in terms of physical layer succeeds, the effective throughput of communication cannot be improved. That is, when an increase in the communication speed of the physical layer is realized, the format of a PHY frame ceases to be effective any more. An increase in overhead due to this may hinder an increase in throughput. In a PHY frame, a temporal parameter associated with CSMA/CA is permanently attached to a MAC frame. In addition, a PHY frame header is required for each MAC frame.

As a method of reducing overhead and increasing throughput, a Block Ack technique introduced in recently drafted IEEE 802.11e/draft 5.0 (enhancement of QoS in IEEE 802.11) is available. The Block Ack technique can consecutively transmit a plurality of MAC frames without any backoff, and hence can reduce the backoff amount to some degree. However, a physical layer header cannot be effectively reduced. In addition, according to aggregation introduced in initially drafted IEEE 802.11e, both the backoff amount and the physical layer header can be reduced. However, since the length of a physical layer frame containing MAC frames cannot be increased beyond about 4 kbytes under the conventional limitation on the physical layer, an improvement in efficiency is greatly limited. Even if the length of a PHY layer frame can be increased, another problem arises, i.e., a reduction in error tolerance.

BRIEF SUMMARY OF THE INVENTION

The present invention has been made to solve the above problems, and has as its object to provide a method for a communication apparatus which can coexist with an existing apparatus and can improve the substantial communication throughput by eliminating overhead accompanying the transmission of a plurality of frames by making a frame format more efficient.

According to an aspect of the present invention, there is provided a communication method including generating a physical frame in which: one of a data frame, an acknowledgement frame, and an acknowledgement request frame, and a transmission permission frame which is used in place of a normal Ack frame associated with a delayed Block Ack, and permits a destination terminal to perform piggyback transmission, are aggregated; and transmitting the physical frame to the destination terminal.

BRIEF DESCRIPTION OF THE SEVERAL VIEWS OF THE DRAWING

FIG. 15 is a view showing a case wherein errors have occurred in some of frames transmitted in the downlink direction;

FIG. 23 is a view showing a case wherein a Block Ack Request is contained in the last portion of a physical frame in which a plurality of data are aggregated;

FIG. 35 is a view for explaining aggregation to a plurality of destinations and reception buffer management;

FIG. 37 is a view for explaining aggregation to a plurality of destinations and reception buffer management.

DETAILED DESCRIPTION OF THE INVENTION

Figure 1:
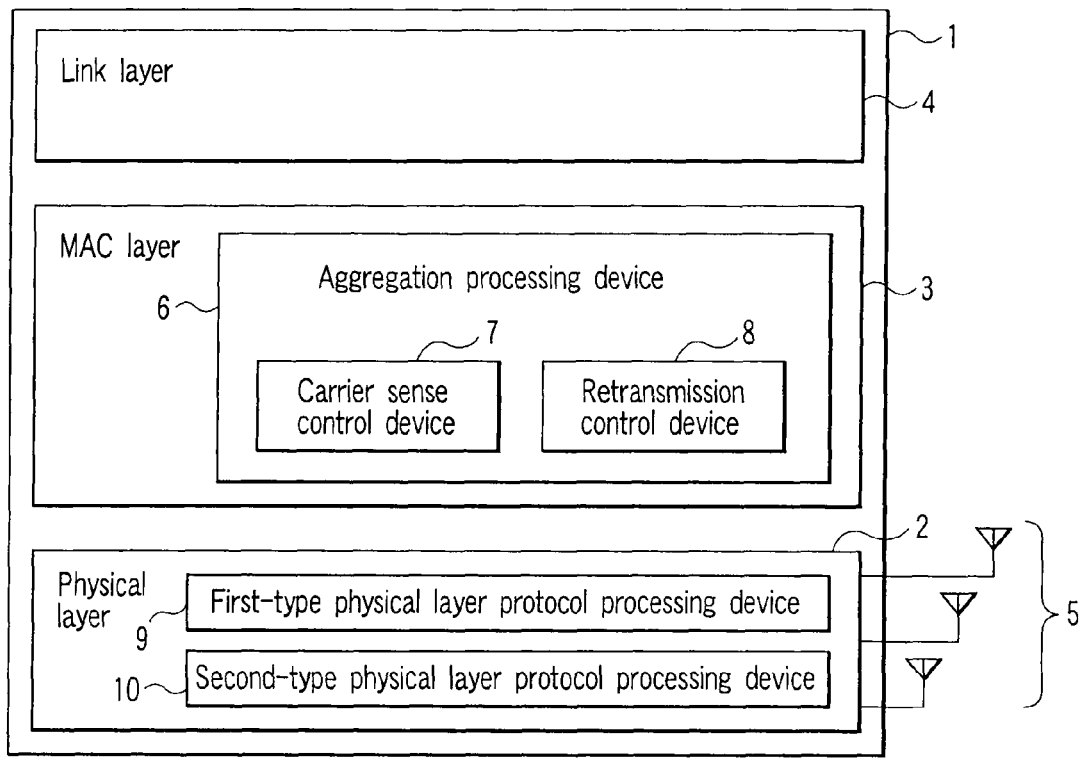
FIG. 1 is a block diagram showing the arrangement of a communication apparatus according to an embodiment of the present invention.

FIG. 1 is a block diagram showing the arrangement of a communication apparatus according to the first embodiment of the present invention. A communication apparatus 1 is an apparatus configured to communicate with another communication apparatus through a wireless link, and includes processing units 2, 3, and 4 respectively corresponding to a physical (PHY) layer, MAC layer, and link layer. These processing units are implemented as analog or digital electronic circuits in accordance with implementation requirements. Alternatively, the processing units are implemented as firmware or the like to be executed by a CPU incorporated in an LSI. An antenna 5 is connected to the physical layer processing unit ("processing unit" will be omitted hereinafter) 2. The MAC layer 3 includes an aggregation processing device 6 for MAC frames. The aggregation processing device 6 includes a carrier sense control device 7 and retransmission control device 8, and performs transmission/reception of Block Ack (acknowledgement for a plurality of MAC frames) frames (to be described in detail later), retransmission control based on Block Ack frames, and the like.

The physical layer 2 is designed to be compatible with two types of physical layer protocols. The processing unit 2 includes a first-type physical layer protocol processing device 9 and a second-type physical layer protocol processing device 10 for the respective types of protocol processing. The first-type physical layer protocol processing device 9 and second-type physical layer protocol processing device 10 often share circuits and are not necessarily independent of each other in terms of implementation.

In this embodiment of the present invention, the first-type physical layer protocol is assumed to be a protocol defined in IEEE 802.11a, and the second-type physical layer protocol is assumed to be a protocol using a so-called MIMO (Multiple Input Multiple Output) technique using a plurality antennas on each of the transmitting side and the receiving side. Using the MIMO technique makes it possible to expect an increase in transmission capacity almost proportional to the number of antennas without changing the frequency band. The MIMO technique is therefore a technique directed to further increase the throughput of IEEE 802.11. Note that the link layer 4 has a normal link layer function defined in IEEE 802. The technique to be used to increase the transmission rate is not limited to MIMO. For example, a method of increasing the occupied frequency band may be used or may be combined with MIMO.

According to IEEE 802.11e/Draft 8.0, as a technique of improving the transmission efficiency at the MAC (Media Access Control) layer, a Block Ack technique has been proposed. In the Block Ack technique, a given terminal transmits QoS (Quality of Service) data at minimum frame intervals called SIFS (Short Interframe Space) for a given channel use period (TXOP: Transmission Opportunity). Thereafter, the terminal transmits a Block Ack Request to the receiving terminal at an arbitrary timing to request its reception status. The receiving side converts the reception status into information in the bitmap format on the basis of the Starting Sequence Number (Block Ack Starting Sequence Control) determined by the Block Ack Request, and returns the information as a Block Ack.

Prior to the detailed description of the embodiments of the present invention, existing techniques for Block Acks and buffer management on a receiving terminal of Block Acks will be described. According to IEEE 802.11e/Draft 10.0, a Block Ack technique is known as a technique of improving the transmission efficiency at the MAC (Media Access Control) layer. In the Block Ack technique, a given transmitting terminal transmits QoS (Quality of Service) data at minimum frame intervals called SIFS (Short Interframe Space) for a given channel use period (TXOP: Transmission Opportunity). Thereafter, the transmitting terminal transmits a Block Ack Request to the receiving terminal to request its reception status at an arbitrary timing. The receiving side converts the reception status into information in the bitmap format on the basis of the Starting Sequence Number (Block Ack Starting Sequence Control) determined by the Block Ack Request, and returns the information as a Block Ack.

Figure 2:
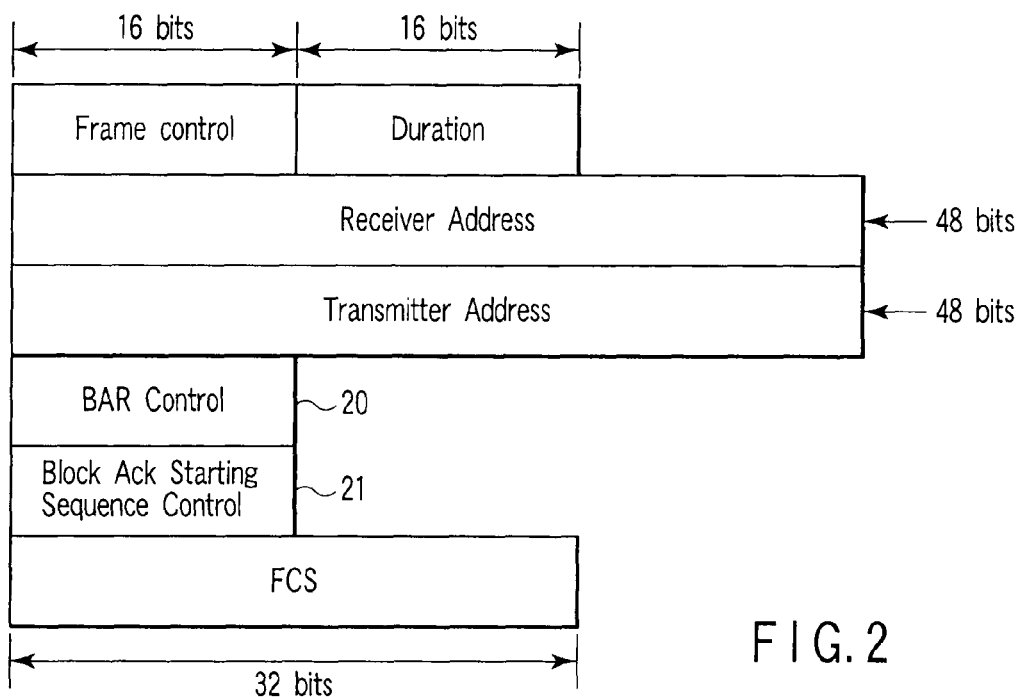
FIG. 2 is a view showing the format of a Block Ack Request frame defined in IEEE 802.11e/Draft 10.0.
Figure 3:
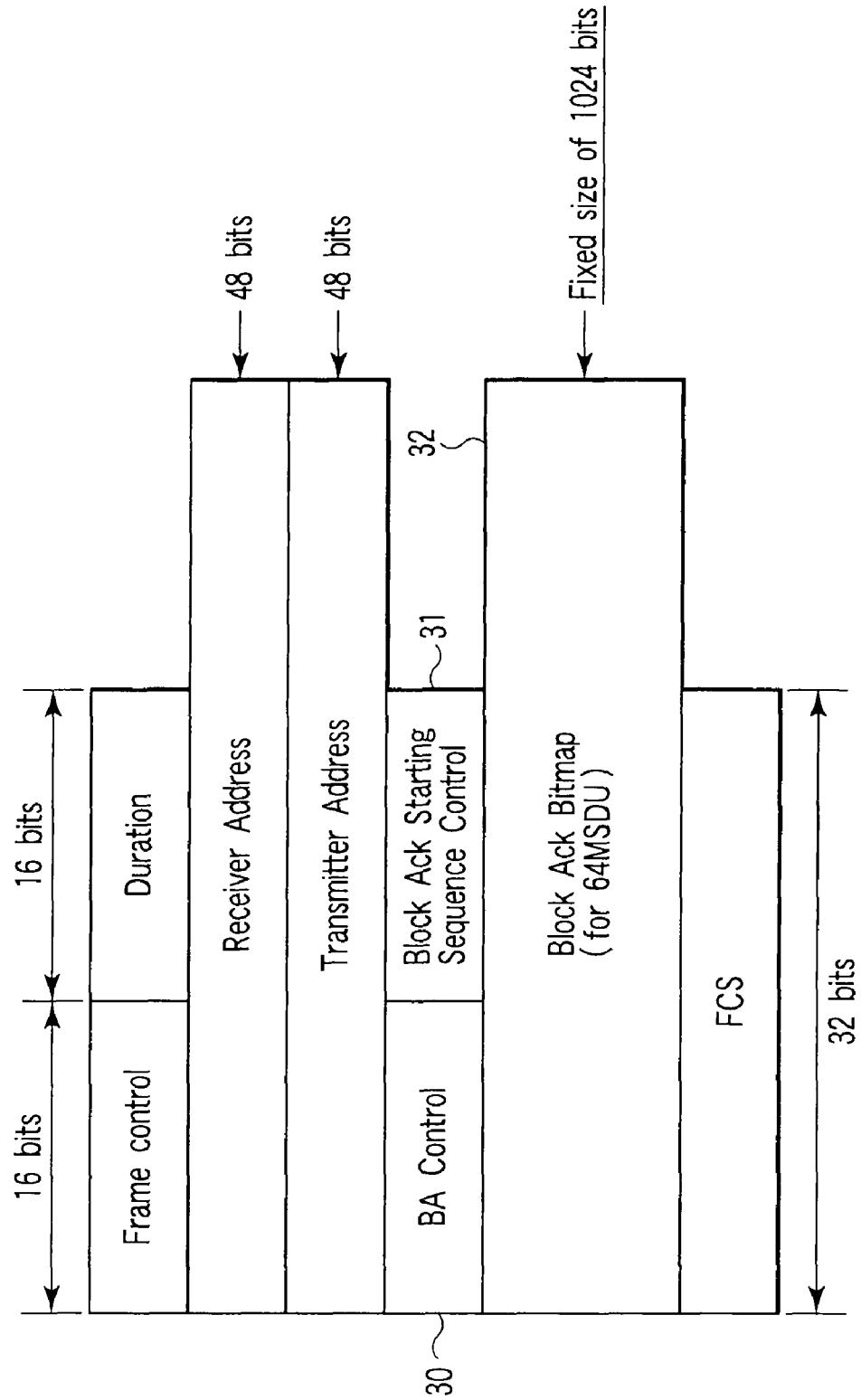
FIG. 3 is a view showing the format of a Block Ack frame defined in IEEE 802.11e/Draft 10.0.

FIGS. 2 and 3 respectively show the formats of a Block Ack Request frame and Block Ack frame which are defined in IEEE 802.11e/Draft 10.0. Both the frames shown in FIGS. 2 and 3 are MAC frames, each having the MAC header defined in IEEE 802.11. The MAC header is comprised of a Frame Control field, Duration field, Receiver Address field, and Transmitter Address field.

A BAR Control (Block Ack Request Control) 20 has a 4-bit TID (Traffic Identifier) field. QoS data exists for each priority (TID) and is assigned a unique sequence number and fragment number. For this reason, a reception status in the Block Ack in FIG. 3 also needs to be prepared for each priority. The TID field of the BAR Control 20 in the Block Ack Request is used to designate such a priority.

A Block Ack Starting Sequence Control 21 in the Block Ack Request in FIG. 2 is comprised of a 4-bit Fragment Number field and 12-bit Starting Sequence Number field. The Starting Sequence Number is used by a receiving terminal to generate a Block Ack Bitmap by tracing back a reception status, on the basis of a relative reception status from a sequence number corresponding to the Starting Sequence Number.

Like the BAR Control 20 in FIG. 2, a BA Control 30 in the Block Ack in FIG. 3 contains a 4-bit TID field. A Block Ack Starting Sequence Control (Block Ack Starting Sequence Number) 31 indicates the Starting Sequence Number of the reception status indicated by a Block Ack Bitmap 32 in the Block Ack. According to IEEE 802.11e/Draft 10.0, the size of a Block Ack Bitmap is a fixed length of 1,024 bits, which makes it possible to notify a reception log corresponding to data of a maximum of 64 MSDUs (MAC Service Data Units). The process of partitioning a MSDU or MMPDU (MAC management protocol data unit) into smaller MAC level frames, MPDUs (MAC Protocol Data Units), is called fragmentation. One MSDU or MMPDU shall be divided into a maximum of 16 MPDUs with a Fragmentation Threshold. Note that an FCS (Frame Check Sequence) for error detection is added to each of the MAC frames shown in FIGS. 2 and 3.

Figure 4:
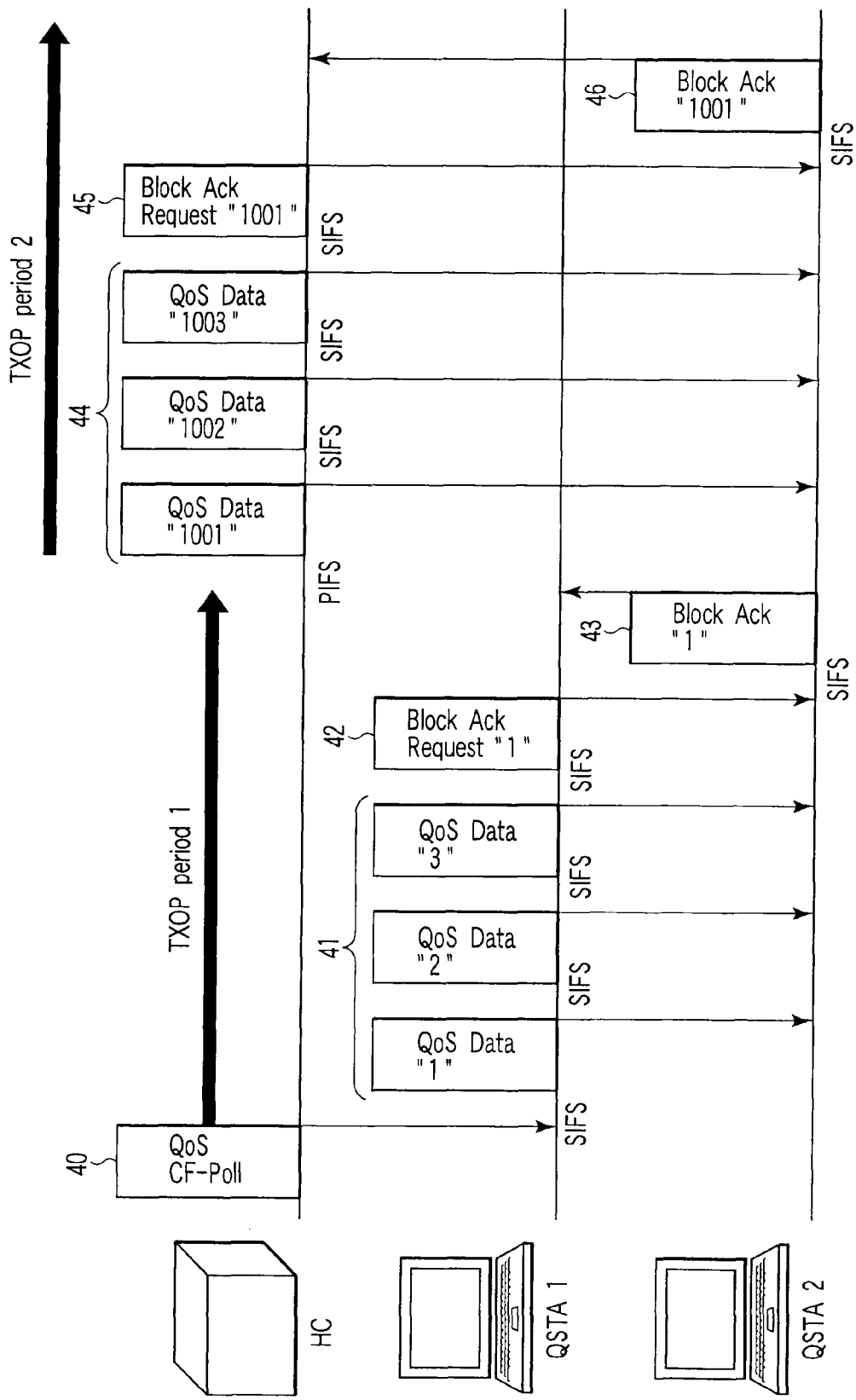
FIG. 4 is a view showing an example of an immediate Block Ack sequence.
Figure 5:
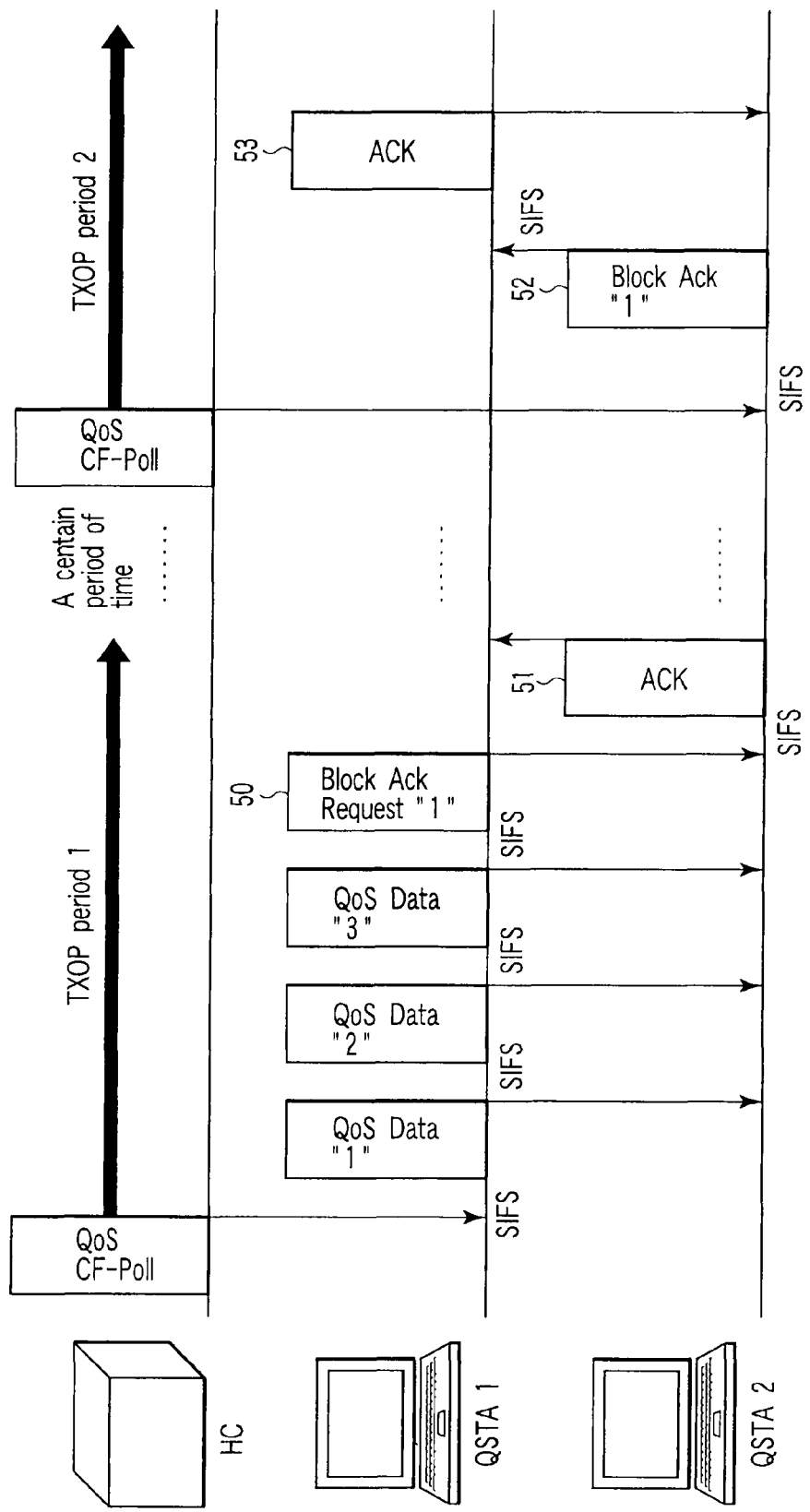
FIG. 5 is a view showing an example of a delayed Block Ack sequence.

FIGS. 4 and 5 each show an example of a Block Ack sequence in an HCCA (HCF Controlled Channel Access). The HC (Hybrid Coordinator) shown in each drawing is a QoS access point (QoS-AP) in IEEE 802.11e and serves as an entity which performs bandwidth management including the allocation of TXOPs to QSTAs (QoS stations) and performs downlink (the downlink direction from the HC to the QSTA) data transmission. The assignment of a TXOP to the QSTA is performed on the basis of a QoS CF-Poll frame (QoS Contention Free-Poll: a QoS-compatible polling frame which is transmitted from the HC to the QSTA to grant transmission opportunity).

Referring to FIG. 4, first of all, the HC assigns a channel use period (TXOP period 1) to QSTA 1 by transmitting a QoS CF-Poll frame 40 to it. QSTA 1 can transmit any frame in TXOP period 1. In the example shown in FIG. 4, QSTA 1 transmits QoS Data frames 41 at SIFS intervals in a burst manner, and then transmits a Block Ack Request frame 42 at the end of the transmission of the data frames. Thereafter, QSTA 1 receives a Block Ack frame 43 from QSTA 2. When TXOP period 1 assigned to QSTA 1 expires, the HC acquires TXOP period 2. In TXOP period 2, the HC also transmits QoS Data 44 to QSTA 1 in a burst manner. At the end of TXOP period 2, as in TXOP period 1 assigned to QSTA 1, the HC transmits a Block Ack Request 45, and receives a Block Ack 46 from QSTA 1. The Block Ack Requests 42 and 45 request the destination to return the relative reception status designated by a Block Ack Starting Sequence Control value. FIG. 4 shows an example of an immediate Block Ack sequence. In this case, the terminal which has received the Block Ack Requests 42 and 45 must return the Block Acks 43 and 46 after the SIFS intervals without fail.

FIG. 5 shows an example of a delayed Block Ack sequence. Upon receiving a Block Ack Request 50, the terminal returns an Ack frame defined in IEEE 802.11 (called a Normal acknowledgement in IEEE 802.11e/Draft 10.0) 51, and transmits a Block Ack 52 after a lapse of an arbitrary period. Upon receiving the Block Ack 52 at last, the data transmitting terminal returns a Normal acknowledgement 53, thereby completing the delayed Block Ack sequence. Note that the receiving side is notified of QoS data subjected to the Block Ack technique by using an Ack Policy field in a QoS Control field of a MAC header extended for IEEE 802.11e. The Ack Policy field allows to designate the Normal ack scheme defined in IEEE 802.11, the Block Ack scheme defined in IEEE 802.11e, the No acknowledgement scheme which does not require ACK response, or the like.

Each embodiment of the present invention is directed to a communication apparatus designed to aggregate a plurality of MPDUs (MAC Protocol Data Units) in a PSDU (PHY Service Data Unit) to transmit a single PPDU (PHY Protocol Data Unit). Note that a PPDU corresponds to a physical frame (PHY frame) containing a PHY header, a PHY trailer and PSDU which contains plurality of MPDUs.

Figure 6:
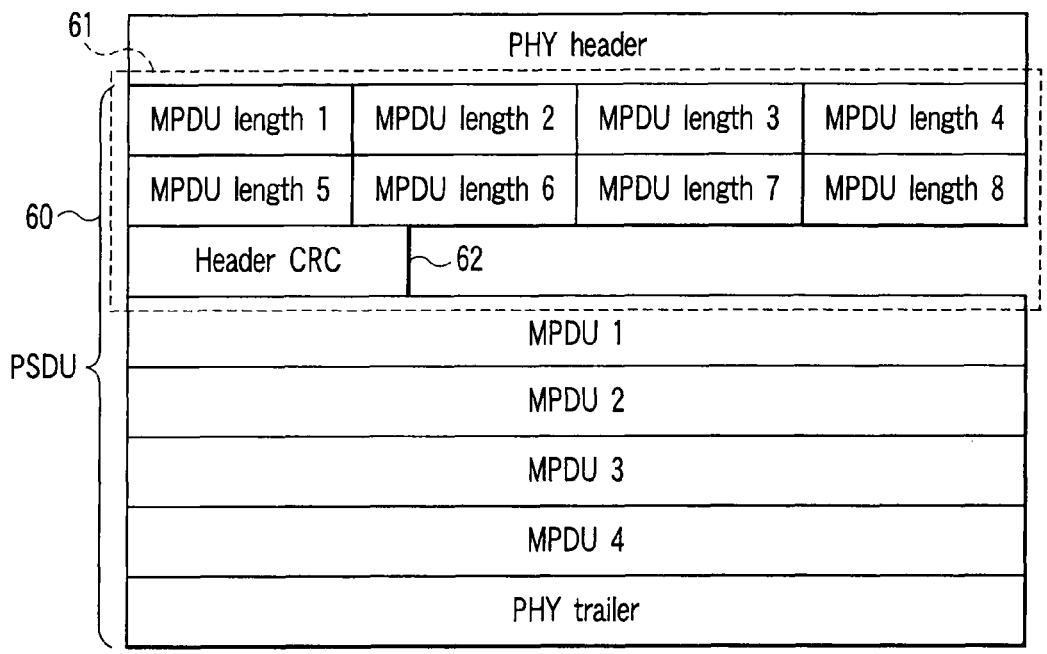
FIG. 6 is a view showing an example of the aggregation of a plurality of MPDUs.
Figure 7:
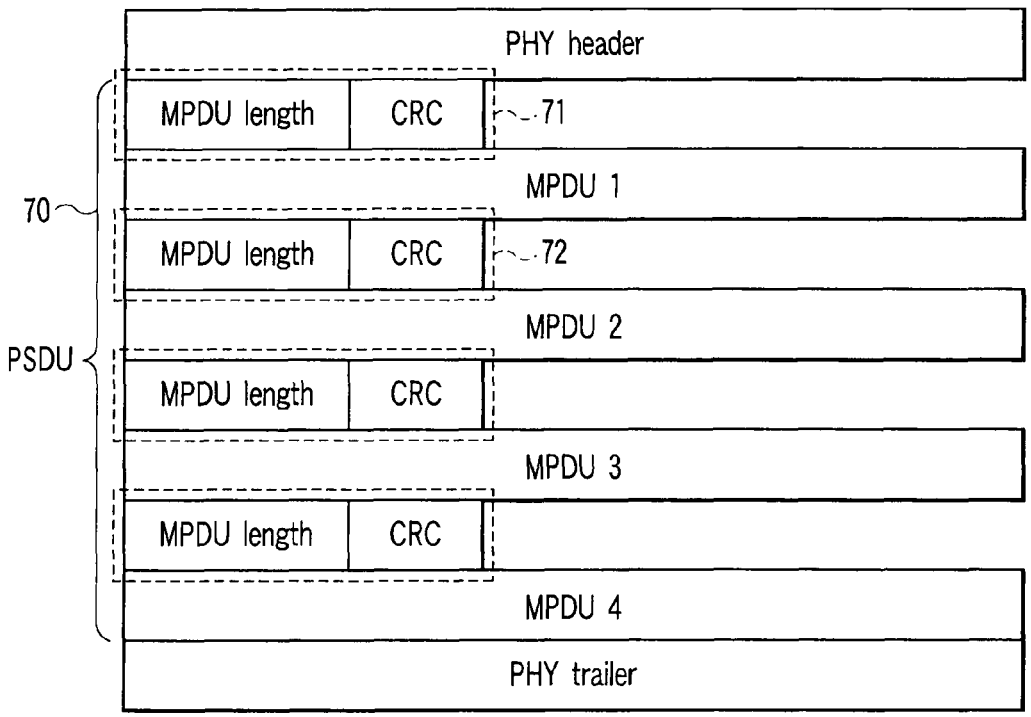
FIG. 7 is a view showing another example of the aggregation of a plurality of MPDUs.

In order to achieve a high throughput in a wireless LAN, the overhead of the MAC layer and the overhead of the PHY layer, such as a frame interval and random backoff period, must be reduced. As shown in FIGS. 6 and 7, these overheads can be reduced by transmitting a plurality of MPDUs upon aggregating them into one PSDU. In the example shown in FIG. 6, header information 61 which indicates in octets the length of each MPDU containing a MAC header to an FCS exists in the head of a PSDU 60 in which a plurality of MPDUs are aggregated. The header information 61 will be referred to as a "MAC super frame header" hereinafter. A CRC (Cyclic Redundancy Check) 62 for detecting an error in the header 61 itself is added to the MAC super frame header 61. "0" is written in an MPDU Length field corresponding to a portion in which no MPDU exists. In addition, if the CRC calculation for the MAC super frame header 61 is incorrect, the reception of all the MPDUs is regarded as failed.

Referring to FIG. 7, in the front portion of each of the aggregated MPDUs, information indicating the length of a corresponding MPDU exists. In addition, a CRC for detecting an error in the MPDU length information is added to it. A combination of MPDU length information and a CRC will be referred to as an "MPDU separation". Upon receiving a physical frame having the arrangement shown in FIG. 7, a terminal checks the CRC of an MPDU separation 71. If the first MPDU separation 71 has been successfully received, the terminal extracts succeeding MPDU and calculates an FCS. If the FCS calculation result is correct, it is determined that the MPDU has been successfully received. If the FCS calculation result is incorrect, the reception of the MPDU is regarded as failed. The terminal then checks the CRC of a next MPDU separation 72 upon skipping a portion indicated by the MPDU length of the MPDU separation 71. If the MPDU separation is incorrect, the terminal consecutively skips and performs a CRC check on an octet basis. If the result is correct, the FCS for the MPDU following the MPDU separation is calculated to determine whether or not the MPDU has been successfully received.

Figure 8:
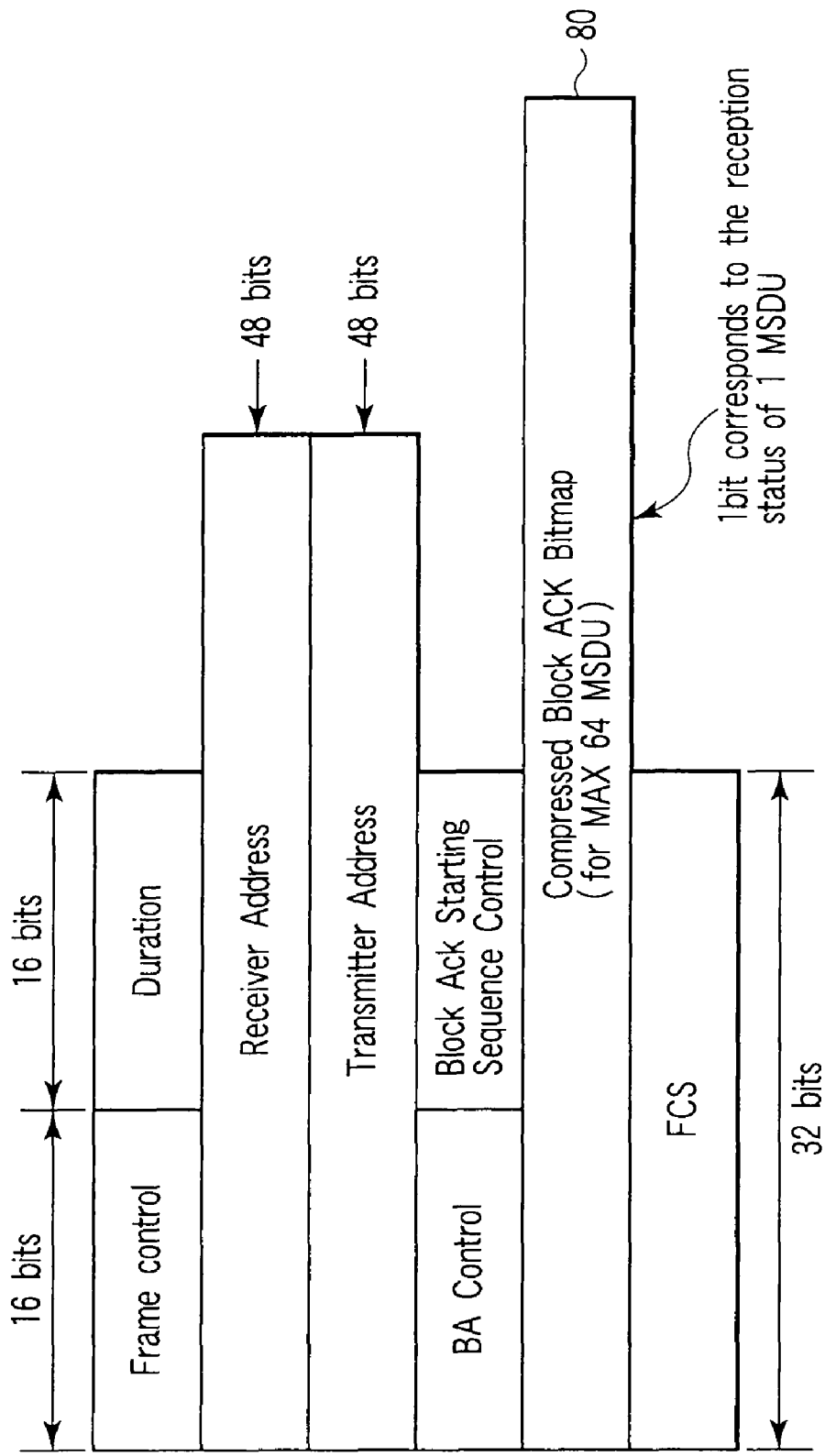
FIG. 8 is a view showing the format of a Compressed Block Ack.

Assume that, in each embodiment of the present invention, for a partial response to a physical frame in which a plurality of MPDUs are aggregated, an extended one of the Block Ack frame defined in IEEE 802.11e is used. FIG. 8 shows the frame arrangement of an extended Block Ack. According to IEEE 802.11e/Draft 10.0, a Block Ack frame has a bitmap having a fixed length of 1,024 bits in consideration of fragmentation. Since the overhead of a fragment is generally large, in order to achieve a high throughput, it is preferable not to fragment an MSDU. The extended Block Ack frame shown in FIG. 8 therefore includes a Compressed Block Ack Bitmap 80 corresponding to 64 MSDUs on the premise that no fragmentation is performed. 1 bit corresponds to the reception status of 1 MSDU. The size of the Compressed Block Ack Bitmap 80 can be reduced to 1/16 that of a conventional Block Ack frame. A Block Ack frame with the Compressed Block Ack Bitmap 80 will be referred to as a "Compressed Block Ack" hereinafter. Note that the Compressed Block Ack Bitmap 80 of a Compressed Block Ack may have a variable length in accordance with the number of MPDUs aggregated into one physical frame.

Figure 9:
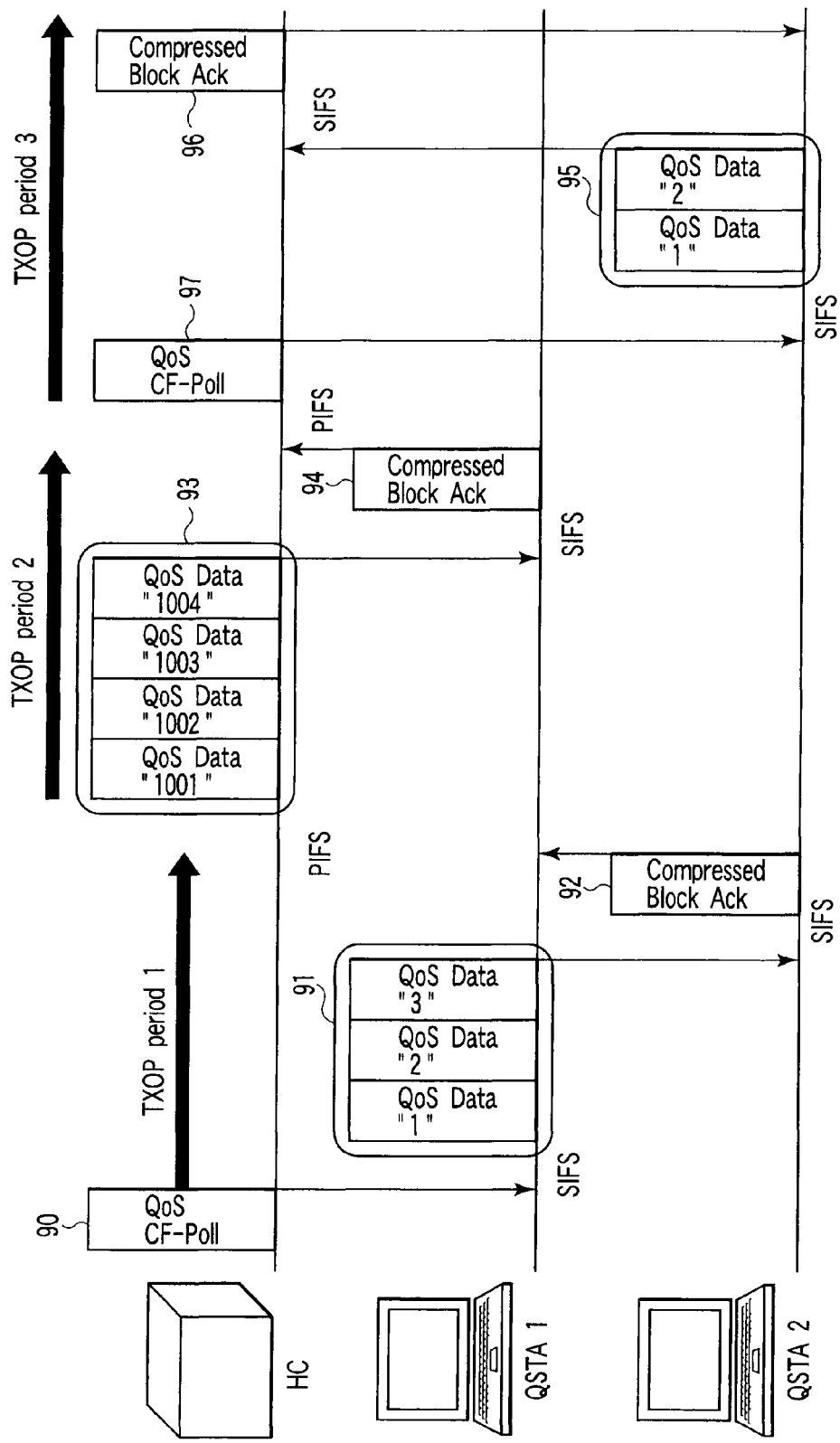
FIG. 9 is a view showing an example of a Compressed Block Ack sequence.

FIG. 9 shows an example of transmitting a plurality of MPDUs upon aggregating them. In each embodiment of the present invention, upon receiving a physical frame in which a plurality of MPDUs are aggregated, a terminal (STA and HC) returns a Compressed Block Ack to the transmission source after a lapse of a SIFS which is the minimum frame interval even if no Block Ack Request is contained in the physical frame. For example, first of all, the HC assigns TXOP period 1 to QSTA 1 by transmitting a QoS CF-Poll frame 90 to QSTA 1. In TXOP period 1, QSTA 1 transmits, to QSTA 2, a physical frame 91 in which MPDUs with sequence numbers "1" to "3" are aggregated, and QSTA 2 returns the reception statuses of the MPDUs in a physical frame 93 as a Compressed Block Ack 92 to QSTA 1 after a lapse of a SIFS. In the succeeding TXOP period 2, the HC transmits the physical frame 93 to QSTA 1, and QSTA 1 returns the reception statuses of the MPDUs in the physical frame 93 as a Compressed Block Ack 94 to the HC after a lapse of a SIFS. In TXOP period 3, the HC transmits a QoS CF-Poll frame 97 to QSTA 2 to assign TXOP period 3 to QSTA 2. QSTA 2 transmits a physical frame 95 to the HC. The HC then returns the reception statuses of the MPDUs in the physical frame 95 as a Compressed Block Ack 96 to QSTA 2 after a lapse of a SIFS. Each embodiment of the present invention allows a Compressed Block Ack to be returned even if no Block Ack Request is contained in a physical frame. This will be referred to as an "Implicit Block Ack Request" hereinafter. However, as in IEEE 802.11e/Draft 10.0, a Block Ack Request frame may be aggregated at the end of a physical frame, and the receiving side may return a Compressed Block Ack in accordance with the information indicated by the Block Ack Request frame.

The MAC efficiency can be improved by transmitting a plurality of MPDUs upon aggregating them, and performing selective repeat retransmission control using the above Compressed Block Ack (and Implicit Block Ack Request) technique.

First Embodiment

In the first embodiment of the present invention, the MAC efficiency is improved by aggregating a plurality of MPDUs and then piggybacking the MPDUs in the opposite direction on a partial response from a destination. Application methods for the immediate Block Ack and delayed Block Ack techniques defined in IEEE 802.11e/Draft 10.0 will also be described below.

More specifically, a communication apparatus according to the first embodiment piggybacks at least one data frame on a Block Ack frame in immediate Block Ack transmission. For this purpose, the initiator side of data transmission transmits a transmission permission frame, which permits a destination terminal to piggyback a plurality of data frames, upon aggregating the control frame (Block Ack Request frame, or Block Ack frame) with a data frame. Such communication apparatus of the first embodiment searches a physical frame returned from a destination, when operating as a transmitting terminal. If Block Ack frame is not contained, the apparatus determines that a timeout has occurred. When a timeout associated with a Block Ack has occurred, the receiving side selects either the method of transmitting all the previously transmitted data frames as retransmission targets in the next piggyback allowable period or the method of piggybacking a Block Ack Request.

The MAC efficiency can be improved by piggybacking a plurality of MPDUs in the opposite direction (from a destination to a transmission source) on a partial response frame from the destination. According to the IEEE 802.11e/Draft 10.0 standard, however, a destination terminal can only return a response frame to a data frame to a data transmitting terminal which has acquired a TXOP. Consider, therefore, a frame like the one having the arrangement shown in FIG. 10, which is used to give a transmission permission to the destination terminal to allow it perform piggyback transmission.

Figure 10:
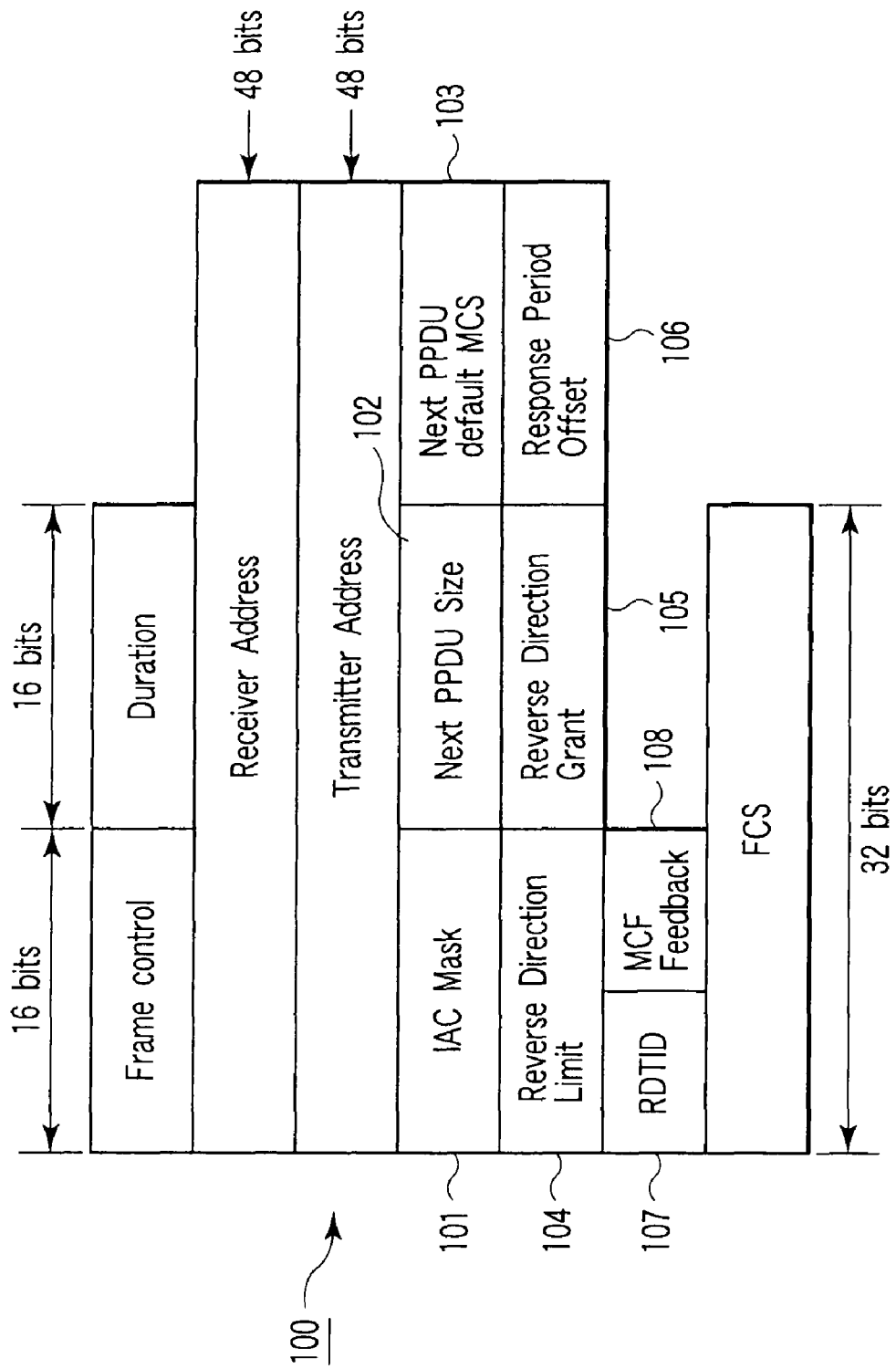
FIG. 10 is a view showing the format of an IAC (Initiator Aggregation Control) frame.

Assume that a data transmission source is regarded as an initiator terminal, and a frame 100 in FIG. 10 will be called an "IAC (Initiator Aggregation Control) frame". As shown in FIG. 10, the IAC frame 100 has the same MAC header as that defined in IEEE 802.11, which is comprised of a Frame Control field, Duration field, Receiver Address field, and Transmitter Address field.

An IAC Mask field 101 following the MAC header designates the application purpose (RTS, MIMO feedback, or piggyback transmission permission) of the IAC frame 100 with the bitmask format. A Next PPDU (PLCP Protocol Data Unit) Size 102 indicates, in octets, the length of following PPDU to be transmitted next by the transmission source. A Next PPDU Default MCS field 103 represents a physical transmission rate in the transmission of following PPDU. A Reverse Direction Limit field 104, Reverse Direction Grant field 105, and Response Period Offset 106 are provided to assign the destination terminal a transmission permission time required for piggybacking. When the destination terminal is to be assigned a transmission time for piggybacking, the transmission source terminal extracts an arbitrary period of time from the currently held TXOP period. The transmission source is not permitted to extend the assigned TXOP period itself. An RDTID (Reverse Direction Traffic Identifier) field 107 designates a TID as a piggyback target. An MCS Feedback field 108 is used to set a transmission rate in accordance with a propagation path environment (mainly used for link adaptation). A 4-octet FCS is added to the tail of the IAC frame 100 according to the IEEE 802.11 standard.

Figure 11:
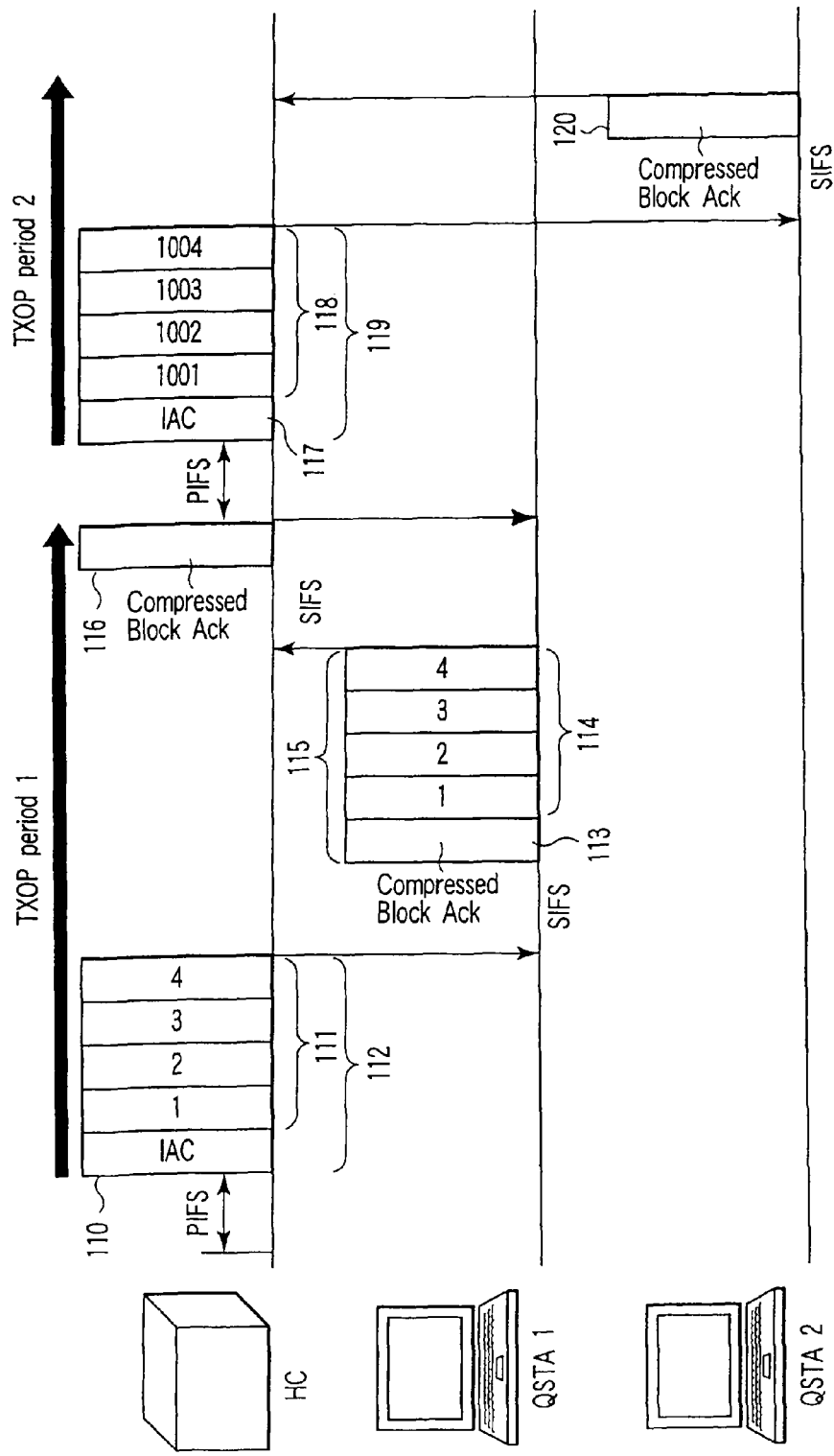
FIG. 11 is a view showing an example of piggyback transmission using IAC frames.

FIG. 11 is a view showing how a plurality of MPDUs are aggregated and a piggyback permission is given to a destination terminal when an IAC frame is to be used. The example shown in FIG. 11 is a frame sequence in the case of HCCA. However, the present invention can also be applied to EDCA (Enhanced Distributed Channel Access) which is a contention-based QoS access control scheme. Referring to FIG. 11, upon obtaining TXOP period 1, the HC transmits, to QSTA 1, a physical frame 112 in which an IAC frame 110 and a plurality of data frames 111 with sequence numbers "1" to "4" are aggregated. Upon receiving the physical frame 112, QSTA 1 returns a Compressed Block Ack 113 after a lapse of a SIFS period. Since piggyback transmission is permitted by the IAC frame 110, QSTA 1 transmits a physical frame 115 in which data 114 in the uplink direction to the HC are aggregated. The number of MPDUs which can be piggybacked on a Compressed Block Ack to the HC by QSTA 1 is determined within the range of duration indicated by Reverse Direction Limit or Reverse Direction Grant given by the HC. Reverse Direction Limit or Reverse Direction Grant is adjusted within the range of TXOP period 1 of the HC. When QSTA 1 transmits the physical frame 115 in which the Compressed Block Ack 113 and the data 114 with sequence numbers "1" to "4" in the uplink direction are aggregated, the HC returns a Compressed Block Ack 116 to QSTA 1 after a lapse of a SIFS, thereby finishing TXOP period 1. In TXOP period 2, the HC transmits, to QSTA 2, a physical frame 119 in which an IAC frame 117 and data frames 118 with sequence numbers "1001" to "1004" are aggregated. If QSTA 2 has no data in the uplink direction to the HC, i.e., data to be piggybacked, QSTA 2 returns only a Compressed Block Ack 120 to the data from the HC regardless of whether Reverse Direction Grant (or Reverse Direction Limit) is given. Referring to FIG. 11, the two TXOP periods are separated from each other by a PIFS (PCF Interframe Space).

According to the first embodiment, using an IAC frame makes it possible to intentionally permit a destination terminal to perform piggyback transmission. The MAC efficiency can be improved by causing a destination terminal which has obtained a piggyback transmission permission to perform piggyback transmission of data frames and the like.

Several sequence examples in a case wherein errors have occurred in physical frames will be described below with reference to FIGS. 12 to 23.

Figure 12:
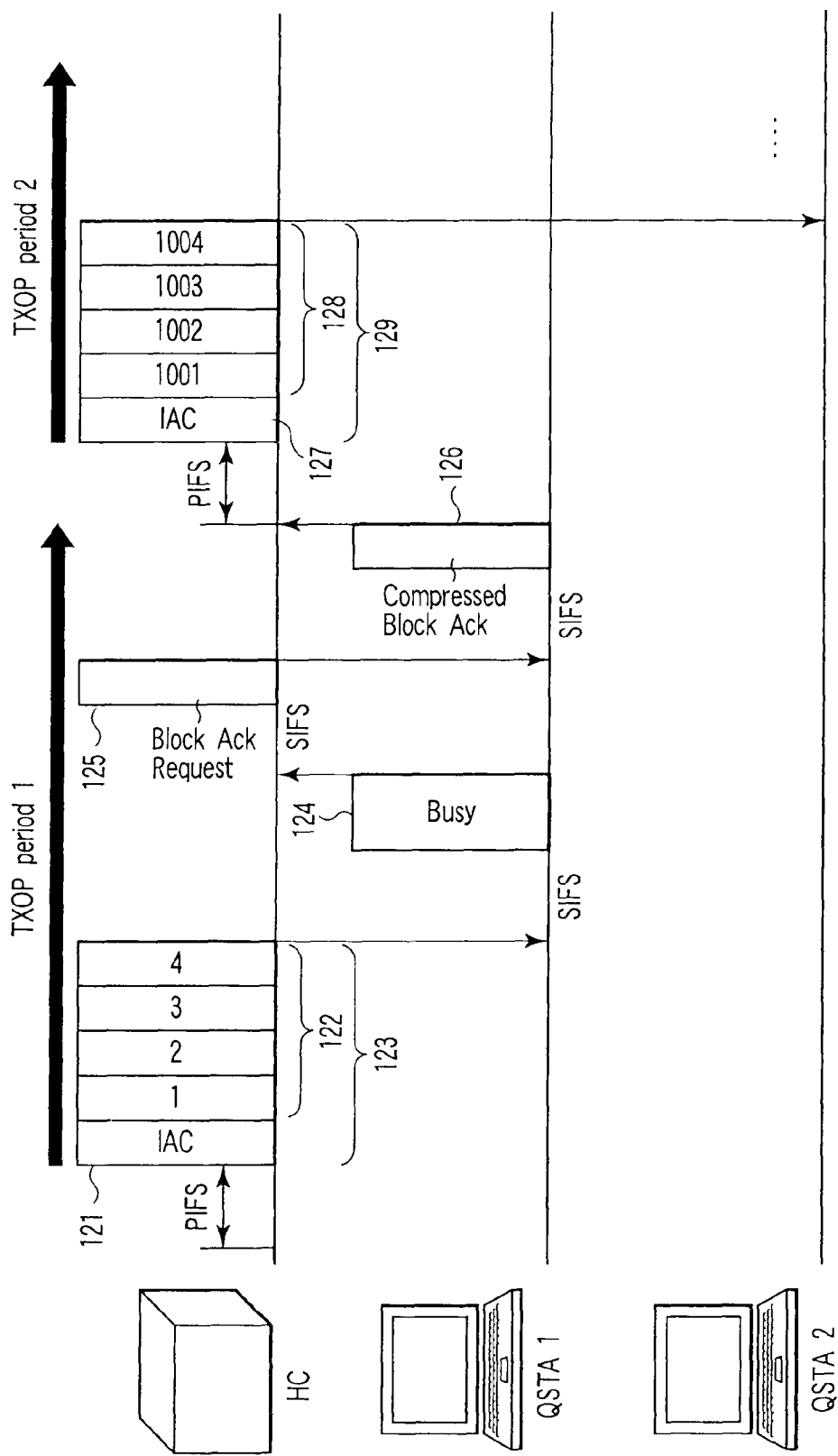
FIG. 12 is a view showing a case wherein an explicit Block Ack Request is transmitted upon occurrence of a transmission error.
Figure 13:
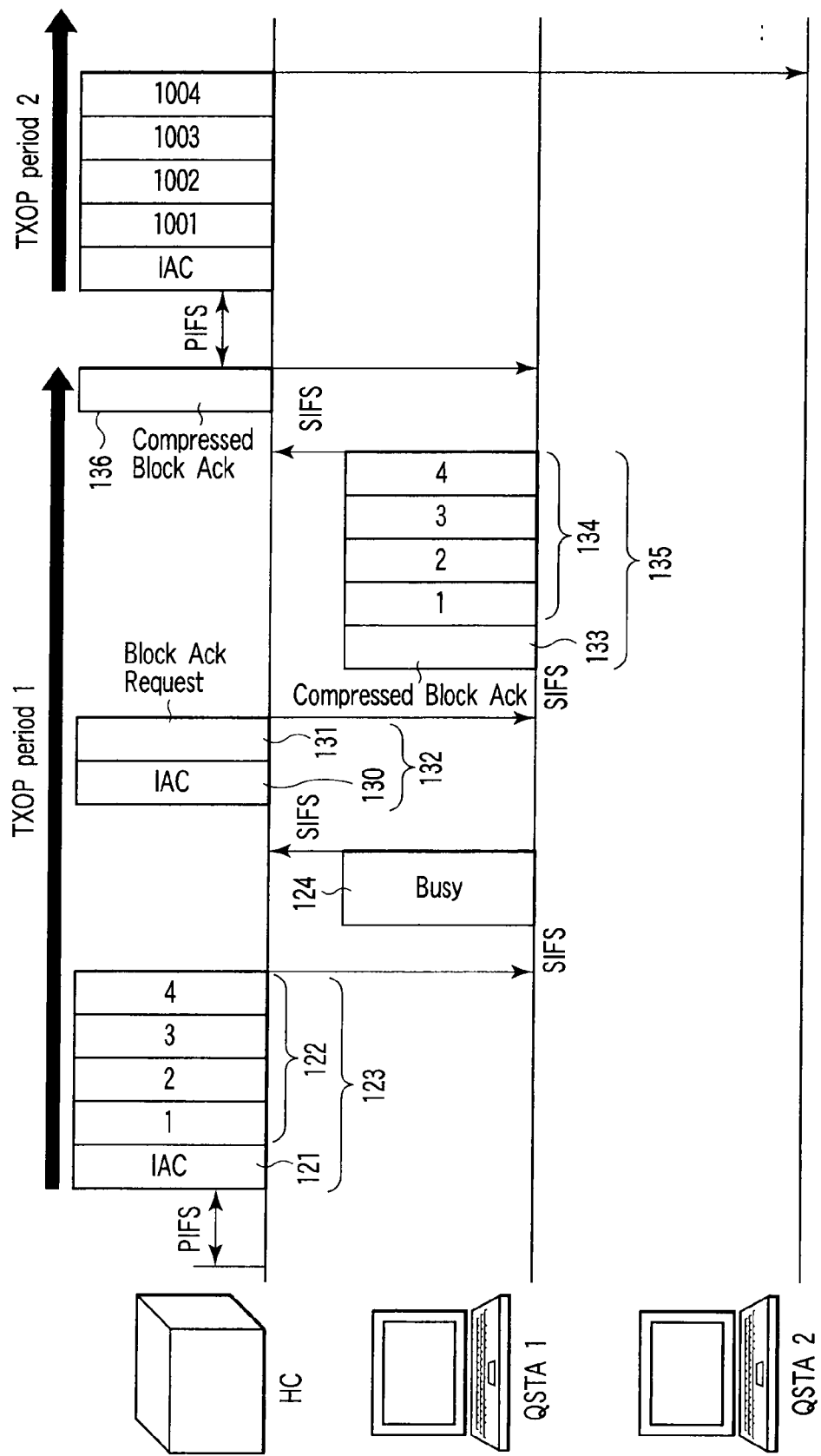
FIG. 13 is a view showing a case wherein an IAC frame is added to an explicit Block Ack Request.

FIGS. 12 and 13 each show a sequence example in a case wherein after the HC transmits, to QSTA 1, a physical frame 123 in which an IAC frame 121 and a plurality of data frames 122 with sequence numbers "1" to "4" are aggregated, a busy 124 is detected by carrier sense within a SIFS plus 1 slot time, and the FCS calculation result indicates that all the MPDUs are incorrect.

According to the IEEE 802.11 standard, when power larger than a predetermined value is detected, a wireless channel is regarded as being used (busy). According to the IEEE 802.11e/Draft 10.0 standard, when the HC detects a busy a SIFS after transmitting a QoS CF-Poll frame at the time of channel access by HCCA, and the FCS calculation result indicates that a received frame is incorrect, the HC retransmits a QoS CF-Poll frame to acquire a TXOP period again, a PIFS after the channel is set in an idle state. When the HC detects a busy after transmitting a data frame, and the FCS check indicates an error, the HC retransmits the data frame after a lapse of a SIFS. In poll frame transmission, it is unknown whether or not a TXOP period has been properly acquired by destination terminal. In data frame transmission, the transmission source has already acquired a TXOP period, and hence can transmit (or retransmit) an arbitrary frame after a lapse of a SIFS.

Assume that, in the case shown in FIGS. 12 and 13, a Compressed Block Ack (and piggybacked data) in the direction from QSTA 1 to the HC is present, and the HC determines by FCS calculation that all the MPDUs are incorrect. In this case, in the HC, a timer which counts the duration until a Compressed Block Ack is received causes a timeout. The HC detects from this timeout that no Compressed Block Ack has been received, and transmits a (explicit) Block Ack Request a SIFS after the wireless channel becomes idle. The HC can transmit this Block Ack Request because it can be interpreted that the HC is on the initiator side of piggyback transmission, and has acquired a TXOP. As the Block Ack Starting Sequence Control value of the Block Ack Request, the sequence number "1" of the first transmitted MPDU is designated. In the example shown in FIG. 12, when the HC transmits a Block Ack Request 125, an IAC frame is not aggregated in the same physical frame. For this reason, QSTA 1 only returns an acknowledgement to the data previously received from the HC by using a Compressed Block Ack 126. This is because since no IAC frame is present, QSTA 1 is not permitted to perform piggyback transmission.

When operating as a transmitting terminal, the communication apparatus according to the first embodiment determines, in accordance with the remaining period of the channel use period (i.e., the TXOP) assigned to the transmitting terminal, whether or not to transmit, to the destination terminal, a frame for permitting the terminal to return a partial response frame upon aggregating the frame and a plurality of MPDUs.

As shown in FIG. 12, when the HC receives the Compressed Block Ack 126 from QSTA 1, TXOP period 1 of the HC expires, and the next TXOP period 2 starts after a lapse of a PIFS time. In TXOP period 2, the HC transmits, to QSTA 2, a physical frame 129 in which an IAC frame 127 and data frames 128 with sequence numbers "1001" to "1004" are aggregated.

In contrast to this, in the example shown in FIG. 13, TXOP period 1 held by the HC is sufficient, and hence permits QSTA 1 to perform piggyback transmission, by transmitting a physical frame 132 in which an IAC frame 130 and Block Ack Request 131 are aggregated. Upon receiving the physical frame 132, QSTA 1 is permitted by the IAC frame 130 to perform piggyback transmission, and can transmit data frames 134 in the uplink direction to the HC by piggybacking them on a Compressed Block Ack (corresponding to the MPDUs with sequence numbers "1" to "4" which were transmitted first by the HC). The HC transmits a Compressed Block Ack 136 to the data frame 134 from QSTA 1 after a lapse of a SIFS, and then finishes TXOP period 1.

The HC can therefore selectively control permission/inhibition of piggybacking with respect to a destination terminal in accordance with the scheduling state on the side where a TXOP is acquired.

Figure 14:
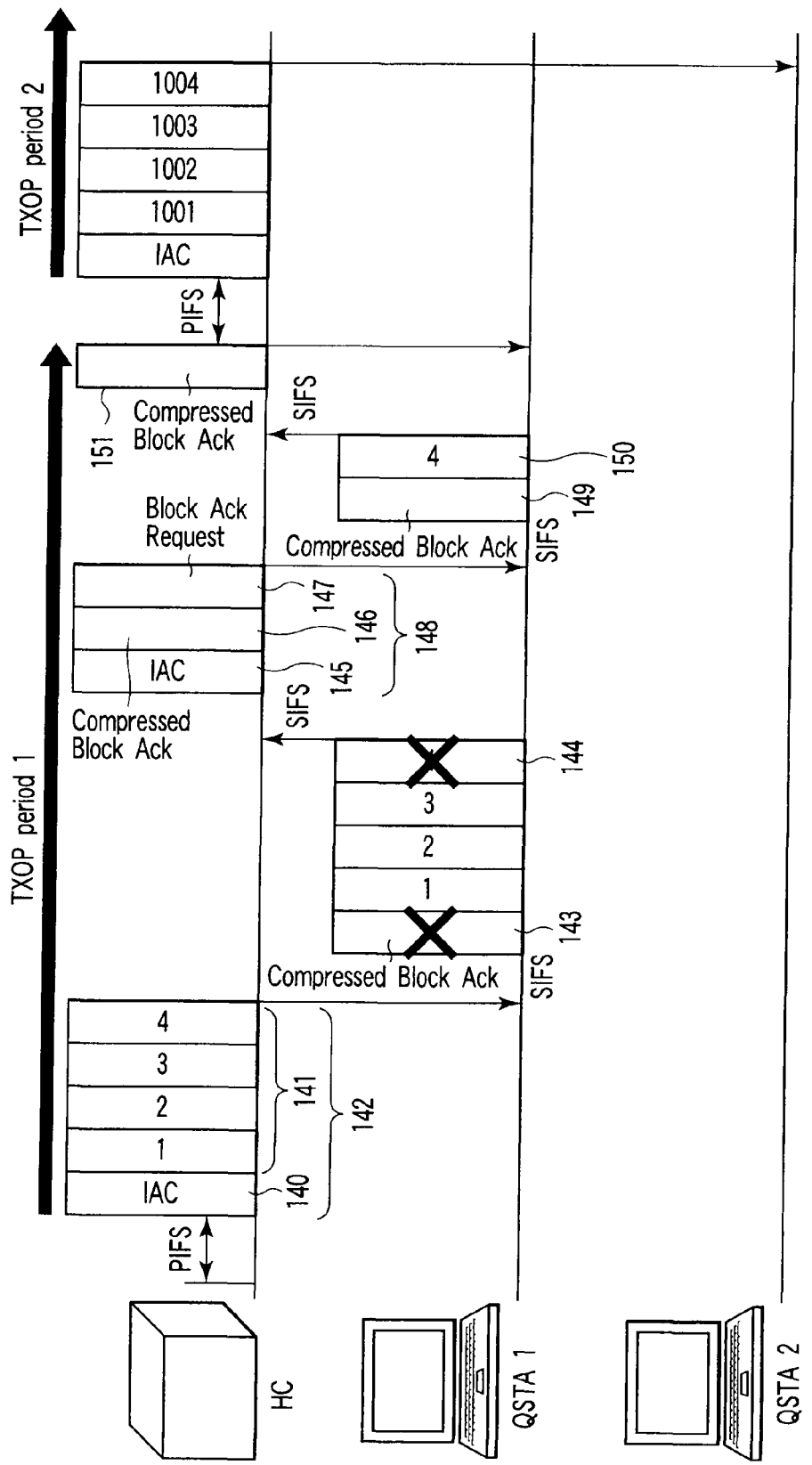
FIG. 14 is a view showing a case wherein errors have occurred in some of frames transmitted in the uplink direction.

FIG. 14 shows an example of operation to be performed when errors have occurred in some of a plurality of aggregated MPDUs upon uplink transmission from a QSTA to the HC. First of all, the HC transmits an IAC frame 140 and data frames 141 with sequence numbers "1" to "4" upon aggregating them into one physical frame 142. After a lapse of a SIFS, QSTA 1 transmits a plurality of data in the uplink direction to the HC upon piggybacking them on a Compressed Block Ack 143 to the data frames 141 from the HC. In the example shown in FIG. 14, an FCS calculation result indicates that errors have occurred in the Compressed Block Ack and an MPDU 144 with sequence number "4" from QSTA 1.

In the first embodiment, even if it is detected that the channel is busy a SIFS after a plurality of MPDUs are aggregated and transmitted, the transmitted MPDUs are regarded as retransmission targets as long as there is no normal Compressed Block Ack in the physical frame which has caused the busy state. For this reason, it is necessary to prompt the retransmission of a Block Ack from the destination by transmitting a Block Ack Request in accordance with the IEEE 802.11e/Draft 10.0 standard.

In the example shown in FIG. 14, the HC has not been able to receive a Compressed Block Ack to the MPDUs 141 with sequence numbers "1" to "4" which the HC has transmitted to QSTA 1. Within the range of TXOP period 1, therefore, the HC aggregates (piggybacks) a Block Ack Request 147 on a Compressed Block Ack 146 to QSTA 1, thereby requesting QSTA 1 to retransmit the Block Ack. In addition, the HC transmits an IAC frame 145 for giving transmission permission to QSTA 1 upon aggregating it in a single physical frame 148. After a lapse of a SIFS, QSTA 1 reflectively transmits the same contents as those of the previously transmitted Compressed Block Ack (without changing any of the contents), and piggybacks data in the uplink direction on the basis of the Reverse Direction Grant (or Reverse Direction Limit) information in the IAC frame. Referring to FIG. 14, QSTA 1 has detected by the Compressed Block Ack 146 from the HC that the transmission of a MPDU 150 with sequence number "4" has failed, and hence piggybacks the MPDU 150 as a retransmission target on a Compressed Block Ack 149 to the HC. The HC then transmits a Compressed Block Ack 151 to the MPDU 150 with sequence number "4" retransmitted from QSTA 1, thus finishing TXOP period 1.

If TXOP period 1 acquired by the HC is short, and the HC does not have time enough to prompt frame transmission from QSTA 1, the HC can finish the TXOP period by transmitting a Compressed Block Ack without aggregating a Block Ack Request nor an IAC.

In addition, the HC may detect the presence/absence of an acknowledgement frame on the basis of error detection at a specific frame position in a physical frame returned from a destination terminal. Assume that transmitting and receiving terminals have mutually recognized that a Compressed Block Ack is returned upon piggybacking of a plurality of data thereon, and the Compressed Block Ack is always aggregated in the head portion of a physical frame. In this case, if an FCS calculation result indicates an error in the first MPDU, the transmitting terminal can cause a timeout with respect to a partial response frame, i.e., can regard that the reception of a Compressed Block Ack has failed, without searching the remaining MPDUs.

When an IAC frame is aggregated in the head of a physical frame from the HC in addition to a Compressed Block Ack as in the example shown in FIG. 14, an FCS up to the second MPDU is calculated to determine whether or not the Compressed Block Ack has successfully been received. Assume that an IAC frame is always aggregated in the head of a physical frame, and a Compressed Block Ack is aggregated at the first position in the remaining portion (i.e., next to the IAC frame in the same physical frame). In this case, if an FCS calculation result on the second MPDU indicates an error, the terminal which has received the physical frame regards that the reception of the Compressed Block Ack has failed. That is, if both the transmitting and receiving terminals recognize in advance the position where a Compressed Block Ack is to be aggregated, an FCS calculation result on the corresponding portion can be used as information for determining the success/failure of the reception of the Compressed Block Ack.

Figure 16:
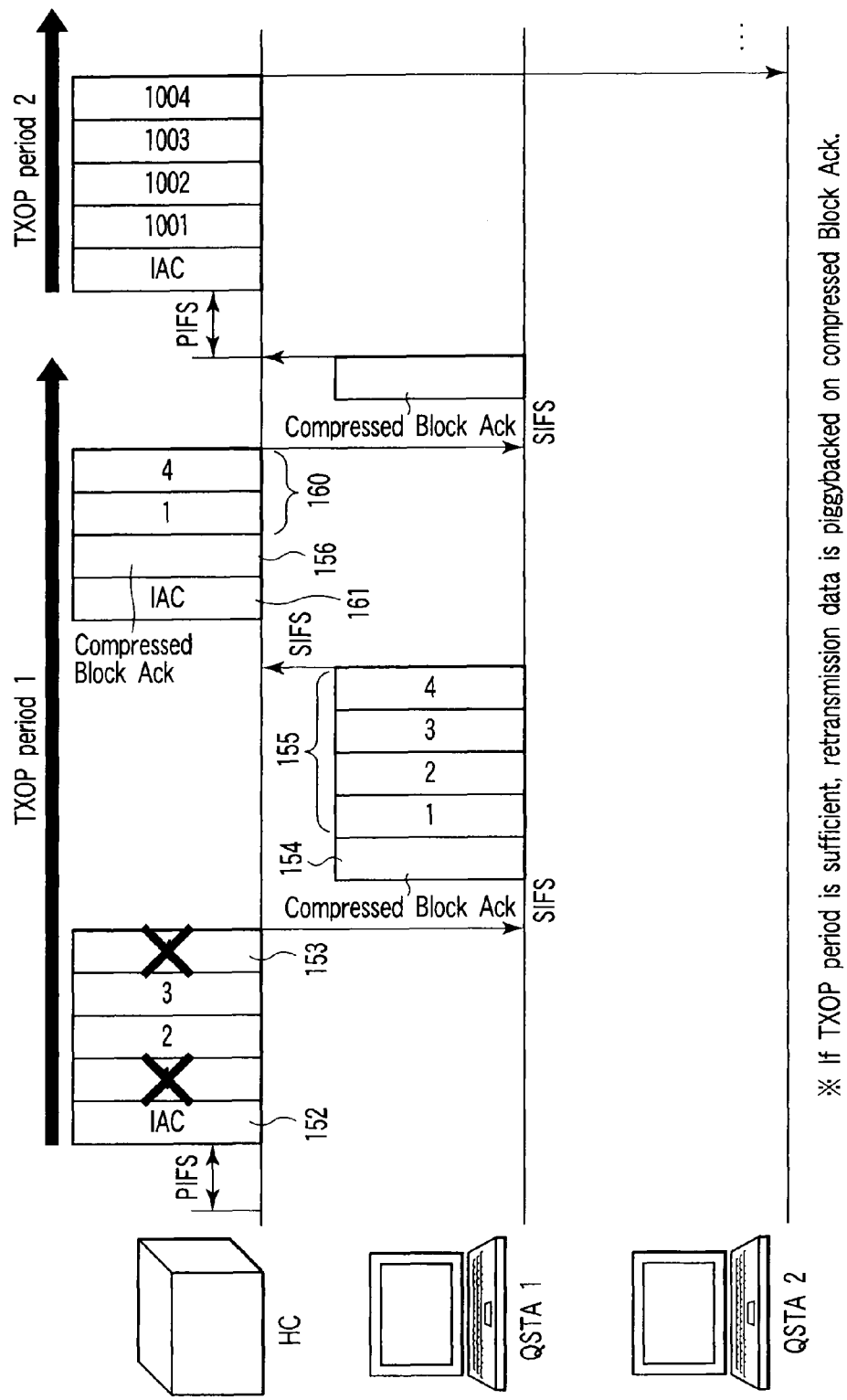
FIG. 16 is a view showing another case wherein errors have occurred in some of frames transmitted in the downlink direction.

FIGS. 15 and 16 each show an example of retransmission to be performed when errors have occurred in MPDUs in a physical frame in the downlink direction from an HC to a QSTA. Assume that the HC has transmitted an IAC frame and a plurality of MPDUs with sequence numbers "1" to "4" upon aggregating them, and errors have occurred in MPDUs 152 and 153 with sequence numbers "1" and "4". In this case, when a SIFS has elapsed since the reception of the physical frame, QSTA 1 transmits data (with sequence numbers "1" to "4") 155 in the uplink direction from QSTA 1 to the HC upon piggybacking them on a Compressed Block Ack 154 indicating that the MPDUs with sequence numbers "1" and "4" are incorrect. When a SIFS has elapsed since the reception of the physical frame from QSTA 1, the HC transmits a Compressed Block Ack 156 to the data in the uplink direction, thereby finishing TXOP period 1. If the HC detects by carrier sense during a PIFS that the wireless media is idle, the HC acquires TXOP period 2, and transmits an IAC frame 157 and data frames 158 with sequence numbers "1" and "4" as retransmission targets upon aggregating them. After a lapse of a SIFS, QSTA 1 transmits a Compressed Block Ack 159 indicating that the frames with sequence numbers "1" and "4" retransmitted by the HC have been successfully received. TXOP period 2 then expires. In this case, there is an IAC frame in the physical frame, but piggyback transmission for QSTA1 is not permitted. The HC acquires TXOP period 3, during which the HC transmits data to QSTA 2, after carrier sense in a PIFS. If TXOP period 1 assigned to the HC is sufficient as shown in FIG. 16, the HC can transmit retransmission data frames 160 in the downlink direction from the HC to QSTA 1 and an IAC frame 161, together with the Compressed Block Ack 156 to QSTA 1 to the HC, upon aggregating them. In this case, the MAC efficiency is higher than that in the example shown in FIG. 15.

Figure 17:
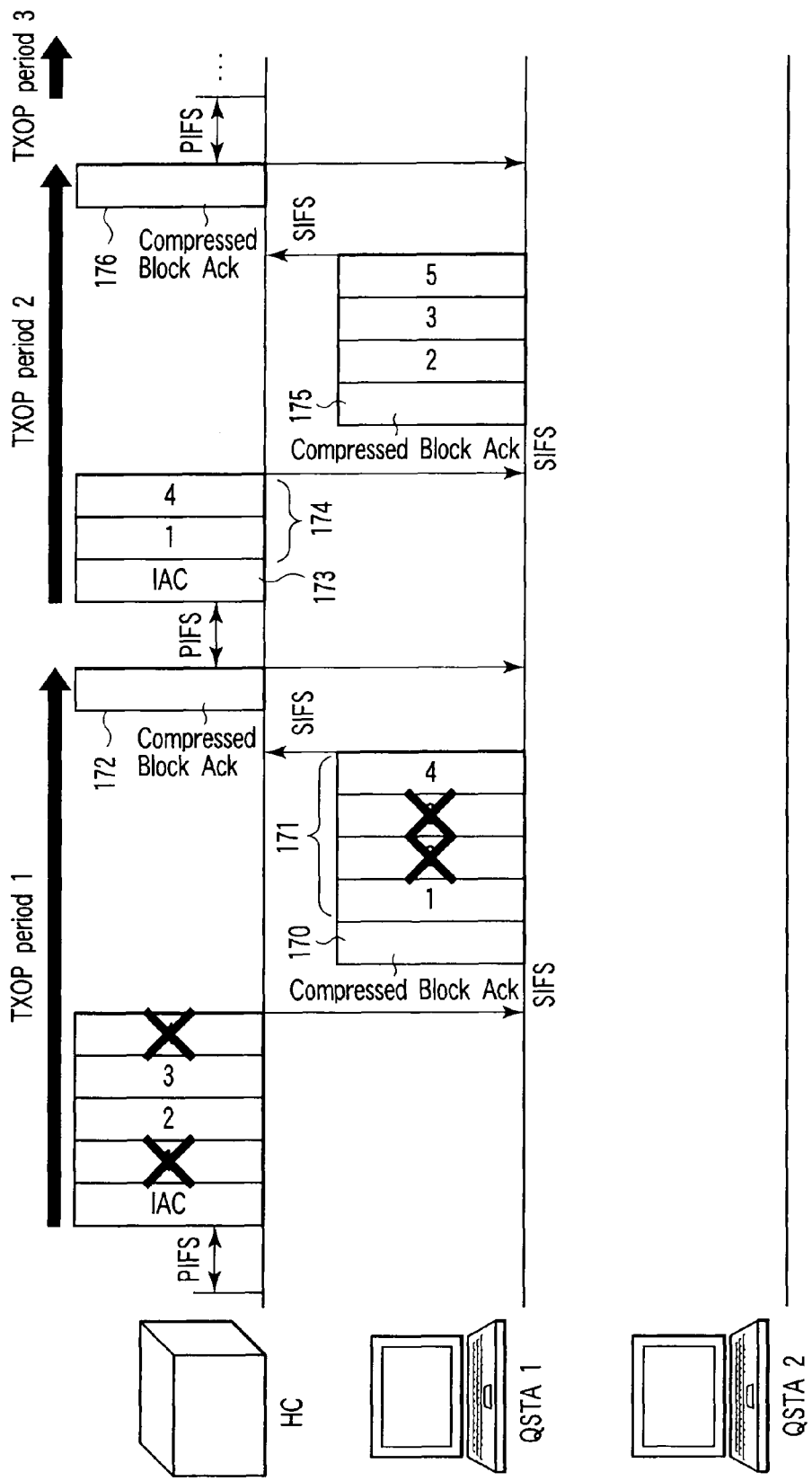
FIG. 17 is a view a case wherein errors have occurred in some of frames transmitted in both the uplink direction and the downlink direction.
Figure 18:
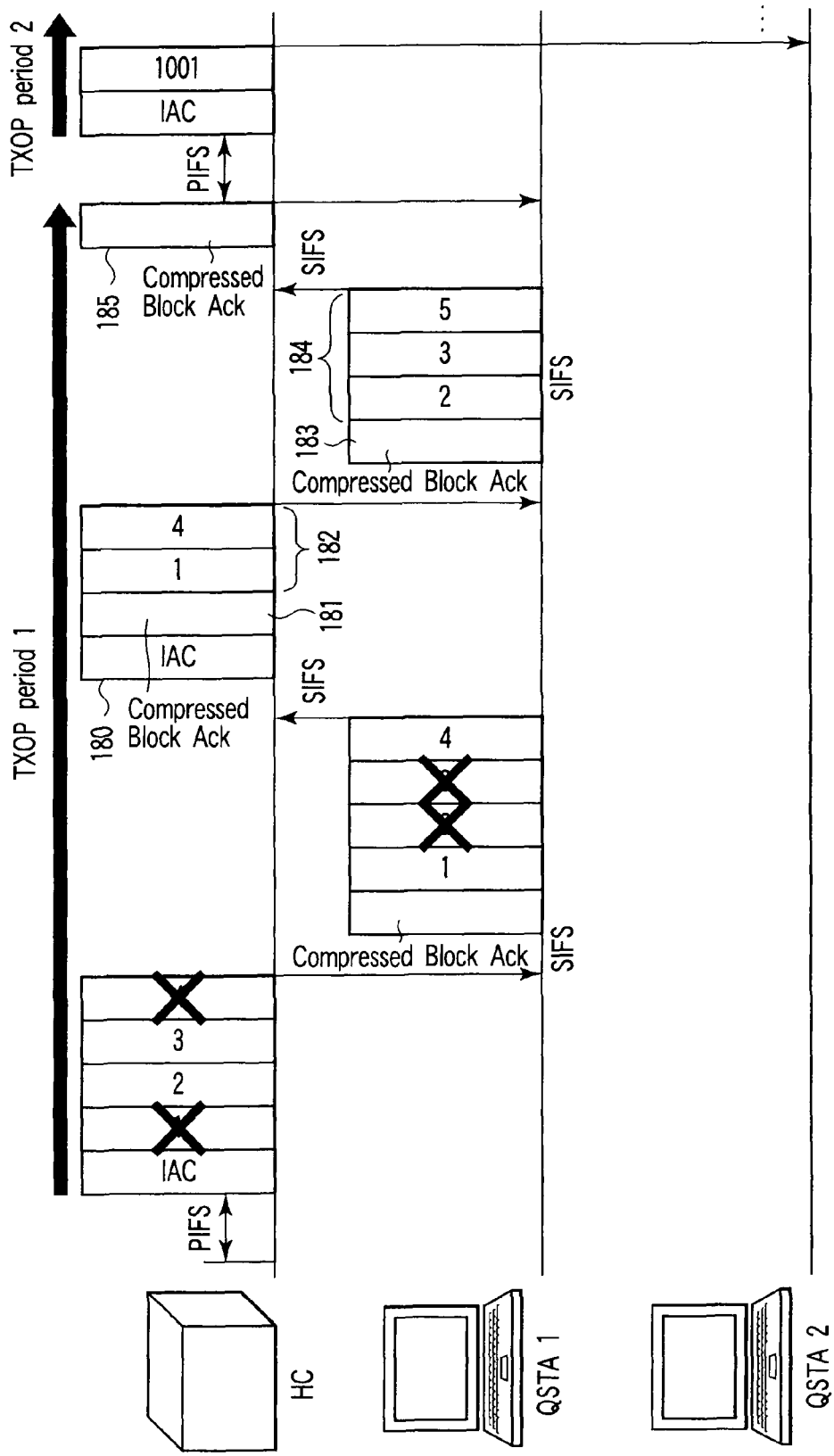
FIG. 18 is a view another case wherein errors have occurred in some of frames transmitted in both the uplink direction and the downlink direction.

FIGS. 17 and 18 each show an example of retransmission to be performed when error have occurred in MPDUs in both downlink and uplink physical frames. Referring to FIG. 17, the HC transmits an IAC frame and data frames with sequence numbers "1" to "4" in the downlink direction to QSTA 1 upon aggregating them. Assume that the data frames with sequence numbers "1" and "4" are incorrect. In this case, after a lapse of a SIFS since the reception of the physical frame from the HC, QSTA 1 transmits data frames 171 with sequence numbers "1" and "4" in the uplink direction to the HC upon piggybacking them on a Compressed Block Ack 170 to the HC. Referring to FIG. 17, an FCS calculation result indicates that errors have occurred in MPDUs of the MPDUs in the uplink direction to the HC which have sequence numbers "2" and "3".

TXOP period 1 in FIG. 17 is short, and hence the HC cannot afford to retransmit the incorrect MPDUs. Therefore, the HC finishes the TXOP by transmitting a Compressed Block Ack 172 to the data in the uplink direction from QSTA 1. Referring to FIG. 17, upon acquiring a TXOP period again (TXOP period 2) after a lapse of a PIFS, the HC transmits an IAC frame 173 and MPDUs 174 with sequence numbers "1" and "4" as retransmission targets to QSTA 1 upon aggregating them. QSTA 1 transmits an acknowledgement to the downlink data from the HC as a Compressed Block Ack 175 upon piggybacking retransmission MPDUs within the range of the transmission permission time given by the IAC frame 173. Referring to FIG. 17, QSTA 1 piggybacks a new MPDU with sequence number "5" on the Compressed Block Ack 175 to the HC, in addition to the MPDUs with sequence numbers "2" and "3" as retransmission targets. Thereafter, the HC transmits a Compressed Block Ack 176 to the data from QSTA 1, and finishes TXOP period 2.

In the example shown in FIG. 18, TXOP period 1 held by the HC is relatively long, and hence the HC transmits an IAC frame 180, a Compressed Block Ack 181, and data frames 182 with sequence numbers "1" and "4" which need to be retransmitted, upon aggregating them, after a lapse of a SIFS since the reception of the uplink data from QSTA 1. QSTA 1 transmits the MPDUs with sequence numbers "2" and "3" which need to be retransmitted and a new MPDU 184 with sequence number "5" upon piggybacking them on a Compressed Block Ack 183 to the MPDUs with sequence numbers "1" and "4". Lastly, the HC returns a Compressed Block Ack 185 to QSTA 1, and finishes TXOP period 1. In this case, if the error rate of the wireless media is high and retransmission is repeatedly executed in both the downlink and uplink directions, the fairness of data transmission may be impaired. Method of improving the retransmission quality may include setting the upper limit of the number of MPDUs which can be continuously transmitted to the total window size, setting an upper limit for the number of times of continuous transmission including retransmission, and adjusting the value of Reverse Direction Grant (or Reverse Direction Limit) of IAC.

Figure 19:
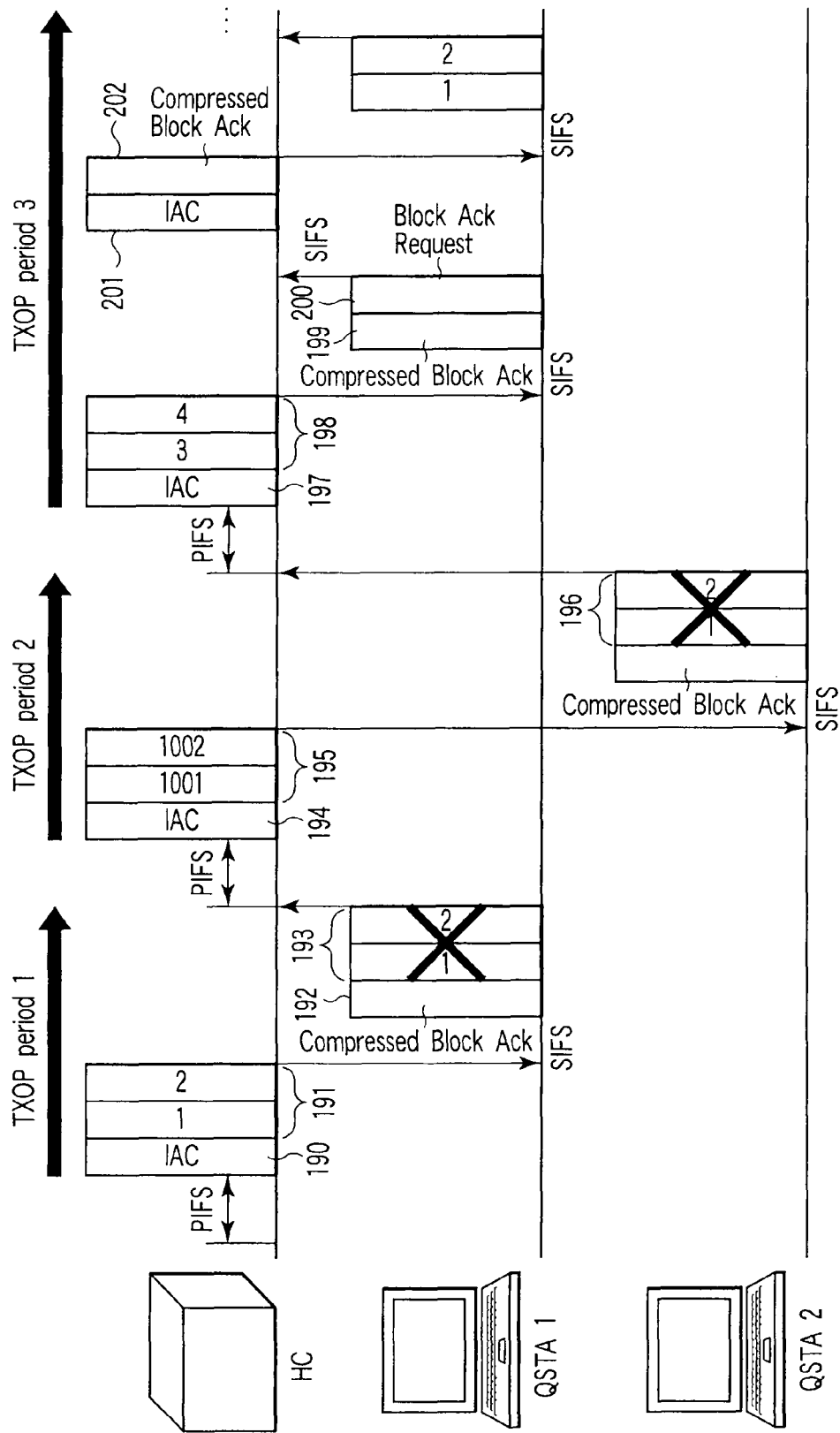
FIG. 19 is a view showing a case wherein a timeout has occurred in Compressed Block Ack transmission in the uplink direction.
Figure 20:
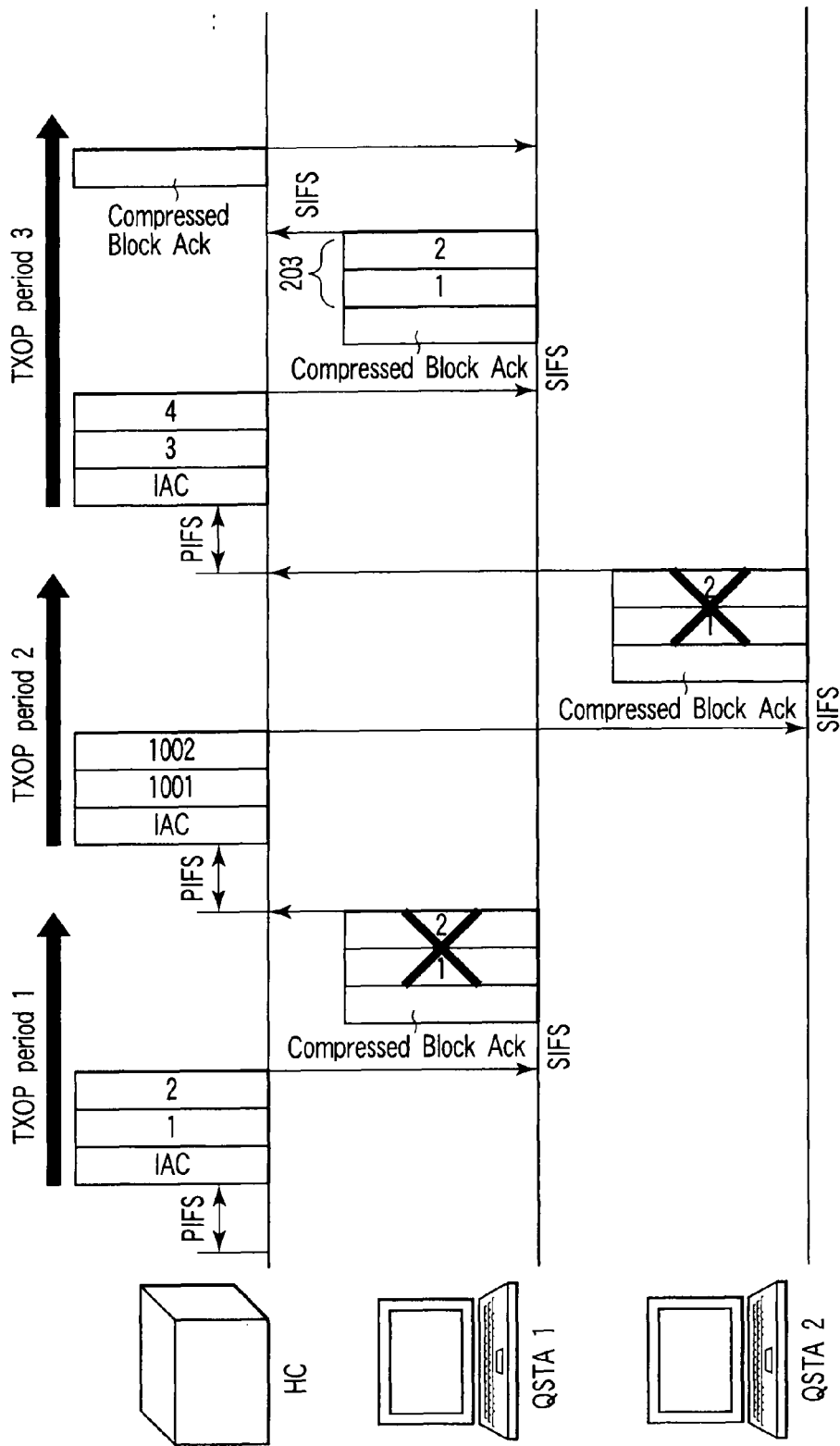
FIG. 20 is a view showing another case wherein a timeout has occurred in Compressed Block Ack transmission in the uplink direction.

FIGS. 19 and 20 each show an example of retransmission to be performed when errors have occurred in all the data in the uplink direction from a QSTA to an HC. Referring to FIG. 19, the HC transmits an IAC frame 190 and data frames 191 with sequence numbers "1" and "2" upon aggregating them. After a lapse of a SIFS, QSTA 1 transmits data frames 193 with sequence numbers "1" and "2" in the uplink direction upon piggybacking them on a Compressed Block Ack 192 for notifying the successful reception of the MPDUs. At this time, if an FCS calculation result indicates that all the data in the uplink direction from QSTA 1 to the HC are incorrect (sequence numbers "1" and "2" in FIG. 19), since the HC does not know the presence of the data from QSTA 1, the HC finishes TXOP period 1 without generating any Compressed Block Ack. According to the IEEE 802.11e/Draft 10.0, QSTA 1 transmits data frames to the HC, and then sets a timer for the reception of a response frame. If a busy is detected within an (SIFS+1 slot) time after the transmission of the physical frame, QSTA 1 resets the timer, and performs FCS calculation for each received MAC frame. This slot time is used to tolerate a physical processing error, and varies depending on physical transmission specifications. In contrast, if no busy is detected even after a lapse of an (SIFS+1 slot) time since physical frame transmission, the transmitted data frames are regarded as recovery targets. Obviously, if an FCS calculation result on a MAC frame indicates that the frame is incorrect, the transmitted data frame is regarded as a retransmission target regardless of whether a busy is detected. Referring to FIG. 19, the HC which holds TXOP period 1 receives the Compressed Block Ack 192 from QSTA 1, and acquires TXOP period 2 after a lapse of a PIFS. In TXOP period 2, the HC transmits an IAC frame 194 and data frames 195 with sequence numbers "1001" and "1002" upon aggregating them. At the start of TXOP period 2, QSTA 1 regards the MPDUs with sequence numbers "1" and "2", which have been transmitted in the uplink direction, as recovery targets. In TXOP period 2 shown in FIG. 19, since a response frame which becomes a factor for a busy state is not transmitted even after a lapse of an (SIFS+1 slot) time since the transmission of data frames 196 with sequence numbers "1" and "2" in the uplink direction from QSTA 2 to the HC, the data frames 196 are regarded as retransmission targets. The HC finishes TXOP period 2, and then acquires TXOP period 3 after a lapse of a PIFS. In TXOP period 3, the HC transmits an IAC frame 197 and data frames 198 with sequence numbers "3" and "4" to QSTA 1 upon aggregating them. The IAC frame 197 allows QSTA 1 to piggyback a Block Ack Request 200 on a Compressed Block Ack 199 to the data frames with sequence numbers "3" and "4". According to the IEEE 802.11e/Draft 10.0 standard, in performing immediate Block Ack transmission, when each QoS data with an Ack Policy Block Ack at SIFS intervals, and Block Ack frame can not be received from the destination even after a lapse of a predetermined period of time since the transmission of a Block Ack Request frame, a Block Ack Request is retransmitted. In the example shown in FIG. 19, since QSTA 1 has received no Compressed Block Ack to the data transmitted in the uplink direction to the HC, QSTA 1 piggybacks the Block Ack Request frame 200 on the Compressed Block Ack 199 to prompt the HC to transmit a Compressed Block Ack frame. After a lapse of a SIFS, the HC transmits, to QSTA 1, an IAC frame 201 and a Compressed Block Ack 202 to the Block Ack Request frame 200 upon aggregating them. Since the HC has not successfully received any MPDU of data from QSTA 1 which is located after the Block Ack Starting Sequence Control value of the Block Ack Request frame 200, all the bits of the Compressed Block Ack Bitmap of the Compressed Block Ack 202 are set to 0. When the HC transmits the IAC frame and Compressed Block Ack together, QSTA 1 recognizes the presence of the two MPDUs whose transmission has failed, and retransmits them to the HC.

As shown in FIG. 20, when a data frame transmitted from QSTA 1 to the HC needs to be recovered, QSTA 1 may directly retransmit only the data frame in the next allocated transmission period instead of transmitting a Block Ack Request. According to the IEEE 802.11e/Draft 10.0 standard, since a delay allowable time (delay bound) is provided for QoS data, when it is known from the viewpoint of scheduling that QSTA1 cannot afford to retransmit a data frame upon reception of a Compressed Block Ack from the destination, as shown in FIG. 19, a data frame 203 is directly retransmitted as shown in FIG. 20. According to this embodiment, when data frames need to be recovered, selectively transmitting a Block Ack Request or directly retransmitting all the data frames can improve the MAC efficiency as well as meet QoS requirements.

In addition, this embodiment can be implemented not only by the method of performing recovery processing when an HC gives a piggyback permission to a QSTA as shown in FIG. 19 but also by a method of performing recovery processing at the first of the acquisition of a TXOP in an EDCA period or at the beginning of the acquisition of a TXOP by a QoS CF-Poll from the HC. In the first embodiment of the present invention, the HC performs bandwidth management including the allocation of TXOPs to QSTAs. Obviously, however, the piggyback technique can also applied to a case wherein QSTA 1 is to completely acquire a TXOP and arbitrarily transmit an arbitrary MAC frame within the period.

In TXOP period 3 in FIG. 19, the HC aggregates, for QSTA 1, the IAC frame 201 with the Compressed Block Ack 202. When the HC holds a TXOP, the HC also serves as an entity which performs scheduling for piggybacking. When QSTA 1 is preferably made to immediately retransmit a data frame from the viewpoint of a delay allowable time (delay bound), the IAC frame 201 is aggregated with the Compressed Block Ack 202 as in the example shown in FIG. 19. In the example shown in FIG. 19, since all the bits of the Compressed Block Ack Bitmap of the Compressed Block Ack 202 to QSTA 1 are 0, the HC recognizes that QSTA 1 needs to perform retransmission processing. In this case, the HC also recognizes that the QSTA needs to perform retransmission, when bits representing a reception failure and reception success are alternately arranged in the Compressed Block Ack Bitmap of a Compressed Block Ack to a QSTA, or when the Block Ack Starting Sequence Control value of a Block Ack Request is different from that of a Compressed Block Ack (on the data transmitting side, all MPDUs with lower sequence numbers than the Block Ack Starting Sequence Control value of the Compressed Block Ack are regarded as those whose transmission has failed). In this case, the HC transmits an IAC frame for permitting a QSTA to perform piggybacking in accordance with the determination made by the scheduler device of the HC. Alternatively, since Reverse Direction Grant (or Reverse Direction Limit) designated by an IAC frame need not be completely consumed on the QSTA side, an IAC frame may be transmitted in advance to the QSTA to give it a margin for retransmission by piggybacking.

Figure 21:
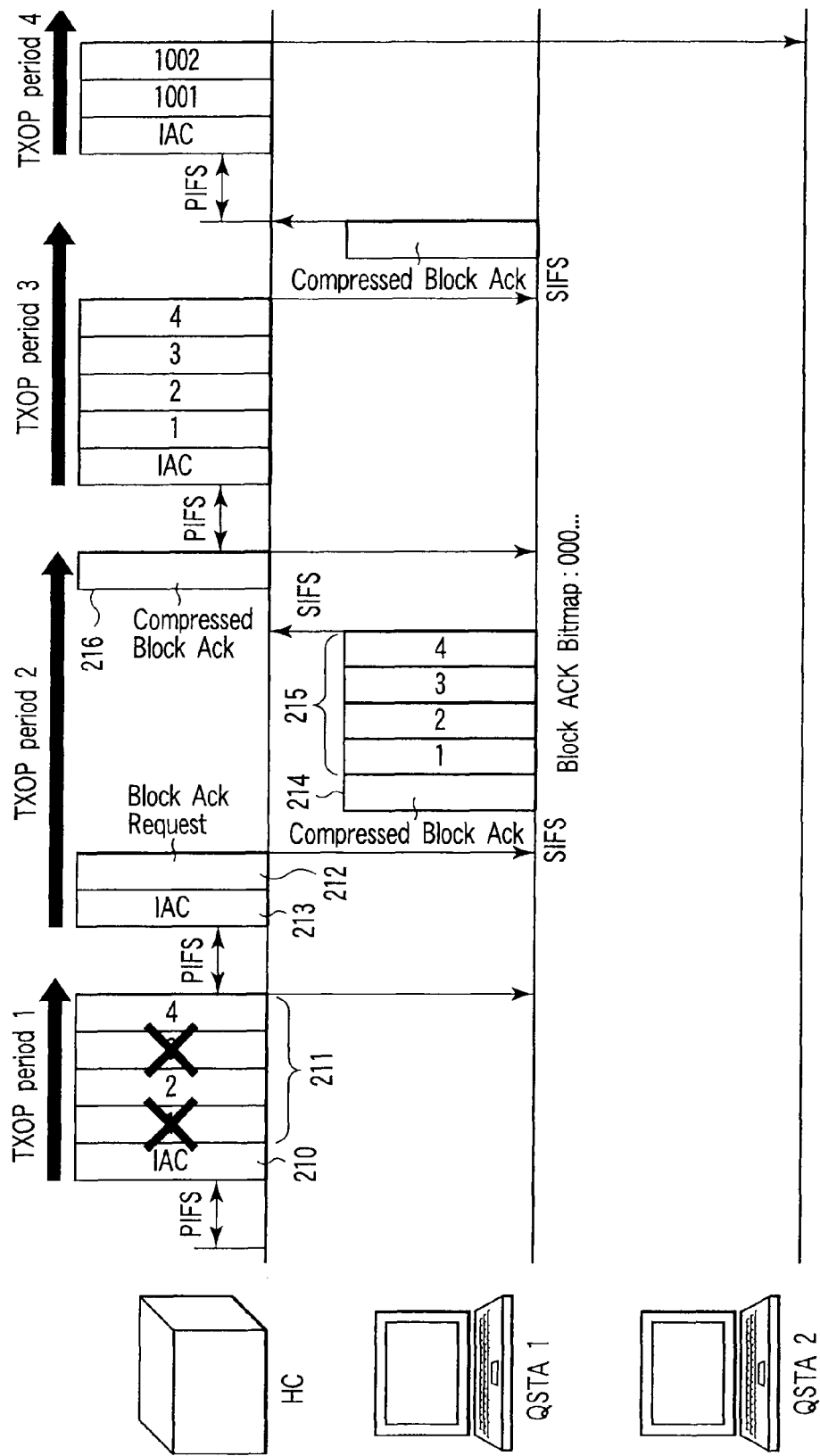
FIG. 21 is a view showing a case wherein errors have occurred in all MPDUs aggregated and transmitted in the downlink direction from an HC.
Figure 22:
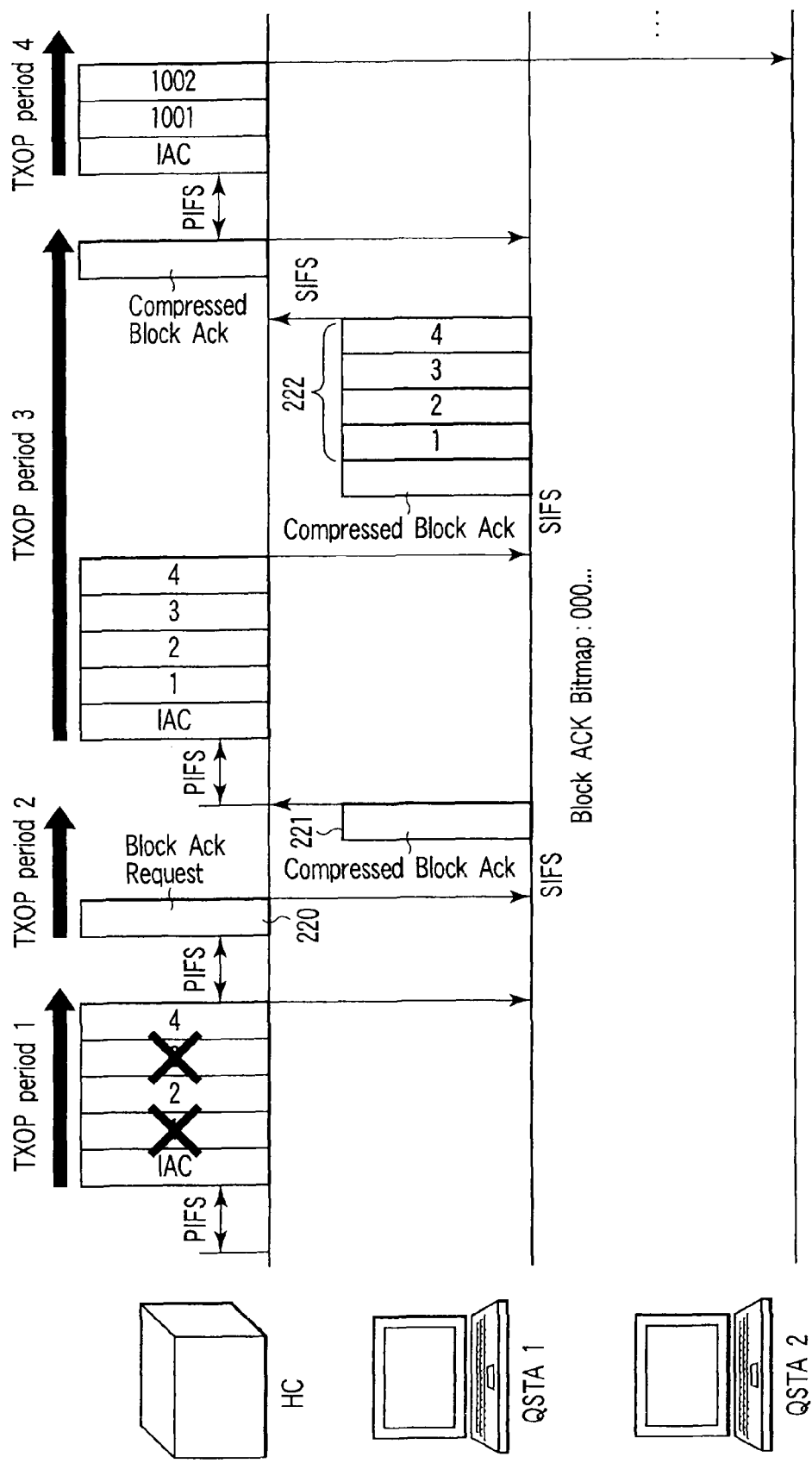
FIG. 22 is a view showing another case wherein errors have occurred in all MPDUs aggregated and transmitted in the downlink direction from an HC.

FIGS. 21 and 22 each show an example of retransmission to be performed when errors have occurred in all the MPDUs aggregated and transmitted from an HC through a downlink. Referring to FIG. 21, the HC transmits an IAC frame 210 and data frames 211 with sequence numbers "1" to "4" to QSTA 1 upon aggregating them. Assume that errors have occurred in all the MPDUs including the IAC frame due to collision on a wireless channel or a high bit error rate. In this case, QSTA 1 cannot understand the MPDUs in the physical frame transmitted by the HC at all, and cannot determine whether or not the frame contains any MPDU addressed to itself. For this reason, even if the HC transmits an IAC frame, QSTA 1 transmits no data in the uplink direction. According to the IEEE 802.11e/Draft 10.0 standard, in performing channel access by HCCA, when no response is returned from a destination after an HC transmits the first frame (data or QoS CF-Poll) in a given TXOP period, the HC needs to transmit a frame again after performing carrier sense in a PIFS. In the example shown in FIG. 21, therefore, the HC acquires TXOP period 2 after a lapse of a PIFS, and transmits a Block Ack Request 212 to make a QSTA set a NAV. In addition, in the example shown in FIG. 21, an IAC frame 213 is aggregated with the Block Ack Request 212. With this operation, QSTA 1 piggybacks a plurality of data 215 in the uplink direction to the HC on a Compressed Block Ack frame 214 to the MPDUs with sequence numbers "1" to "4" which QSTA 1 has failed to receive in TXOP period 1. Referring to FIG. 21, the HC finishes TXOP period 2 by transmitting a Compressed Block Ack 216 to QSTA 1. Also, the Compressed Block Ack Bitmap of the Compressed Block Ack frame 214 which is transmitted by QSTA 1 to the HC in TXOP period 2 is filled with 0s to express that QSTA 1 has failed to receive all the MPDUs. Alternatively, as in the example shown in FIG. 22, if all the data transmitted from the HC through the downlink are incorrect, only a Block Ack Request 220 is transmitted after a lapse of a PIFS. Since the Block Ack Request 220 has no IAC frame aggregated, QSTA 1 only transmits a Compressed Block Ack 221. The HC retransmits data frames 222 with sequence numbers "1" to "4" in TXOP period 3 acquired by the HC. That is, the retransmission timing of downlink data can be quickened as compared with the example shown in FIG. 21. Therefore, the scheduling processing unit of the HC can improve the MAC efficiency by determining whether or not to transmit an IAC frame to the QSTA, in consideration of a delay allowable time (delay bound) and the like.

In the first embodiment of the present invention, upon receiving a physical frame in which a plurality of data are aggregated without any Block Ack Request, a terminal returns reception statuses of the MPDUs as a Compressed Block Ack after a lapse of a SIFS. The present invention can also be applied to even a case wherein a physical frame in which a plurality of data are aggregated contains a Block Ack Request at the end as shown in FIG. 23. Although the basic operation without using Implicit Block Ack Request like FIG. 9 is the same as that in the case wherein a physical frame contains no Block Ack Request, a retransmission example in this case will be described with reference to FIG. 23.

Referring to FIG. 23, upon acquiring TXOP period 1, the HC transmits an IAC frame 230, a plurality of data 231 with sequence numbers "1" to "4", and a Block Ack Request frame 232 with a Block Ack Starting Sequence Control value of "1" upon aggregating them. Assume that at this point of time, QSTA 1 has not successfully received the data 231 with sequence numbers "1" and "4" and the Block Ack Request frame 232. Since QSTA 1 has not received any Block Ack Request from the HC, QSTA 1 cannot transmit any Compressed Block Ack. However, QSTA 1 stores in advance reception information such as the Block Ack Starting Sequence Control value "2" and the Compressed Block Ack Bitmap "110 . . . " as the reception status of one physical frame in the past. In TXOP period 1, QSTA 1 transmits data frames 233 with sequence numbers "1" to "3" and a Block Ack Request 234 with a Block Ack Starting Sequence Control value of "1" upon aggregating them. In this case, if the HC does not successfully receive the Block Ack Request 234, the HC returns no Compressed Block Ack. If the data frame transmitting side detects a busy within an (SIFS+1 slot) time, but there is no Compressed Block Ack frame addressed to itself in the received physical frame, the transmitted frames are regarded as retransmission targets. The HC transmits an IAC frame 235 and a Block Ack Request frame 236 for prompting QSTA 1 to retransmit the Compressed Block Ack upon aggregating them. QSTA 1 transmits a Block Ack Request frame 238 to the HC upon piggybacking it on a Compressed Block Ack 237 indicating that the MPDUs with sequence numbers "1" and "4" are incorrect. The HC then transmits an IAC frame 239, a Compressed Block Ack 240 to the Block Ack Request from QSTA 1, MPDUs 241 with sequence numbers "1" and "4" for retransmission, and a Block Ack Request frame 242 upon aggregating them. At the end of TXOP period 1, QSTA 1 transmits a Compressed Block Ack 243 as an acknowledgement. If piggybacking is permitted by an IAC frame and data to be transmitted to the HC exists in a transmission queue, the data is also transmitted together. As described above, whether or not to permit QSTA 1 to perform piggybacking is determined in accordance with determination made by the scheduling processing device of the HC.

According to the first embodiment of the present invention, the MAC efficiency can be improved by transmitting a plurality of MPDUs upon aggregating them and transmitting data in the opposite direction upon piggybacking it on a partial response frame from the destination. This embodiment has been described mainly on the basis of HCCA which is a contention-free QoS access control scheme. Obviously, however, the present invention can also be applied to contention-based EDCA. In the case of EDCA, a terminal which has acquired a TXOP serves as an entity of scheduling and adjusts the amount of frames piggybacked and transmitted from a destination terminal by using an IAC frame. In the case of HCCA as well, a QSTA which has acquired a TXOP upon receiving a QoS CF-Poll frame from an HC permits a destination terminal to perform piggyback transmission by suing an IAC frame. These scheduling operations depend on the delay allowable time (delay bound) and the like represented by QoS data.

Second Embodiment

The second embodiment of the present invention is directed to delayed Block Ack transmission, in which a Normal acknowledgement frame for allowing the transmission of a Block Ack to be postponed is replaced with the IAC frame described in the first embodiment. More specifically, a communication apparatus according to the second embodiment of the present invention transmits a plurality of data frames and then uses an IAC frame from a destination terminal to another destination in place of a Normal acknowledgement to a delayed Block Ack. After a lapse of a predetermined period of time, the destination terminal transmits the Block Ack frame and a plurality of data upon aggregating them.

According to IEEE 802.11e/Draft 10.0, if it is difficult to return a Block Ack frame a SIFS after the reception of a Block Ack Request frame, a delayed Block Ack like the one shown in FIG. 5 can be used. According to the delayed Block Ack technique, first of all, an Ack response (Normal acknowledgement) to a Block Ack Request is returned. After a lapse of an arbitrary period of time, a Block Ack frame is transmitted, and an Ack response (Normal acknowledgement) to the frame is returned. In the delayed Block Ack technique, if Normal acknowledgement frame can not be received after a lapse of a predetermined period of time since the transmission of a Block Ack Request or Block Ack, the transmission of the corresponding frames is regarded as failed. The second embodiment of the present invention is directed to piggyback transmission using the delayed Block Ack technique.

Figure 24:
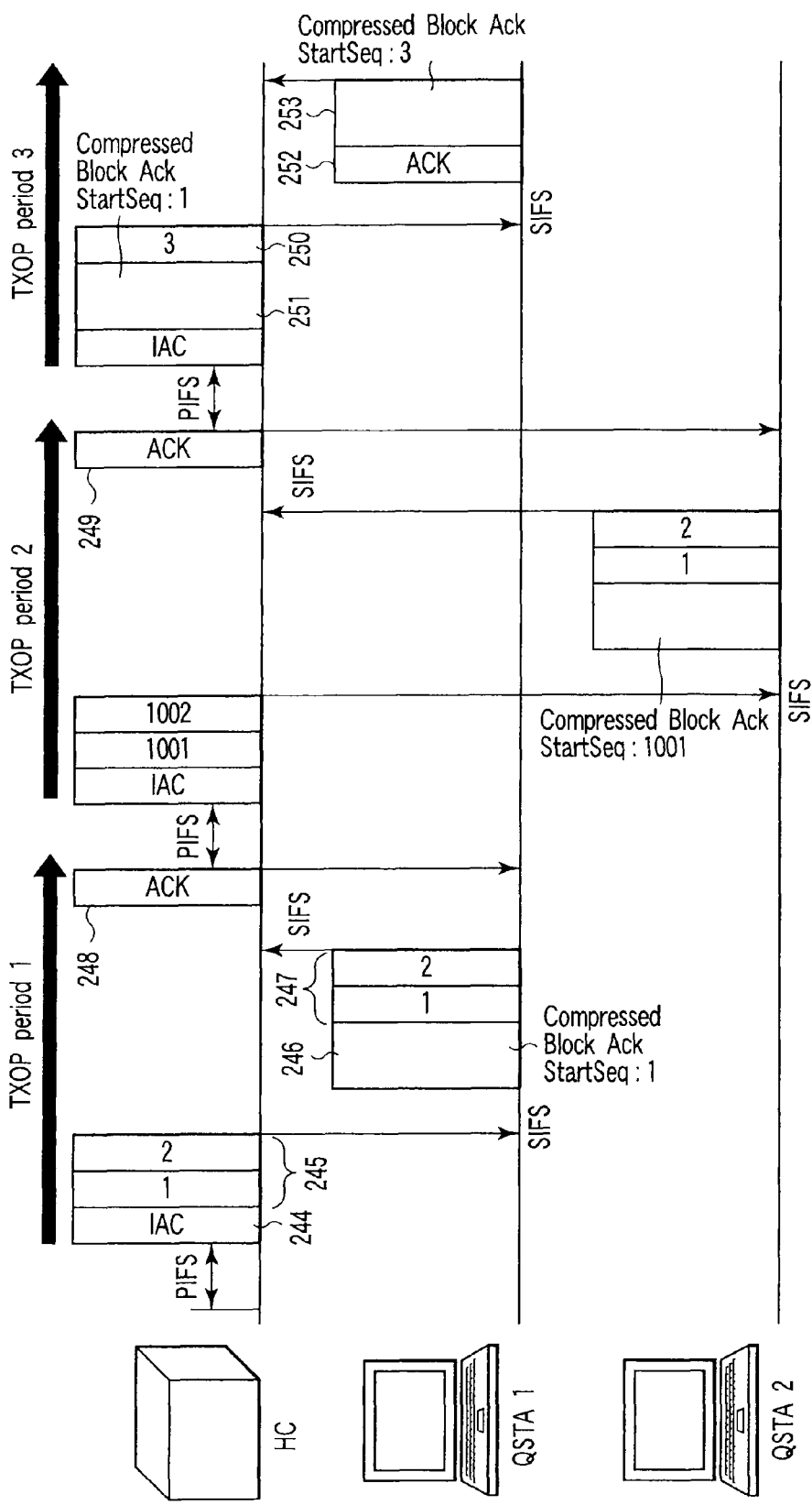
FIG. 24 is a view showing how frames are exchanged when piggybacking is performed by using the delayed Block Ack Policy.

FIG. 24 shows how frames are exchanged when piggybacking described in the second embodiment of the present invention is performed by using the conventional delayed Block Ack Policy defined in IEEE 802.11e. Referring to FIG. 24, upon acquiring TXOP period 1, the HC transmits an IAC frame 244 and data frames 245 with sequence numbers "1" and "2" upon aggregating them. QSTA 1 transmits data 247 in the uplink direction upon piggybacking it on a Compressed Block Ack 246 to the data frames 245 from the HC within the period assigned by the IAC frame 244. In this case, when the delayed Block Ack Policy is to be used for a response from the HC, the HC transmits a Normal acknowledgement frame 248 defined in IEEE 802.11 to notify the reception of the delayed Block Ack procedure. When the QSTA 1 cannot successfully receive a Normal acknowledgement frame due to an error, QSTA 1 regards the data frame (or a Block Ack Request frame) as a retransmission target. In TXOP period 2 in FIG. 24, as in the case of TXOP period 1, when the delayed policy is used for a Compressed Block Ack from the HC to QSTA 2, the TXOP expires after a Normal acknowledgement 249 is transmitted to QSTA 2. In TXOP period 3, the HC transmits, to QSTA 1, a data frame 250 with sequence number "3" in the downlink direction and a Compressed Block Ack 251 with a Block Ack Starting Sequence Control value of "1" whose transmission is delayed in TXOP period 1 upon aggregating them, and QSTA 1 transmits a Normal acknowledgement frame 252, thereby completing one delayed Block Ack sequence. In TXOP period 3 in FIG. 24, a Compressed Block Ack 253 with a Block Ack Starting Sequence Control value of "3" to the downlink data from the HC is piggybacked on the Normal acknowledgement frame 252. When piggybacking is to be performed by using the delayed Block Ack technique in the above manner, the MAC efficiency inevitably decreases due to the use of the Ack frame defined in IEEE 802.11. The second embodiment of the present invention therefore realizes a mechanism for solving such a problem. Although a case wherein the delayed Block Ack Policy is mainly applied to the transmission of a Compressed Block Ack from an HC to a QSTA will be mainly described, it is obvious that the present invention can be applied to both uplink transmission and downlink transmission.

Figure 25:
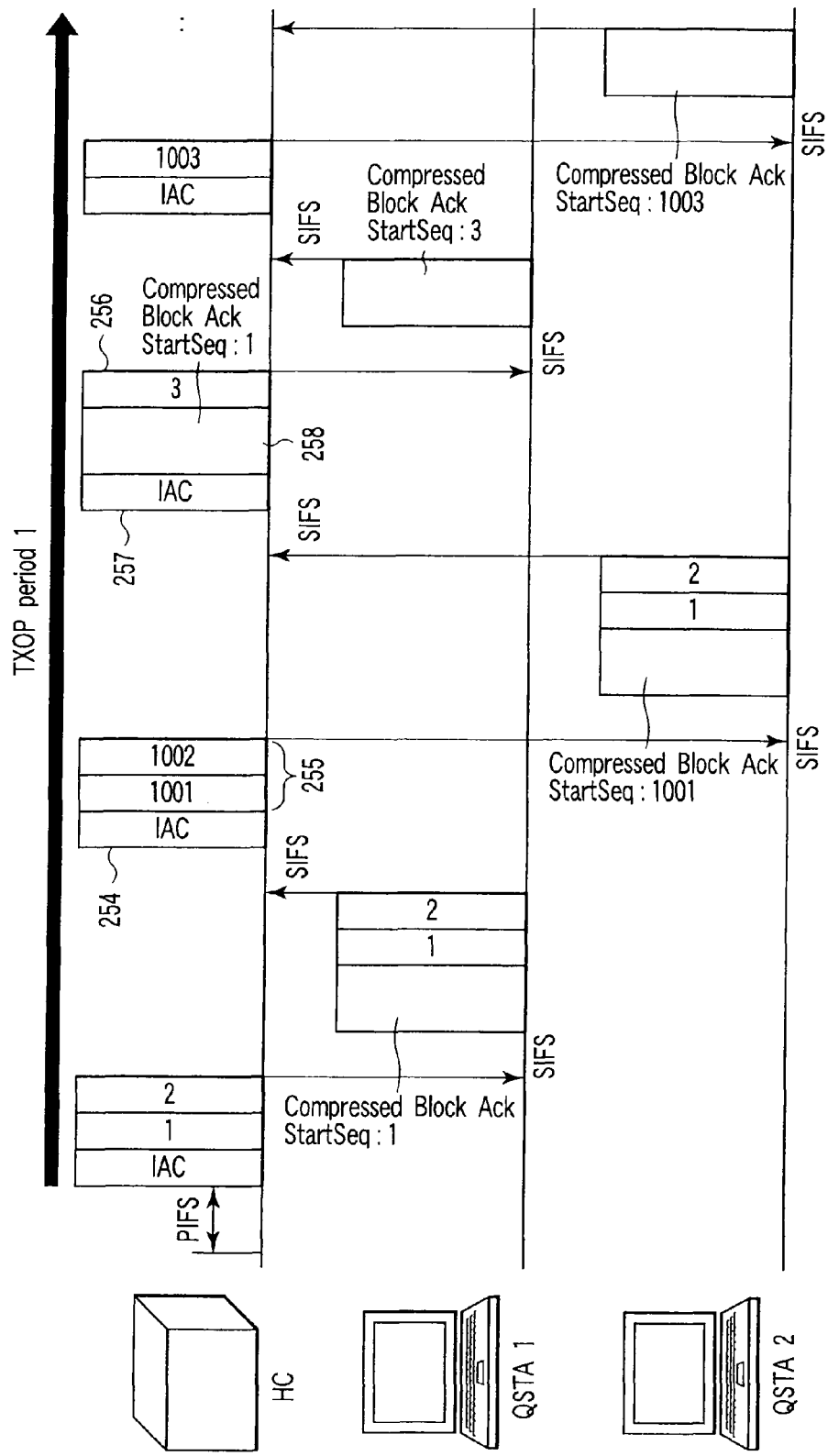
FIG. 25 is a view showing piggybacking operation applied to the delayed Block Ack technique.
Figure 26:
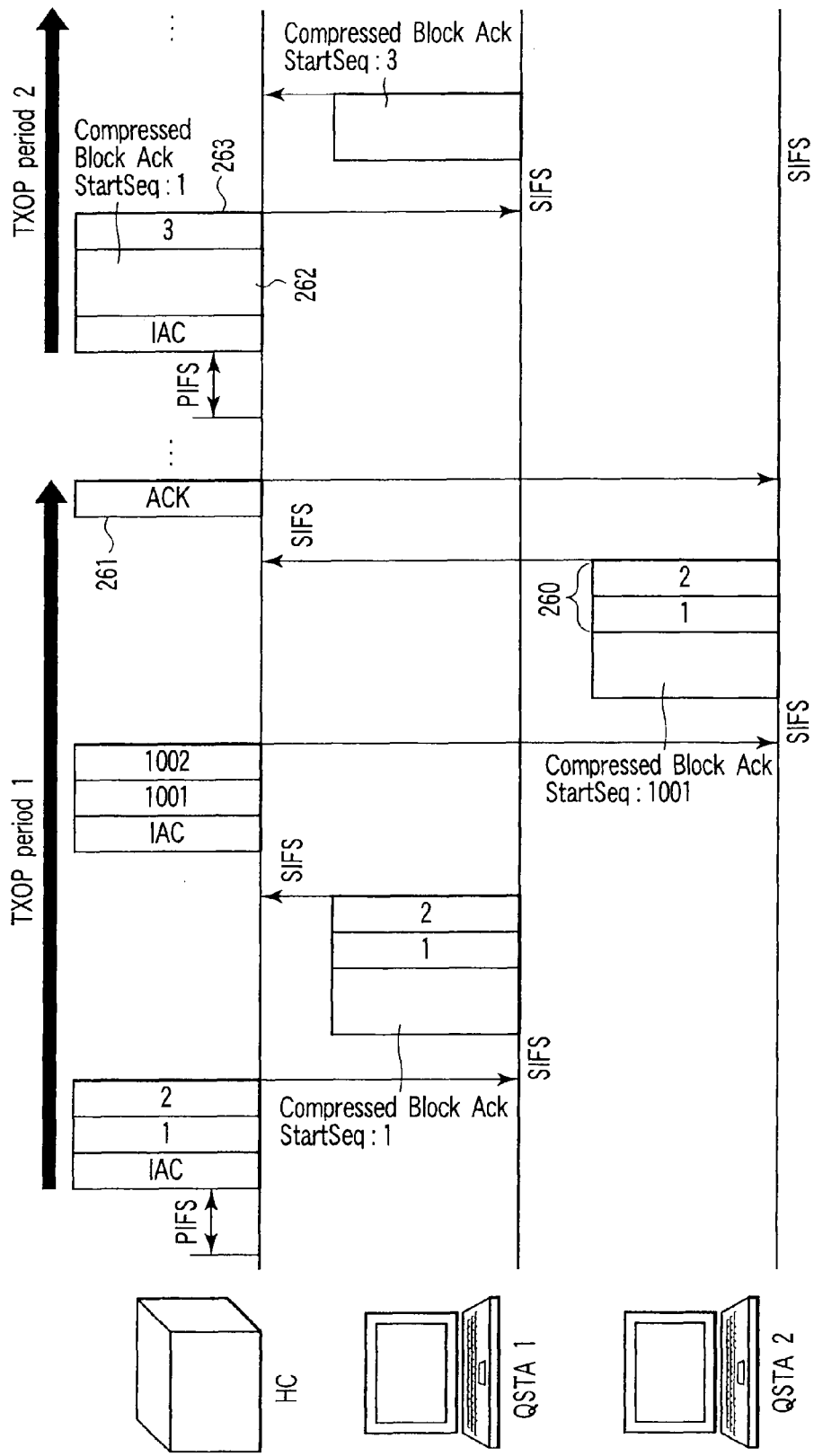
FIG. 26 is a view showing another example of piggybacking operation applied to the delayed Block Ack technique.

FIGS. 25 and 26 each show a basic embodiment of the present invention concerning its application to the delayed Block Ack technique. Referring to FIG. 25, when the transmission of a Compressed Block Ack to data in the uplink direction from QSTA 1 is to be delayed, the Normal acknowledgement frame defined in IEEE 802.11 is transmitted in a normal state. Instead of this operation, however, an IAC frame to another destination is transmitted after a lapse of a SIFS. An IAC frame can be used for various applications by setting 1 in each bit of the IAC Mask field shown in FIG. 10. In this case, in order to indicate that the transmission of a delayed Block Ack is allowed, a 1-bit identification flag is prepared in the IAC Mask field.

When the HC transmits, to QSTA 2, data frames 255 with sequence numbers "1001" and "1002", the destination MAC address of an IAC frame 254 to be simultaneously aggregated has been set to QSTA 2. In the second embodiment of the present invention, when performing transmission to QSTA 2, the HC sets an extended flag in the IAC Mask field of an IAC frame to 1, which indicates that a delayed Block Ack has been accepted (to which negative logic can be obviously applied). QSTA 1 recognizes in advance that the delayed Block Ack Policy is applied to a Compressed Block Ack returned from the HC. Assume that QSTA 1 detects a busy state in the wireless channel within an (SIFS+1 slot) time after the transmission of data in the uplink direction to the HC. In this case, if QSTA 1 has successfully received the IAC frame aggregated in the physical frame, and the flag in the IAC Mask field in the IAC frame, which indicates that a delayed Block Ack is accepted, is set to 1 (0 in the case of negative logic), QSTA 1 recognizes that the transmission of the delayed Block Ack is accepted on the destination side.

In this case, the HC in FIG. 25 transmits data to QSTA 2 a SIFS after the reception of a physical frame from QSTA 1.

According to the IEEE 802.11e/Draft 10.0 standard, if no busy state is detected in a wireless channel within an (SIFS+1 slot) time after the transmission of a Block Ack Request or data, the transmitted frame is regarded as a retransmission target. Therefore, a frame by which the HC notifies the QSTA of the acceptance of a delayed Block Ack needs to be transmitted after a lapse of a SIFS. Upon detecting a busy a SIFS after the transmission of the frame to the HC, QSTA 1 resets the timer. Even if the destination of an IAC frame in a physical frame which causes a busy state is other than QSTA 1, when the flag in the IAC Mask is set to 1, QSTA 1 confirms that a Compressed Block Ack is returned, according to the delayed Block Ack Policy. If the flag in the IAC Mask remains 0 (1 in the case of negative logic), it is determined that the establishment of a delayed Block Ack sequence has failed. So, the QSTA should retransmit the data or Block Ack Request frame.

Referring to FIG. 25, the HC transmits data 256 with sequence number "3", an IAC frame 257 to QSTA 1, and a Compressed Block Ack 258 with a Block Ack Starting Sequence Control value of "1" to QSTA 1 upon aggregating them a SIFS after the reception of a frame in the uplink direction from QSTA 2. The Compressed Block Ack 258 is an acknowledgement frame to MPDUs with sequence numbers "1" and "2" transmitted first by QSTA 1. Although the destination of the IAC frame 257 is QSTA 1, setting a flag in the IAC Mask notifies that delayed Block Ack transmission of data in the uplink direction from QSTA 2 is accepted. According to the IEEE 802.11e/Draft 10.0 standard, although it is necessary to return a Normal acknowledgement to a Block Ack frame, in the second embodiment of the present invention, when a Normal acknowledgement frame and a Compressed Block Ack to data in the downlink direction from an HC are to be aggregated, transmitting the Compressed Block Ack also serves as transmitting the Ack frame defined in IEEE 802.11. That is, when the HC transmits data with sequence number "3" and a Compressed Block Ack based on the delayed policy, and the destination (QSTA 1 in the example shown in FIG. 25) then returns a Compressed Block Ack according to the immediate policy, it is regarded that a Normal acknowledgement frame to the Block Ack is received as defined in IEEE 802.11e/Draft 10.0.

As shown in FIG. 25, if there is data to be transmitted to another destination, an IAC frame is also aggregated, and it is notified by using the frame that the delayed Block Ack technique is accepted. When there is no downlink data as in the example shown in FIG. 26, the Normal acknowledgement frame defined in IEEE 802.11 is transmitted to finish the TXOP period. In the example shown in FIG. 26, after a frame 260 from QSTA 2 is received, since there is no data to be transmitted after a lapse of a SIFS, the HC transmits a Normal acknowledgement frame 261 to QSTA 2 to notify that the delayed Block Ack is accepted. When TXOP period 1 expires and TXOP period 2 starts, the HC transmits a Compressed Block Ack 262 based on the delayed policy and a downlink data 263 to QSTA 1 upon aggregating. As shown in FIG. 25, a Compressed Block Ack from QSTA 1 also serves as a Normal acknowledgement (an Ack to a Block Ack). In the second embodiment of the present invention, when there are data to be transmitted at SIFS intervals in a predetermined TXOP period, an IAC frame to another destination is regarded as an Ack response to a delayed Block Ack. Therefore, when an IAC frame is used as a Normal acknowledgement in the delayed Block Ack technique as shown in FIGS. 25 and 26, the MAC efficiency can be improved as compared with a case wherein the conventional delayed Block Ack Policy defined in IEEE 802.11e/Draft 10.0 is used.

Figure 27:
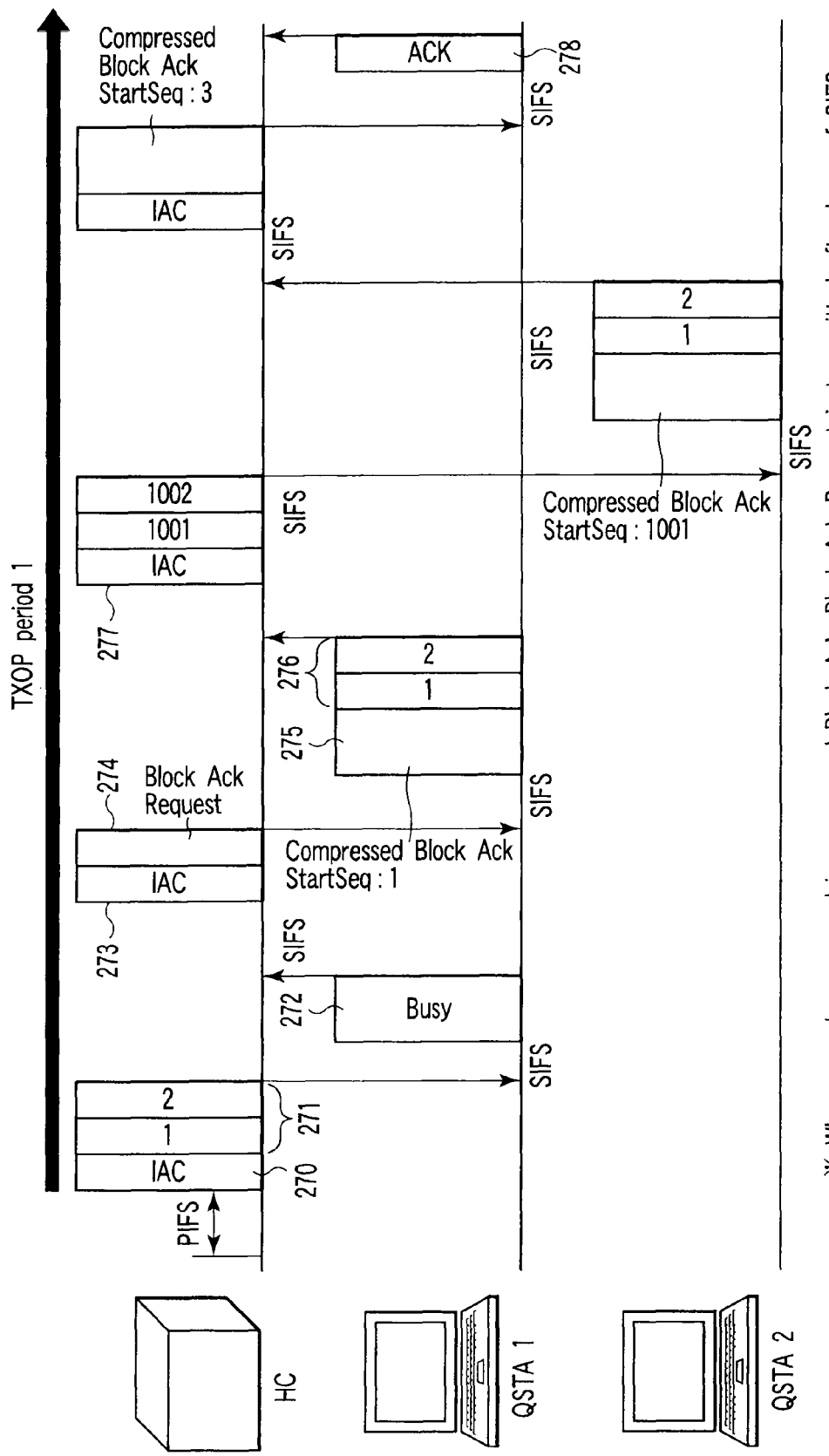
FIG. 27 is a view showing a case wherein only a busy is detected in a delayed Block Ack sequence.

FIGS. 27 to 30 each show how frames are exchanged in the execution of retransmission due to errors. The basic operation in this case is the same as that in the first embodiment of the present invention. First of all, as shown in FIG. 27, the HC transmits downlink data 271 with sequence numbers "1" and "2" to QSTA 1. In this case, if an error has occurred in a response frame transmitted by QSTA 1 after a lapse of a SIFS, the HC detects only a busy 272. After a lapse of a SIFS, the HC transmits a Block Ack Request frame 274 and IAC frame 273 to QSTA 1 upon aggregating them. When the immediate Block Ack Policy is applied to a Compressed Block Ack from QSTA 1 to the HC, QSTA 1 transmits a Compressed Block Ack 275 a SIFS after the reception of the Block Ack Request frame 274 from the HC. In the example shown in FIG. 27, QSTA 1 transmits the Compressed Block Ack 275 with a Block Ack Starting Sequence Control value of "1" and data 276 in the uplink direction to the HC upon piggybacking them. Assuming that the delayed policy is applied to a Compressed Block Ack from the HC to the QSTA, the HC uses an IAC frame 277 addressed to QSTA 2 to notify that the application of the delayed Block Ack Policy is accepted, as in the example shown in FIG. 25. Assume that when the frame transmission in the uplink direction from QSTA 2 to the HC ends, the remainder of TXOP period 1 held by the HC is small, and the HC transmits a Compressed Block Ack based on the delayed policy to QSTA 1 from the viewpoint of scheduling. Since there is a delayed Compressed Block Ack in the physical frame received from the HC, QSTA 1 completes the delayed Block Ack sequence by returning the Normal acknowledgement frame defined in IEEE 802.11. At this time, in the second embodiment of the present invention, as in the example shown in FIG. 25, if the HC has transmitted downlink data in response to a delayed Compressed Block Ack, and the immediate policy is applied to a Compressed Block Ack from QSTA 1 to the HC, transmitting only the Compressed Block Ack can also serve as transmitting the Normal acknowledgement defined in IEEE 802.11, as described above. In the example shown in FIG. 27, since the physical frame transmitted by the HC at the end of TXOP period 1 contains no aggregated data, QSTA 1 completes the delayed Block Ack sequence by transmitting a Normal acknowledgement 278.

Figure 28:
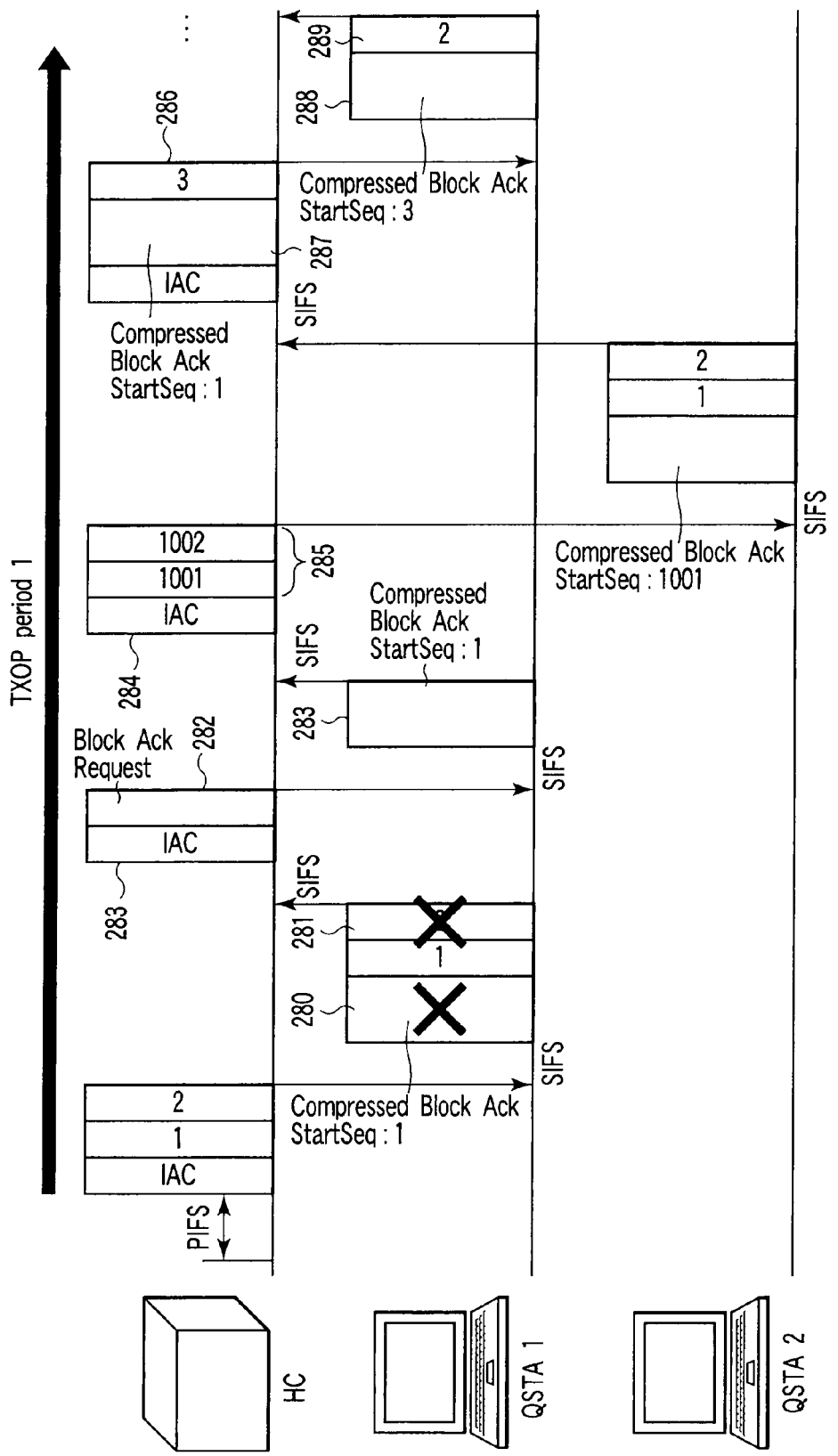
FIG. 28 is a view showing a case wherein errors have occurred in some of data transmitted in the uplink direction.

FIG. 28 shows an example of operation to be performed when errors have occurred in some of the MPDUs in the uplink direction from a QSTA to an HC. In the example shown in FIG. 28, errors have occurred in a Compressed Block Ack 280 from QSTA 1 to the HC and data 281 with sequence number "2" in the uplink direction. The HC cannot receive any Compressed Block Ack from QSTA 1. The HC therefore transmits a Block Ack Request 282. An IAC frame 283 is aggregated in the Block Ack Request 282 transmitted by the HC. The destination of the IAC frame 283 is QSTA 1, and 1 (0 in the case of negative logic) is set in the flag in the IAC Mask field. Upon receiving the IAC frame 283, QSTA 1 confirms that the delayed policy is properly applied to data with sequence numbers "1" and "2" transmitted by itself. QSTA 1 then retransmits the Compressed Block Ack 283 with a Block Ack Starting Sequence Control value of "1". After a lapse of a SIFS, the HC transmits an IAC frame 284 and data 285 with sequence numbers "1001" and "1002" to QSTA 2 upon aggregating them. At this time, the value of the flag in the IAC Mask field of the IAC frame 284 is kept at 0 which is the initial value (1 in the case of negative logic). This is because the notification of the acceptance of the delayed Block Ack Policy for data from QSTA 1 has already been completed. After QSTA 2 transmits data to the HC, the HC transmits downlink data (sequence number "3") 286 and a Compressed Block Ack 287 based on the delayed policy with a Block Ack Starting Sequence Control value of "1" to QSTA 1. QSTA 1 makes a Compressed Block Ack 288 to sequence number "3" from the HC also serve as a Normal acknowledgement frame to the Block Ack. In addition, when piggybacking is permitted by an IAC frame, QSTA 1 retransmits data frame 289 with sequence number "2", whose transmission has failed, upon piggybacking.

Figure 29:
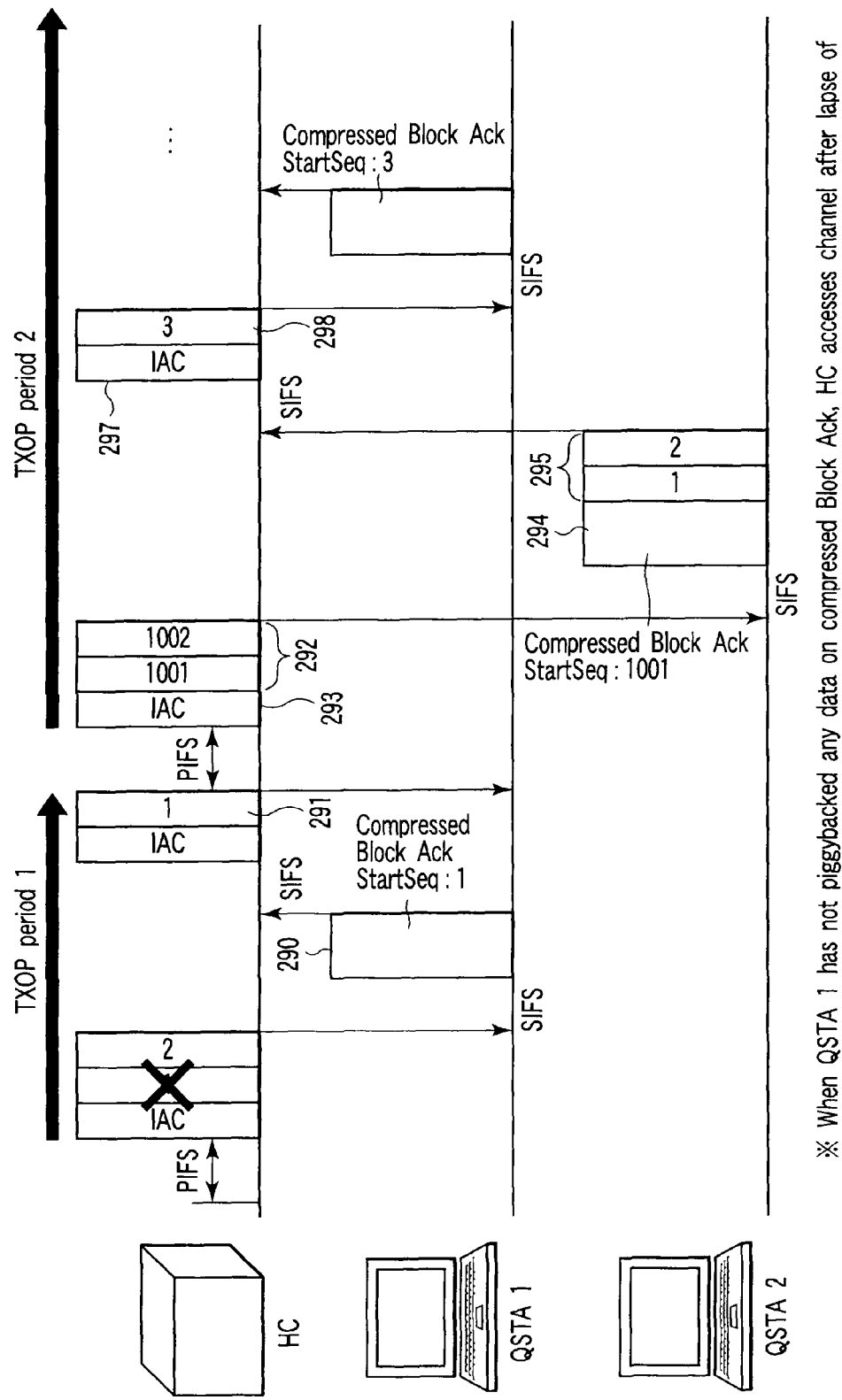
FIG. 29 is a view showing a case wherein errors have occurred in some of data transmitted in the downlink direction.

FIG. 29 shows an example of retransmission to be performed when errors have occurred in some of MPDUs aggregated in a physical frame in the downlink direction. In the example shown in FIG. 29, since the immediate policy is applied to Compressed Block Ack transmission from a QSTA to an HC, QSTA 1 returns a Compressed Block Ack 290 to indicate that an error has occurred in an MPDU with sequence number "1" from the HC, and the HC retransmits an MPDU 291 with sequence number "1". In TXOP period 2, the HC transmits data frames 292 with sequence numbers "1001" and "1002" and an IAC frame 293 to QSTA 2 upon aggregating them. QSTA 2 transmits, to the HC, a Compressed Block Ack 294 based on the immediate policy and data 295 in the uplink direction upon piggybacking them. In transmitting data to QSTA 1 a SIFS after the reception of the frame from QSTA 2, the HC sets 1 in the flag in the IAC Mask field of an IAC frame 297 aggregated with the data. When the flag in the IAC frame 297 addressed to QSTA 1 is set to 1, QSTA 2 confirms that the delayed policy is applied to a partial response from the HC to the uplink data transmitted by QSTA 2.

Figure 30:
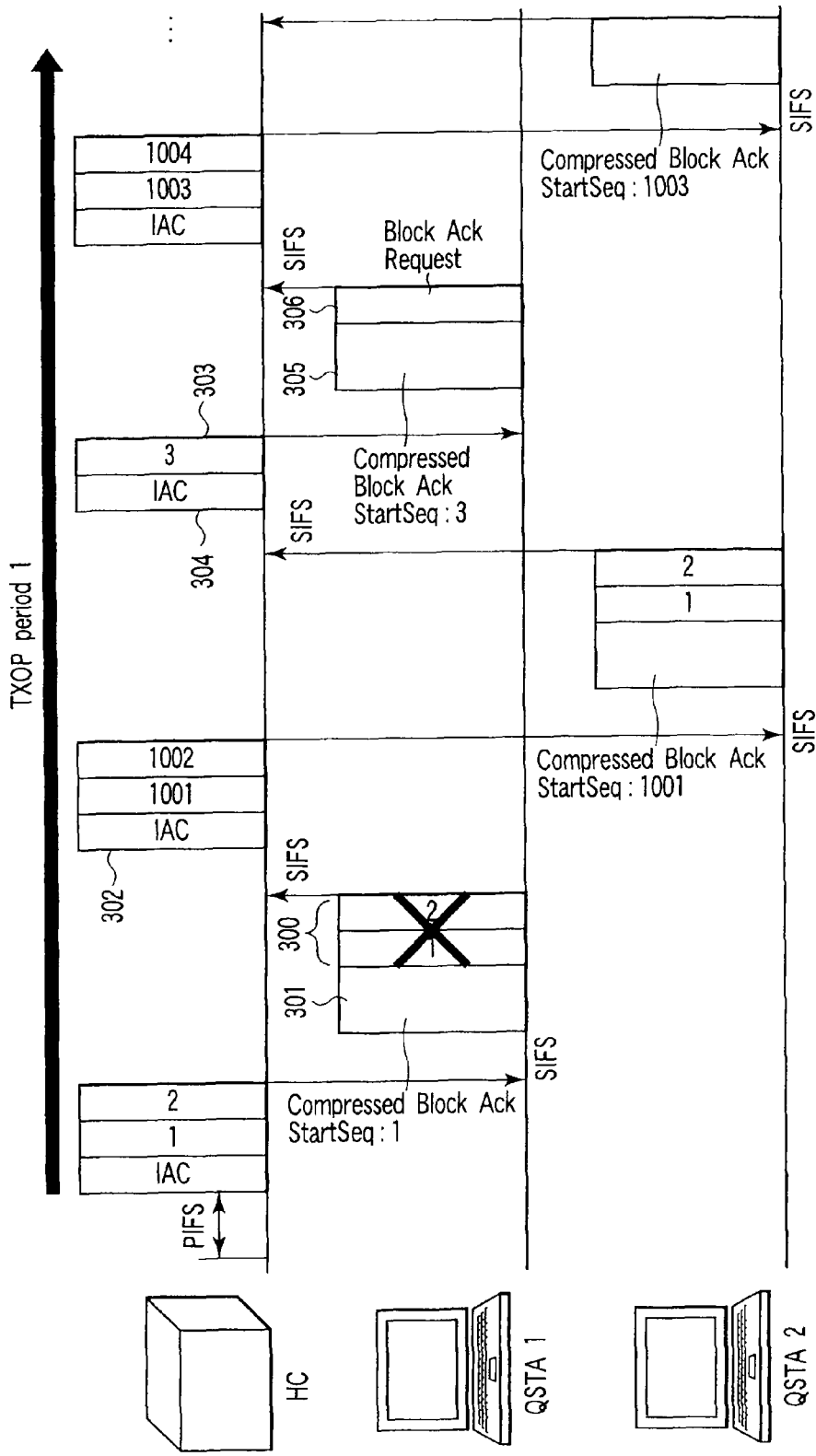
FIG. 30 is a view showing a case wherein a timeout has occurred in the uplink direction.

FIG. 30 shows a case wherein errors have occurred in all data in the uplink direction from a QSTA to an HC, and the HC cannot return a Compressed Block Ack. Referring to FIG. 30, since QSTA 1 is permitted by an IAC frame from the HC to perform piggyback transmission, QSTA 1 piggybacks data (sequence numbers "1" and "2") 300 in the uplink direction on a Compressed Block Ack 301. At this time, if an FCS calculation result indicates that all the data frames transmitted from QSTA 1 are incorrect, the HC does not return Compressed Block Ack. The HC then performs downlink transmission to QSTA 2 within the range of TXOP period 1. In this case, the flag in the IAC Mask field of an IAC frame 302 to QSTA 2 remains the initial value "0" ("1" in the case of negative logic). QSTA 1 is monitoring the physical frame transmitted from the HC, and checks the flag in the IAC frame 302. However, since the value remains 0, QSTA 1 determines that the application of the delayed policy to the Compressed Block Ack has failed, and regards the transmitted data frames 300 as retransmission targets. When the HC transmits data 303 with sequence number "3" and an IAC frame 304 to QSTA 1 upon aggregating them afterward, QSTA 1 piggybacks a Block Ack Request 306 on a Compressed Block Ack (Block Ack Starting Sequence Control value of "3") 305 to the data 303 from the HC. Alternatively, as in the first embodiment, QSTA 1 may directly aggregate the data with sequence numbers "1" and "2" as retransmission targets. The scheduling processing device of QSTA 1 selects whether to piggyback the Block Ack Request 306 or directly aggregate the frames as retransmission targets. Assume that after a lapse of a SIFS since the reception of a frame from QSTA 1, the HC is to transmit data to another QSTA. In this case, the HC sets 1 (0 in the case of negative logic) in the flag in the IAC Mask field of an IAC frame. This makes QSTA 1 recognize that Compressed Block Ack return based on the delayed policy is applied, on the HC side, to the Block Ack Request (or data) transmitted by itself.

As described above, according to the second embodiment of the present invention, the MAC efficiency can be improved by efficiently applying the piggyback technique to the delayed Block Ack technique. Note that in the second embodiment, the delayed policy is applied to a Compressed Block Ack from an HC to a QSTA (i.e., uplink data from a QSTA), and the immediate policy is applied to a Compressed Block Ack from a QSTA to an HC (i.e., downlink data to a QSTA). Obviously, however, the present invention allows the delayed policy to be applied to Compressed Block Acks in both the uplink and downlink directions.

In addition, as in the first embodiment, the present invention can be applied to a method in which, upon acquiring a TXOP by EDCA, a terminal having an access right plays a leading role in executing the delayed Block Ack technique using an IAC frame. Furthermore, the present invention can be applied to a case wherein a Block Ack Request is to be aggregated with the end of a physical frame (explicit Block Ack Request), as in the first embodiment. In this case, if an FCS calculation result indicates that the Block Ack Request is incorrect, the data receiving side does not transmit Compressed Block Ack. Thereafter, the data transmitting terminal requests the receiving side to retransmit a Compressed Block Ack, by, for example, retransmitting a Block Ack Request frame.

Third Embodiment

The third embodiment of the present invention is directed to the application of the immediate Block Ack technique and delayed Block Ack technique in a case wherein a plurality of MPDUs are aggregated and transmitted to a plurality of destinations. When only MAC frames addressed to the same destination are to be aggregated and transmitted, overheads like IFS (Interframe Space) and random backoff occur every time the destination changes. In contrast to this, aggregating MAC frames addressed to a plurality of different destinations into one physical frame makes it possible to reduce these overheads and improve the MAC efficiency.

Figure 31:
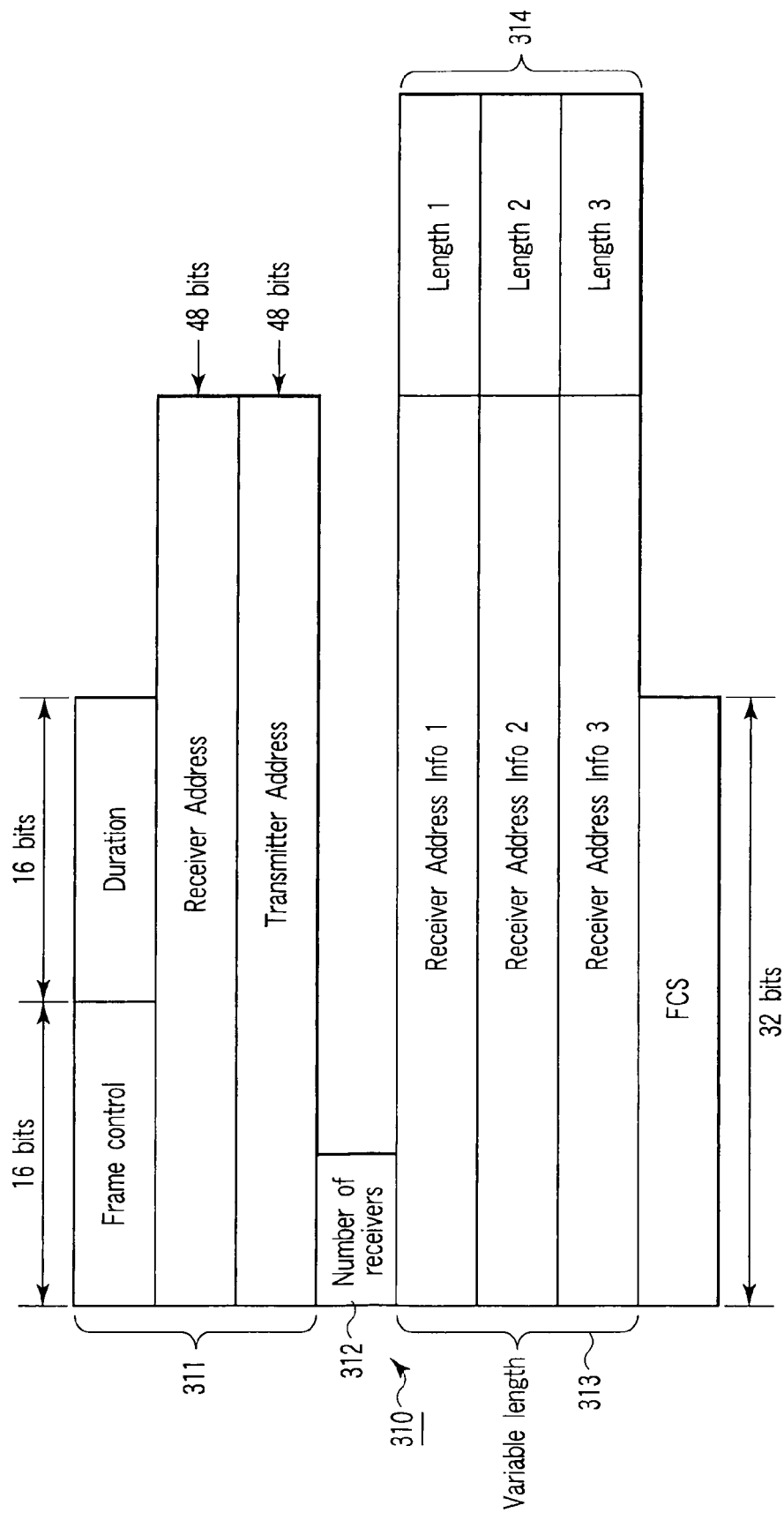
FIG. 31 is a view showing the format of an MRAD frame.

FIG. 31 shows an example of a MAC frame containing information associated with a plurality of destinations. Aggregating a MAC frame 310 like this frame in the head of a physical frame allows a physical frame receiving terminal to immediately determine whether or not there is any MPDU addressed to itself exists. The MAC frame 310 like the one shown in FIG. 31 will be referred to as an "MRAD (Multiple Receiver Aggregation Descriptor) frame" hereinafter. As shown in FIG. 31, the MAC frame 310 has a conventional MAC header 311 defined in IEEE 802.11 which includes "Frame control", "Duration", "Receiver Address", "Transmitter Address", and the like. The MAC frame 310 includes a Number of receivers field 312 indicating the number of destinations of MPDUs aggregated in the physical frame, a Receiver Address Info field 313 indicating destination MAC address information, and Length field 314 for designating, in octets, an information size to be occupied for each destination. The example shown in FIG. 31 exemplifies information up to "Receiver Address Info 3". However, the number of pieces of information is not limited to this, and an arbitrary variable length can be set. That is, the number of destinations is arbitrarily set.

Figure 32:
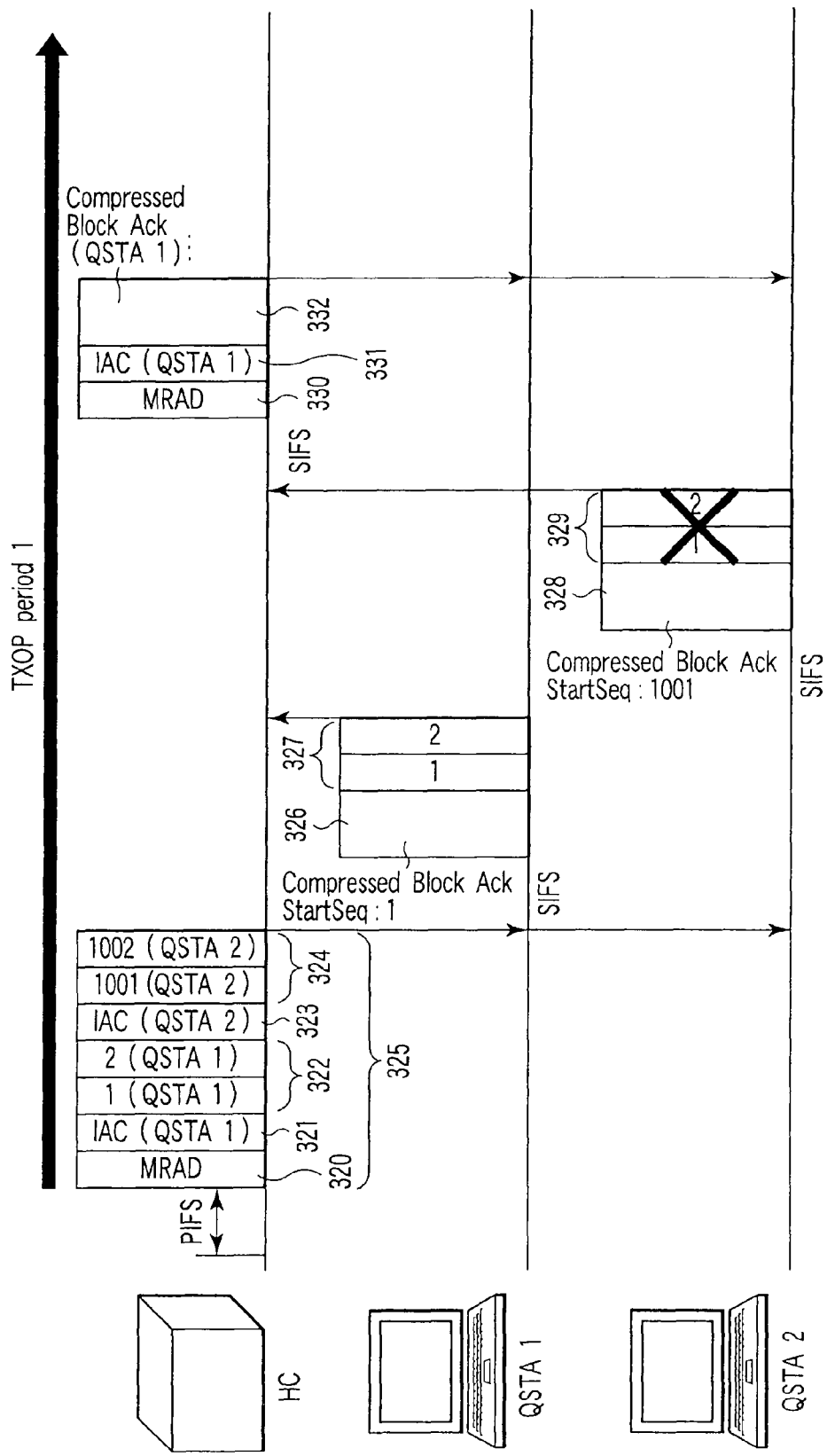
FIG. 32 is a view showing an example of frame exchange in an immediate Block Ack sequence to a plurality of destinations.

FIG. 32 shows an example of frames which are exchanged when the immediate Block Ack Policy is applied. Upon acquiring a TXOP, the HC transmits an MRAD frame 320, an IAC 321 and data frames (sequence numbers "1" and "2") 322 to QSTA 1, and an IAC 323 and data frames (sequence numbers "1001" and "1002") 324 upon aggregating them into one physical frame 325. Using the information of the MRAD frame 320 allows terminals other than QSTAs 1 and 2 to freely perform processing such as shifting to the power saving mode. Offset times from the end of the transmission of a physical frame from the HC are written in the IAC frames 321 and 323 addressed to QSTAs 1 and 2 to designate the timings at which QSTAs 1 and 2 respond. As this offset time, the Response Period Offset field in the example shown in FIG. 10 is used. When QSTA 1 successfully receives an IAC frame addressed to itself, it aggregates uplink data 327 with a Compressed Block Ack 326 to the HC within the range of piggyback transmission allowable time, and transmits the resultant data, as shown in FIG. 32. Likewise, following the frame transmission by QSTA 1, QSTA 2 transmits Compressed Block Ack 328 and uplink data 329 to the HC upon aggregating them. At this time, the example in FIG. 32 shows that all data frames 329 transmitted by QSTA 2 are incorrect. When the immediate Block Ack Policy is applied, the HC transmits an MRAD frame 330 and an IAC 331 and Compressed Block Ack frame 332 to QSTA 1 upon aggregating them a SIFS after the end of frame transmission by QSTA 2. Since all the data from QSTA 2 are incorrect, the Compressed Block Ack frame from the HC to QSTA 2 is not aggregated. In this case, if the HC does not permit QSTA 2 to perform frame transmission in the opposite direction (uplink), the Receiver Address Info field of the MRAD frame 330 does not contain the MAC address of QSTA 2. The Number of receivers field is 1, and only the MAC address of QSTA 1 and length information are written. If the HC is to permit QSTA 2 to perform transmission, it aggregates an IAC frame addressed to QSTA 2, sets "Number of receivers" to 2, and adds the MAC address of QSTA 2.

In the third embodiment of the present invention, when the HC transmits a physical frame within TXOP period 1, QSTAs 1 and 2 check the Receiver Address Info field in the MRAD frame aggregated in the physical frame from the HC. If each QSTA detects no MAC address of its own, the QSTA regards the transmitted frame as a recovery target. In the example shown in FIG. 32, QSTA 2 determines that it has failed to receive an immediate type Compressed Block Ack to transmitted data with sequence numbers "1" and "2", and performs appropriate recovery operation.

Figure 33:
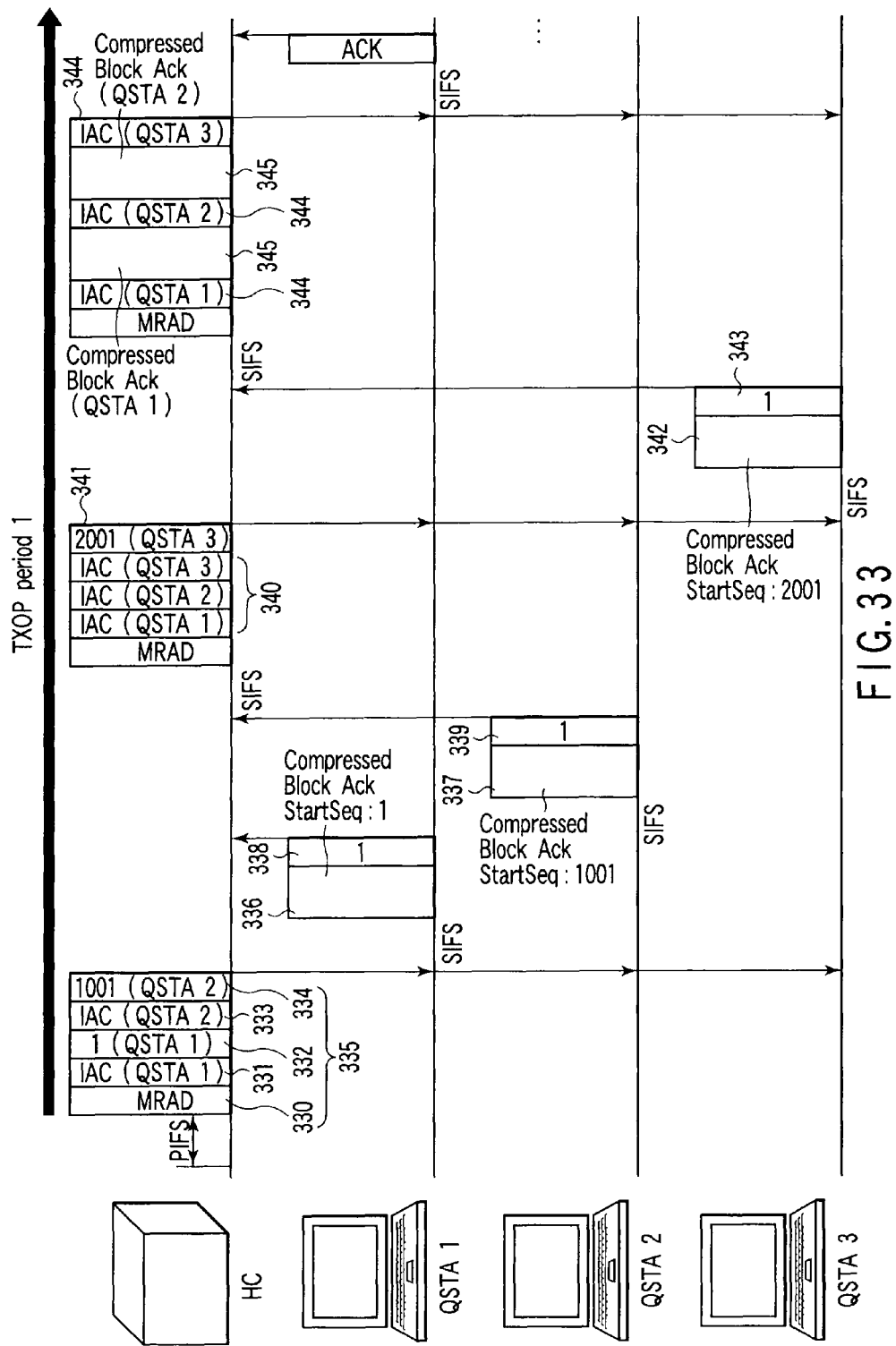
FIG. 33 is a view showing another example of frame exchange in an immediate Block Ack sequence to a plurality of destinations.
Figure 34:
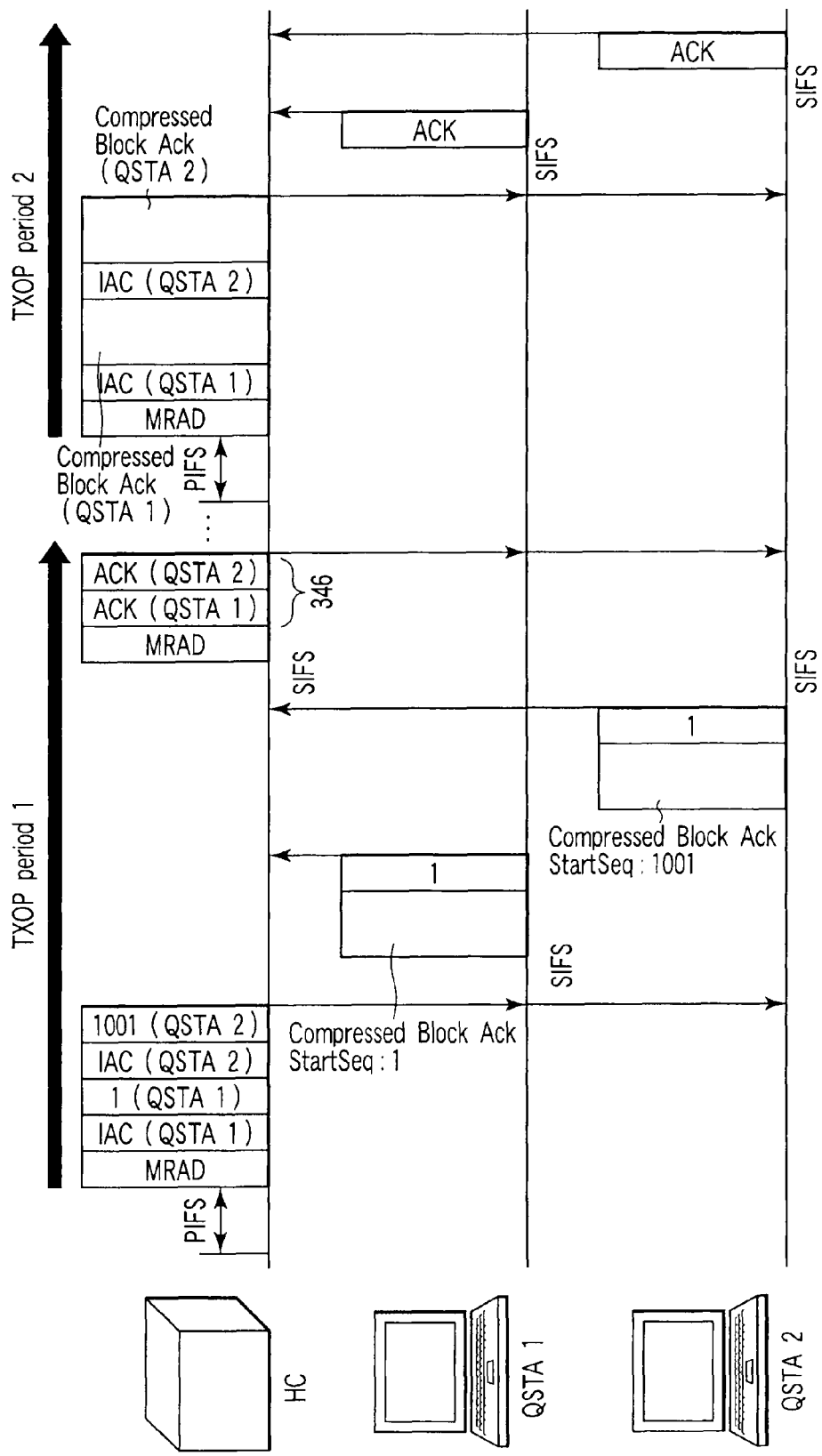
FIG. 34 is a view showing still another example of frame exchange in an immediate Block Ack sequence to a plurality of destinations.

FIGS. 33 and 34 each show an application example of the delayed Block Ack Policy. Referring to FIG. 33, the HC transmits an IAC 331 and data frame (sequence number "1") 332 to QSTA 1, and an IAC 333 and data frame (sequence number "1001") 334 to QSTA 2 upon aggregating them into one physical frame 335. QSTAs 1 and 2 recognize the timings of transmission to uplinks on the basis of the respective pieces of IAC frame information, respectively piggyback uplink data 338 and 339 on Compressed Block Acks 336 and 337.

When the delayed policy is used, there is no need to transmit a Compressed Block Ack immediately after transmission by a QSTA. Instead, as in the second embodiment, the HC can regard a frame for giving a permission to perform transmission in the opposite direction (permits a terminal having no TXOP to perform transmission) as a Normal acknowledgement frame to a Block Ack Request frame by delayed Block Ack transmission defined in IEEE 802.11e/Draft 10.0. In this case, the HC aggregates an IAC frame 340 to QSTA 1, QSTA 2, and QSTA 3 and data (sequence number "2001") 341 in the downlink direction to QSTA 3 and transmits the resultant data. Both Reverse Direction Grant and Response Period Offset of the IAC frame to each of QSTAs 1 and 2 are set to 0. That is, the HC does not permit QSTAs 1 and 2 to perform transmission in the uplink direction. A flag indicating the acceptance of the delayed Block Ack technique is set ON. Upon receiving this physical frame, each of QSTAs 1 and 2 confirms that the delayed Block Ack Policy is applied to the data transmitted by itself. Thereafter, QSTA 3 transmits a Compressed Block Ack 342 to the data (sequence number "2001") from the HC and data 343 in the uplink direction upon aggregating them. Referring to FIG. 33, the HC transmits IAC frames 344 to QSTAs 1, 2, and 3 and Compressed Block Acks 345 to QSTAs 1 and 2. The Compressed Block Ack 345 is a Block Ack based on the delayed policy to data in the uplink direction from QSTAs 1 and 2. In this case, values are set in Reverse Direction Grant and Response Period Offset of the IAC frame 344 to each of QSTAs 1 and 2 to allow each QSTA to transmit at least the Normal acknowledgement frame defined in IEEE 802.11. In addition, a flag is set in the IAC Mask field of QSTA 3 to notify the acceptance of the delayed Block Ack technique. As shown in FIG. 34, when the remainder of TXOP period held by the HC becomes small, the HC transmits Normal acknowledgement frames 346 defined in IEEE 802.11 which are prepared for the respective destinations and aggregated. That is, an aggregation of Normal acknowledgements is performed for a plurality of destinations.

Buffer management on the receiving side in a case wherein data addressed to a plurality of destinations are aggregated will be described with reference to FIGS. 35 and 36. Consider a case wherein an MRAD frame 350, an IAC 351 to QSTA 1, data frames 352 and 353 with sequence numbers "1" and "2", an IAC 354 to QSTA 2, and data frames 355 and 356 with sequence numbers "1001" and "1002" are aggregated and transmitted. In this case, a format like the one shown in FIG. 6 may be used to aggregate a plurality of frames.

Figure 36:
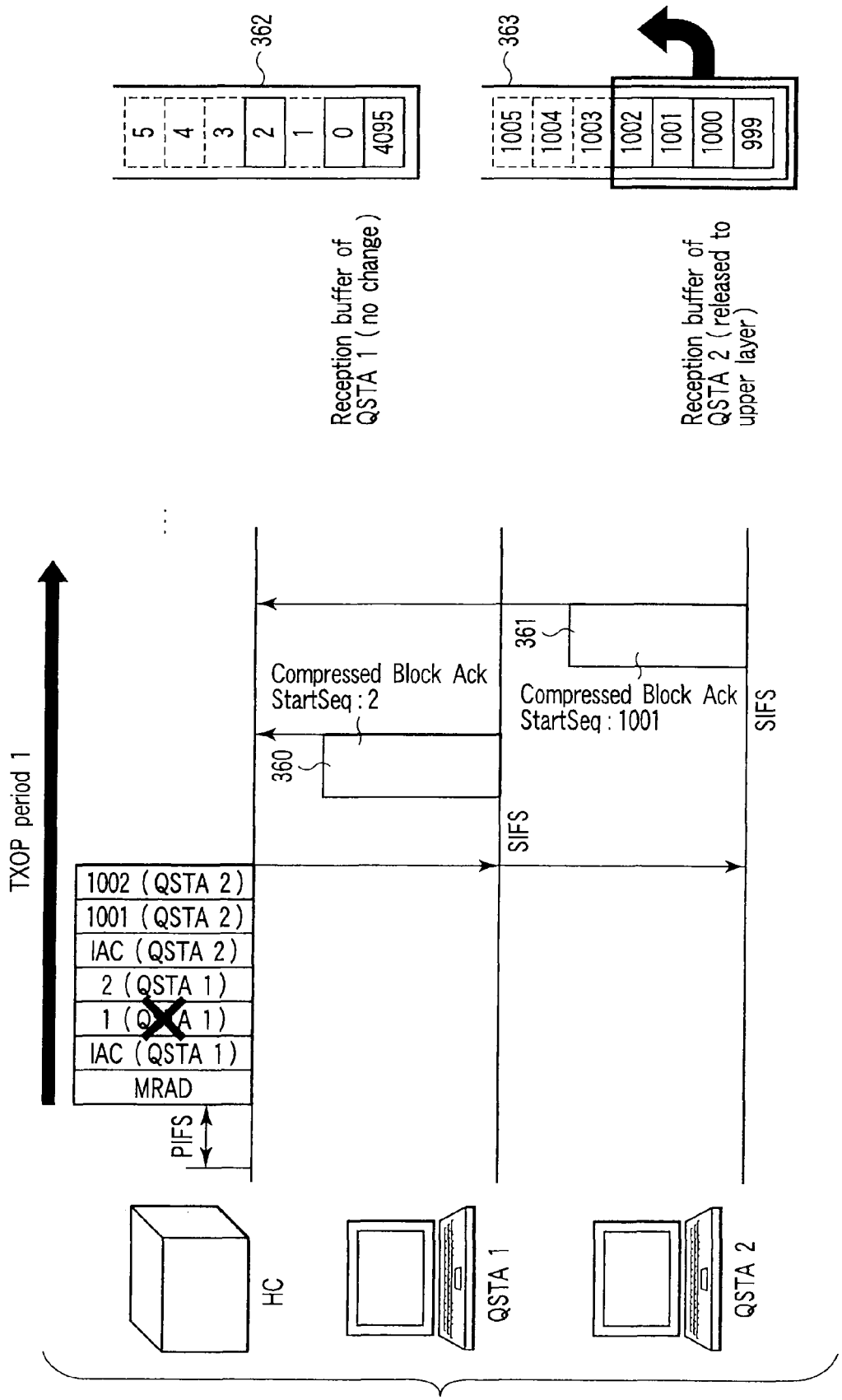
FIG. 36 is a view for explaining aggregation to a plurality of destinations and reception buffer management.

Assume that, as shown in FIG. 36, an FCS calculation result indicates that an error has occurred in the MPDU 352 with sequence number "1". By using the offset value designated by the IAC 351, QSTA 1 transmits a Compressed Block Ack 360 with a Block Ack Starting Sequence Control value of "2", and QSTA 2 transmits a Compressed Block Ack 361 with a Block Ack Starting Sequence Control value of "1001". For aggregated data containing no Block Ack Request (implicit Block Ack Request), the sequence number of the first MPDU which has been successfully received is used as the Block Ack Starting Sequence Control value of the Compressed Block Ack. Referring to FIG. 36, assume that MPDUs with sequence numbers "0" and "4095" have already been stored in a reception buffer 362 of QSTA 1, and MPDUs with sequence numbers "999" and "1000" have already been stored in a reception buffer 363 of QSTA 2. In the third embodiment of the present invention, when an FCS calculation result on an IAC frame is correct, and an FCS calculation result on a data frame following it is correct, the sequence number of the data frame is regarded as proper sequence number information for reception buffer management. In the example shown in FIG. 36, QSTA 1 transmits a Compressed Block Ack to the HC, but keeps the MAC frame stored in the reception buffer 362. On the other hand, QSTA 2 has successfully received all frames, and hence performs reception buffer management by setting the sequence number "1001" as a proper Block Ack Starting Sequence Control value. According to the IEEE 802.11e/Draft 10.0 standard, all MAC frames having lower sequence numbers than the Block Ack Starting Sequence Control value must be released from the reception buffer and forwarded to the upper layer. For this reason, QSTA 2 in FIG. 36 releases MAC frames with sequence numbers "999" to "1002" from the reception buffer 363 and forwards them to the upper layer.

As shown in FIG. 37, a format containing no IAC frame can also be used. In the example shown in FIG. 37, an FCS calculation result indicates that an error has occurred in the data with sequence number "2" to QSTA 2. In this case, even if an FCS calculation result on the data frame with sequence number "1001" to QSTA 2 is correct, it cannot be determined up to which MPDUs to QSTA 1 are aggregated. For this reason, even if a Compressed Block Ack is returned, no MAC frame can be released from the reception buffer. That is, in the third embodiment of the present invention, if FCS calculation results on two consecutive MPDUs having different destination addresses are successful, reception buffer management is performed by determining the sequence number of the second MPDU (i.e., the MPDU having the new destination) as a proper Block Ack Starting Sequence Control value for the next destination.

According to the IEEE 802.11e/Draft 10.0 standard, MAC frames are classified according to the priorities of traffic events and a Block Ack Request and Block Ack frame are required for each priority. The BAR (Block Ack Request) field of the Block Ack Request frame in FIG. 2 and the BA (Block Ack) Control field of the Block Ack in FIG. 3 each include a 4-bit TID (Traffic Identifier), in which a number 0 to 15 is written. Note that assigning a numerical value from 0 to 7 to the TID indicates that the MAC frame is transmitted by prioritized QoS, i.e., EDCA, whereas assigning a numerical value from 8 to 15 to the TID (which is called TSID: Traffic Stream Identifier) indicates that the MAC frame is transmitted by parameterized QoS, i.e., HCCA. A TID is also used for an RDTID (Reverse Direction Traffic Identifier) of the IAC frame of the Compressed Block Ack in FIG. 8 or of the IAC frame in FIG. 10. The RDTID field of an IAC frame is used by a transmitting terminal which has acquired a TXOP to designate a priority to a MAC frame to be piggybacked when permitting a destination terminal to perform piggyback transmission. According to the IEEE 802.11e/Draft 10.0 standard, a sequence number must be independently assigned to a MAC frame for each TID. The QoS data receiving side therefore preferably manages the reception buffer for each priority. In transmission based on the Block Ack technique defined in IEEE 802.11e, all MAC frames having lower sequence numbers than the Starting Sequence Number (Block Ack Starting Sequence Control) indicated by a Block Ack Request frame are released from a reception buffer. In this case, since a Block Ack Request frame is prepared for each TID, reception buffer management must be done for each priority (TID). The description of the reception buffer management which has been made with reference to FIGS. 35 and 37 is about the case wherein MAC frames addressed to a plurality of destinations, with a single priority (one kind of TID), are aggregated into a physical frame. In this embodiment, the present invention can be applied to a case wherein MAC frames addressed to a plurality of destinations, with a plurality of priorities, are aggregated into a single physical frame. Referring to FIG. 35, following the MRAD, the IAC frame to QSTA 1, the data frames with sequence numbers "1" and "2", the IAC frame to QSTA 2, and the data frames with sequence numbers "1001" and "1002" are aggregated in the order named. Assume, however, that following an MRAD, an IAC frame with a high priority (the value of the TID is arbitrarily set) to QSTA 1, data frames with sequence numbers "1" and "2", an IAC frame with an intermediate priority to QSTA 1, data frames with sequence numbers "1" and "2", an IAC frame with a high priority (the value of the TID is arbitrarily set) to QSTA 2, data frames with sequence numbers "1001" and "1002", an IAC frame with an intermediate priority to QSTA 1, and data frames with sequence numbers "1001" and "1002" are aggregated in the order named. In this case, if an FCS calculation result on a given IAC frame is correct and an FCS calculation result on the succeeding MPDU is correct on the assumption that an IAC frame is aggregated before each destination and each priority, the sequence number of the MPDU is regarded as a proper Starting Sequence Number (Block Ack Starting Sequence Control). All MAC frames having lower sequence numbers than the Starting Sequence Number are then released from a corresponding buffer prepared for each priority in the receiving terminal and forwarded to the upper layer. Alternatively, assume that a physical frame need not necessarily contain any IAC frame, as shown in FIG. 37. In this case, if FCS calculation results on two consecutive MPDUs are correct and the two MPDUs have different destination addresses or different priorities, the sequence number of the second MPDU is used for the management of a reception buffer prepared for each priority in the destination terminal of the MPDU. That is, all MAC frames having lower sequence numbers than the proper Block Ack Starting Sequence Control are released from the reception buffer and forwarded to the upper layer.

This embodiment has exemplified the case wherein in downlink transmission from an HC (QoS access point) to a QSTA (QoS station), MAC frames addressed to a plurality of destinations are aggregated and transmitted. However, a QSTA may serve as an entity of transmission as long as a TXOP is given by a QoS CF-Poll frame. When the QSTA serves as an entity of transmission, destination candidates include, for example, terminals which can directly communicate with each other between QSTAs through DLS (Direct Link Set-up), in addition to access points. Obviously, the present invention can also be applied to contention-based EDCA as well as HCCA which is a contention-free QoS access control scheme. In EDCA, a terminal which has acquired a TXOP serves as a start point of data transmission to a plurality of destinations. In addition, the permission of piggyback transmission to a destination by an IAC frame is also realized by the scheduling processing device of a terminal which has acquired a TXOP.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication apparatus capable of performing frame transmissions in a channel use period, comprising:
an acquisition device configured to acquire a channel use period for transmitting frames to a destination terminal;
a generation device configured to generate a first physical frame,
the first physical frame including a plurality of transmission data frames,
each of the transmission data frames including header information and information for error detection;
a transmission device configured to transmit the first physical frame to the destination terminal; and
a reception device configured to receive, after the transmitting the first physical frame, a second physical frame from the destination terminal,
the second physical frame including both an acknowledgement frame for the transmission data frames and reception data frames;
wherein the first physical frame includes both permission information for the destination terminal to transmit the acknowledgement frame and also the reception data frames,
wherein in the first physical frame, a permission period during which the destination terminal is allowed to transmit the acknowledgement frame and the reception data frames is described, and the permission period is set within the channel use period, and wherein the transmission device performs a recovery operation if the acknowledgement frame in the second physical frame is not received, although the second physical frame is received within the channel use period.

2. The apparatus according to claim 1, further comprising a determination device configured to determine, if a second acknowledgement frame for the second physical frame is requested by the second physical frame, whether or not a physical frame in which the permission information and the permission period are described is transmitted again to the destination terminal, depending on how content of the second acknowledgement frame is generated.

3. The apparatus according to claim 1, wherein the first physical frame further includes an acknowledgement request frame for requesting an acknowledgement frame for the transmission data frame, in addition to the transmission data frame.

4. The apparatus according to claim 1, wherein a number of MAC frames that can be transmitted by the destination terminal is determined depending on the permission period.

5. The apparatus according to claim 1, further comprising a device configured to determine whether or not the permission information is to be included in the first physical frame, in accordance with a remaining period of the channel use period.

6. The apparatus according to claim 1, further comprising a device configured to determine that the acknowledgement frame is not included the second frame, if an error has been detected at a specific position in the second physical frame.

7. The apparatus according to claim 1, wherein the first physical frame includes the permission information for each destination terminal of a plurality of destination terminals, wherein the transmission device transmits, after receiving the reception data frame from one of the plurality of destination terminals, the first physical frame for another one of the plurality of destination terminals, in place of transmitting a normal acknowledgement frame for a confirmation notification indicating that transmission of an acknowledgement frame for the reception data frame, thereby notifying performing the confirmation notification to the one of the plurality of destination terminals.

8. The apparatus according to claim 1, further comprising an antenna, and wherein the transmission device transmits the first physical frame via the antenna, and the reception device receives the second physical frame via the antenna.

9. A communication apparatus, comprising:
a reception device configured to receive a first physical frame including a plurality of reception data frames from a transmission source terminal,
each of the reception data frames including header information and information for error detection; and
a transmission device configured to transmit a second physical frame including both an acknowledgement frame for the reception data frames and a transmission data frame to the transmission source terminal, during a channel use period which is acquired by the transmission source terminal;

wherein the reception device receives, after transmitting the second physical frame, a third physical frame that includes an acknowledgement frame for the transmission data frame from the transmission source terminal, wherein the first physical frame includes permission information for the transmission source terminal to transmit both the acknowledgement frame and the transmission data frame, wherein in the first physical frame, a permission period for permitting transmission of the transmission data frames is described, and the permission period is set within the channel use period, and wherein the transmission device performs a recovery operation for requesting the acknowledgement frame, if the acknowledgement frame in the third physical frame is not received.

10. The apparatus according to claim 9, further comprising a determination device configured to detect a timeout that is caused when reception of the transmission data frame is not acknowledged, and wherein, if the timeout has been detected, the transmission device transmits:
an acknowledgement frame for the reception data frame, and an acknowledgement request frame for the transmission data frame, or
the acknowledgement frame for the reception data frames, and the transmission data frame for retransmission.

11. The apparatus according to claim 9, wherein the transmission device transmits the third physical frame to another terminal other than the destination terminal, in place of transmitting a normal acknowledgement frame for a confirmation notification indicating that transmission of an acknowledgement frame for the reception data frame is performed by a delayed type, thereby performing the confirmation notification to the destination terminal that transmitted the reception data frames.

12. The apparatus according to claim 11, wherein the transmission device transmits the acknowledgement frame and an acknowledgement frame for the transmission data frame, after a predetermined period of time is elapsed from the notification.

13. The apparatus according to claim 9, wherein a confirmation notification indicating that transmission of an acknowledgement frame is performed by a delayed type is detected based on the first physical frame transmitted from the transmission source terminal to the terminal other than the destination terminal in place of a normal acknowledgement frame for the notification.

14. The apparatus according to claim 12, wherein the reception device receives an acknowledgement frame for the transmission data frames, after a predetermined period of time is elapsed from the notification.

15. The apparatus according to claim 9, wherein the first physical frame includes multiple destination control information including destination information for each of the plurality of destination terminals, and the permission information.

16. The apparatus according to claim 15, wherein an application of a delayed policy is determined to have been successful if:
a self address exists in the multiple destination control information,
the permission information has been received successfully, and
a notification flag that confirms use of a delayed type for transmission of an acknowledgement frame is effective.

17. The apparatus according to claim 9, further comprising an antenna, and wherein the transmission device transmits the first physical frame via the antenna, and the reception device receives the second physical frame via the antenna.

18. A communication method for performing frame transmissions in a channel use period, comprising:
- acquiring a channel use period for transmitting frames to a destination terminal;
- generating a first physical frame,
  - the first physical frame including a plurality of transmission data frames,
    - each of the transmission data frames including header information and information for error detection;
- transmitting the first physical frame to the destination terminal;
- receiving, after transmitting the first physical frame, a second physical frame from the destination terminal,
  - the second physical frame including both an acknowledgement frame for the transmission data frames and a reception data frame; and
- performing a recovery operation when the acknowledgement frame in the second physical frame is not received, although the second physical frame is received within the channel use period,
- wherein the first physical frame includes permission information for the destination terminal to transmit both the acknowledgement frame and the reception data frame, and
- wherein in the first physical frame, a permission period during which the destination terminal is allowed to transmit the acknowledgement frame and the reception data frame is described, and the permission period is set within the channel use period.

19. A communication method, comprising:
- receiving a first physical frame including a plurality of reception data frames from a transmission source terminal,
  - each of the reception data frames including header information and information for error detection;
- transmitting a second physical frame including both an acknowledgement frame for the reception data frames and a transmission data frame to the transmission source terminal, during a channel use period that is acquired by the transmission source terminal; and
- performing a recovery operation for requesting the acknowledgement frame, if the acknowledgement frame in the third physical frame is not received,
- wherein in the receiving, after transmitting the second physical frame, a third physical frame that includes an acknowledgement frame for the transmission data frames from the transmission source terminal is received,
- wherein the first physical frame includes permission information for the transmission source terminal to transmit both the acknowledgement frame and the transmission data frame,
- wherein in the first physical frame, a permission period for permitting transmission of the transmission data frame is described, and the permission period is set within the channel use period.

* * * * *